(12) United States Patent
Kota et al.

(10) Patent No.: US 8,487,941 B2
(45) Date of Patent: *Jul. 16, 2013

(54) MEDIA ACTION SCRIPT ACCELERATION APPARATUS

(75) Inventors: Bhaskar Kota, Secunderabad (IN);
Lakshmikanth Surya Naga Satyavolu, Draksharama (IN); Ganapathi Venkata Puppala, Bantumilli Mandal (IN); Praveen Kumar Bollam, Hyderabad (IN); Sairam Sambaraju, Hyderabad (IN); Paul L. Master, Sunnyvale, CA (US)

(73) Assignee: LeoNovus USA Inc., Sunnyvale, CA (US)

( * ) Notice: Subject to any disclaimer, the term of this patent is extended or adjusted under 35 U.S.C. 154(b) by 1019 days.

This patent is subject to a terminal disclaimer.

(21) Appl. No.: 12/371,592

(22) Filed: Feb. 14, 2009

(65) Prior Publication Data
US 2010/0149189 A1 Jun. 17, 2010

Related U.S. Application Data

(63) Continuation-in-part of application No. 12/334,608, filed on Dec. 15, 2008, now abandoned.

(51) Int. Cl.
*G06F 15/16* (2006.01)
*G06T 1/20* (2006.01)
(52) U.S. Cl.
USPC ............ 345/502; 345/503; 345/643; 345/506
(58) Field of Classification Search
USPC ................. 345/501, 440, 441, 442, 629, 643,
345/502–506; 709/708; 715/205, 234, 762–763;
717/114–119, 136–167
See application file for complete search history.

(56) References Cited

U.S. PATENT DOCUMENTS

| | | | | |
|---|---|---|---|---|
| 4,825,400 | A * | 4/1989 | Simoncic et al. | 708/505 |
| 2001/0011364 | A1* | 8/2001 | Stoub | 717/1 |
| 2002/0184284 | A1* | 12/2002 | Jennings, III | 708/501 |
| 2003/0023633 | A1* | 1/2003 | Ross | 707/513 |
| 2004/0006741 | A1* | 1/2004 | Radja et al. | 715/513 |
| 2004/0085318 | A1* | 5/2004 | Hassler et al. | 345/440 |
| 2004/0088346 | A1* | 5/2004 | Hassler et al. | 709/201 |
| 2005/0038796 | A1* | 2/2005 | Carlson et al. | 707/100 |
| 2005/0235272 | A1* | 10/2005 | Skinner | 717/136 |
| 2005/0278622 | A1* | 12/2005 | Betts et al. | 715/515 |
| 2006/0031818 | A1* | 2/2006 | Poff et al. | 717/114 |
| 2007/0106928 | A1* | 5/2007 | Klask | 715/501.1 |
| 2008/0120626 | A1* | 5/2008 | Graffagnino et al. | 719/320 |

(Continued)

*Primary Examiner* — Chante Harrison
(74) *Attorney, Agent, or Firm* — Nancy R. Gamburd; Gamburd Law Group LLC

(57) ABSTRACT

Exemplary apparatus, method, and system embodiments provide for accelerated hardware processing of an action script for a graphical image for visual display. An exemplary apparatus comprises: a first memory to store corresponding data; a first processor to separate the action script from other data; and a second processor to convert a plurality of descriptive elements of the action script into a plurality of operational codes, and to perform an operation corresponding to an operational code of the plurality of operational codes using the corresponding data to generate pixel data for the graphical image. In exemplary embodiments the second processor further is to parse the action script into the plurality of descriptive elements and the corresponding data, and to extract data from the action script and to store the extracted data in the first memory as a plurality of control words having the corresponding data in predetermined fields.

78 Claims, 21 Drawing Sheets

U.S. PATENT DOCUMENTS

| | | |
|---|---|---|
| 2008/0163081 A1* | 7/2008 | Gillette et al. ............... 715/762 |
| 2008/0320404 A1* | 12/2008 | Chen et al. .................... 715/763 |
| 2009/0019105 A1* | 1/2009 | Sebastian ...................... 709/202 |
| 2009/0070459 A1* | 3/2009 | Cho et al. ...................... 709/224 |
| 2009/0228782 A1* | 9/2009 | Fraser ........................... 715/234 |
| 2010/0030852 A1* | 2/2010 | Kerebel et al. ................ 709/203 |
| 2010/0077286 A1* | 3/2010 | Guagenti et al. .............. 715/205 |

\* cited by examiner

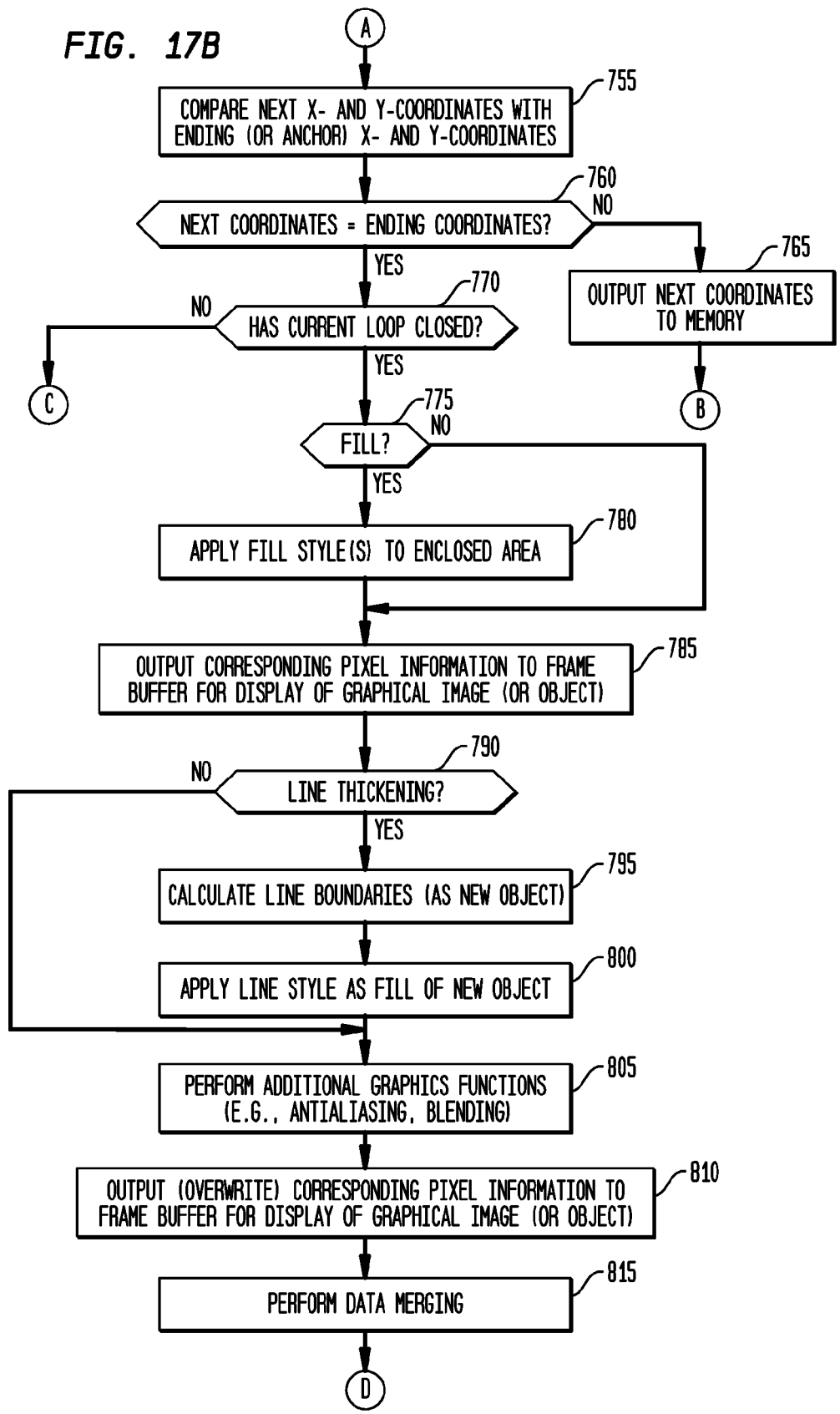

MEDIA ACTION SCRIPT ACCELERATION APPARATUS

CROSS-REFERENCE TO A RELATED APPLICATION

This application is a continuation-in-part of and claims priority to U.S. patent application Ser. No. 12/334,608, filed Dec. 15, 2008, inventors Bhaskar Kota et al., entitled "Media Action Script Acceleration Apparatus, System and Method" (the "related application"), which is commonly assigned herewith, the entire contents of which are incorporated herein by reference with the same full force and effect as if set forth in their entirety herein, and with priority claimed for all commonly disclosed subject matter.

FIELD OF THE INVENTION

The present invention, in general, relates to processing of different types or kinds of media or media content for user display, and more particularly, relates to hardware acceleration of media action scripts for graphical images and other multimedia content utilized in web pages and other internet-based communication.

BACKGROUND OF THE INVENTION

Action scripts (also known as "media action scripts" or "media action graphics") are typically string-based, tag-based, and/or bytecode-based interpretable files with variable-length operands providing corresponding data, which are used to provide rendering of many different types of media (hereinafter "multimedia") for visual display, audio playback, and other sensory feedback, such as the various scripting languages utilized for rendering web pages, graphics, animation, gaming and other multimedia content, which may be dynamic or static, including without limitation graphics, animation (e.g., as a dynamic graphical image changing over time), text, audio, video, pictures, photographs, sprites, and other images for display. Representative action scripts include Adobe Flash®, Sun Microsystems Javascript® and JavaFX®, Microsoft Silverlight®, HTML 5, ECMA Script, Scalable Vector Graphics ("SVG"), Vector Markup Language ("VML"), Precision Graphics Markup Language, "PGML"), Action Graphics, Adobe Flash® Lite™, Ruby, Perl, and Python, for example. In the prior art, such an action script is typically interpreted and subsequently executed using multiple layers of software (typically referred to as a software stack, a stack machine, or a protocol stack), operating as application layers and using an operation system within a general purpose computer, e.g., as part of or embedded within another application or program, such as by a media player or virtual machine operating as a first application layer or plug-in within a second application layer such as a web browser, using an operating system such as Windows® XP, Vista®, Apple Leopard®, or Linux®.

All of these various scripting languages are "string" or bytecode-based, as strings are known in the art as a sequence of characters which have been ASCII-encoded (American Standard Code for Information Interchange ("ASCII")), using string-based "tags" or bytecode (or their equivalent) with variable-length operands to indicate a desired graphical image or other type of image media (e.g., graphics (static and dynamic), animation (as dynamic graphics), gaming, text, sprites, etc.) that should be rendered, using specific or dedicated software for each type of action script, in a first application layer typically operating in conjunction with a second application layer. In addition, all of these various scripting languages are "interpreted" by another application, such that unlike most computer applications, they are not compiled to machine code, and generally are either string-based or are semi-compiled to bytecode, and do not comprise directly executable code (assembly code or machine code) which runs natively on a given microprocessor architecture. In addition, the graphical objects specified by such media action scripts are not specified pixel-by-pixel in a bitmapped or in a matrix form (in compressed or uncompressed forms), in contrast to the data comprising photographs (e.g., Joint Photographic Experts Group ("JPEG" or "jpeg") files) or video, such as an MPEG (Moving Picture Experts Group ("MPEG" or "mpeg") files) or an H.264 standard video macroblock having defined information for each pixel (which also may be compressed), followed by blocks indicating changed information, followed by another macroblock, and so on. For example, representative action scripts are currently interpreted using a Flash Media Player, Gnash, Mplayer, a Java virtual machine or another form of virtual machine or player as part of web browser operation, such as Internet Explorer, Safari, Google Chrome, Opera, Mozilla Firefox, Netscape Navigator, OmniWeb, Flock, Camino, SeaMonkey, Epiphany, etc., and further may include additional software calls for graphics primitives from graphics libraries, such as Cairo. Such an action script file is typically provided as part of a larger data file, such as a web page specified using a hypertext markup language ("HTML") or extensible markup language ("XML"), or more generally as part of a hypertext transfer protocol ("HTTP") data file. (It should also be noted that a "time" element is inherent in these scripting languages and file types, insofar as images which are perceived to be dynamic by the user, such as sprites and video, are comprised of a succession of static images (i.e., static during any given time interval (or frame), with the time intervals sufficiently short that the image succession is perceived as change and movement, for example).)

In prior art systems, such graphical rendering from an action script file provided as part of an HTML or XML file, for example, is a very demanding application, extremely computationally intensive, requiring execution of extensive software protocol stacks and application program interface ("API") calls, requiring significant microprocessor capability, and typically requiring at least one additional, separate graphics processor provided in a comparatively powerful computing system. For example, FIG. 1 is a diagram illustrating a representative, prior art software or protocol stack 10 for action script processing, and has been derived from published diagrams (which may be found at http://i.technet.microsoft.com/Cc749980.xwr_d16(en-us, TechNet.10).gif and http://www.elvenware.com/charlie/DirectX/DDrawArch-.bmp). In this representative protocol stack 10 each higher layer performs one or more software calls to the next lower software layer to process an HTTP (or HTML or XML) data file 5, any given layer may be recursive, and any lower layer may also call a higher level construct and return to a higher software level, and includes:

(1) Action script player or virtual machine application 15 in the application layer 30;
(2) web browser application 20 (also in the application layer 30);
(3) API calls 25 to another program (e.g., direct draw) from the web browser or action script player, such as GTK or X11 (also in the application layer 30);
(4) calls to a graphics device interface 35 in the operating system layer 40, such as calls to Open GL; and
(5) calls to a display device interface 45 (also in the operating system layer 40), which further includes:

(5a) calls to a display driver 50;

(5b) calls to an input/output (I/O) manager 55; and (5c) calls to a video port 60 and/or multimedia driver 65; which then finally provide machine-specific calls to hardware, illustrated as video card 70 (in hardware layer 75), for performing computation that actually results in pixel information for rendering the graphical image or object, which is then output to a display (155) (also in hardware layer 75). Processing of this software (or protocol) stack 10, with many intervening software layers before a hardware instruction is reached which performs the computations, is extraordinarily computationally intensive.

These demanding computational requirements have effectively eliminated the ability for such graphical rendering in most handheld devices or in comparatively less expensive computers which do not have significant graphics engines and/or sophisticated central processing units (CPUs). Because such prior art handheld and other devices do not have this significant processing capability, web-based graphics for such devices may not be provided at all, or are typically provided in modified, stripped-down or otherwise reduced versions, such as Flash Lite™, allowing only a subset of available web pages to be accessed, or result in such slow performance so as to render the device effectively unusable or inoperative. As another prior art alternative, HTTP requests from such devices are redirected to another, related web site which does not require rendering of such computationally-intensive action scripts, or such action scripts are simply not implemented altogether. In addition, these significant processing requirements have effectively required comparatively expensive computers, which are unavailable to many consumers in many markets throughout the world.

Various prior art attempts to accelerate processing of web pages have not addressed these demanding computational requirements and have not provided any mechanism to accelerate processing of action scripts. For example, Lemoine U.S. Patent Application Publication No. US 2006/0277459, published Dec. 7, 2006, discloses a method of accelerating processing of XML pages through XML caching, and more specifically by speculatively and asynchronously processing portions of the web page in advance, so that those portions are immediately available to the web browser if needed. While display to a user of an XML page may be accelerated, actual processing requirements have been increased using this method, as potentially unused portions of the web page have also been processed unnecessarily. In addition, no acceleration of action scripts or vector graphics has been provided or otherwise disclosed.

Similarly, Graffagnino et al. U.S. Patent Application Publication No. US 2008/0120626, published May 22, 2008, discloses a hardware accelerated web engine which caches parts of graphical images, and more specifically renders graphical images in parts and stores those parts separately, so that in the event those portions of the web page have not changed in a succeeding web page, these rendered parts may be re-used without re-rendering. While successive frames of a web page may be accelerated in this prior art method by re-using previously rendered and unchanged portions of images, the actual (or initial) rendering of the images themselves has not been accelerated in any way or form. In addition, this prior art method cannot provide any processing acceleration of graphical images which change from frame to frame, such as to indicate movement or rotation, which do not re-use previously rendered components.

These prior art acceleration methods have not addressed, and have not disclosed, any apparatus, method or system to accelerate the actual processing of an action script, such as Flash®, Silverlight®, JavaFX® or Javascript®, or even more generally, acceleration of the processing of vector graphics or SVG, to render a graphical image (or object). These prior art acceleration methods have not addressed, and have not disclosed, any apparatus, method or system to bypass all or any portions of the processing of the software protocol stack (10) currently utilized to process such an action script or vector graphics to render a graphical image (or object). Until the filing of the related application, this state of affairs had remained for over eighteen years.

Accordingly, a need remains for an apparatus, method and system which may accelerate the processing of an action script and related vector graphics and multimedia components that may be provided as part of a web page, a game, animation, or other types of data files. Such a hardware accelerator may eliminate the necessity of the complicated and inefficient prior art protocol stack, along with the often multiple traversals of the protocol stack, for providing graphics rendering. For example, an exemplary hardware accelerator may provide for one hardware layer between the browser 20 and display 155 of FIG. 1. Such a hardware accelerator also may be capable of implementation in a mobile device, a handheld device, a server, a television, an audio-visual (AV) receiver, a projector, telematics, or other devices, for example, without requiring both the significant microprocessor capability and/or the additional graphics processor of the prior art. Such an accelerator may also enable complete display of a graphical image without redirection to another, modified web site. Such an exemplary accelerator also may be readily updatable or reconfigurable to accommodate new, currently unknown types of action scripts, graphics or multimedia standards. Lastly, such an exemplary accelerator may be compatible with and transparent to existing processors and devices, and directly usable with such devices without requiring retrofitting or modification of such processors.

SUMMARY OF THE INVENTION

Exemplary embodiments of the claimed invention provide an apparatus, method and system to accelerate the actual processing of an action script (also referred to as a media action script and as further defined below), typically provided as part of a web page or other data file, such as Flash®, Silverlight®, JavaFX® and/or Javascript® or other media action scripts, to render a graphical image (or object) for visual display, also as further described and defined below. More generally, various exemplary accelerator embodiments also provide acceleration of the actual processing or conversions of vector graphics and scalable vector graphics data into pixel information for display on a selected display device. As mentioned above, such graphical images may be static or dynamic (as a succession of static graphical images to create the perception of dynamic images). Various exemplary accelerator embodiments also provide for processing of any incorporated audio and other multimedia components. Various exemplary accelerator embodiments eliminate the complicated, prior art software (or protocol) stacks and associated overhead for providing graphics rendering, and instead provide such graphics rendering at a hardware level. Many of the exemplary accelerator embodiments, in addition to rendering web pages for display, may also be utilized for other applications, including gaming, animation display, display of a graphical user interface ("GUI"), display of an electronic program guide ("EPG"), TV content over IP ("IPTV"), video on demand, personal video recorders, and telematics, for example.

In exemplary embodiments, the hardware action script accelerator may be implemented in any device having a visual display, such as a mobile device, a gaming device, a handheld device, or other devices such as televisions and monitors, without requiring both the significant microprocessor capability and the additional graphics processor of the prior art, and is able to provide a complete display of a graphical image without requiring redirection to another, modified web site. In other exemplary embodiments, the hardware action script accelerator may be implemented in any device, such as a server or other network computer. For these latter embodiments, the visual display may be located remotely from the device having the hardware accelerator, with the data to be utilized for the visual display of the graphical object transmitted or otherwise transferred over a network, such as the internet, to the display device. Several exemplary embodiments are also configurable and readily updatable to accommodate new, currently unknown types of action scripts or graphics standards. In addition, in various exemplary embodiments, the action script accelerator is compatible with and transparent to existing processors and devices, and directly usable with such devices without requiring retrofitting or modification of such processors.

One of the significant features of various exemplary action script accelerator embodiments is the elimination of the complicated, prior art protocol stack and associated overhead for providing graphics rendering. Instead, various exemplary embodiments directly convert the string-based tags, delimiters, attributes, values, bytecodes and descriptions of an action script into actionable instructions, generally as hardware-level operational codes with variable length operands, using a standardized format for data to form one or more control words, for direct execution by the hardware accelerator, also referred to herein as an action script processor. The various exemplary embodiments thereby provide significant hardware acceleration, enabling display of graphics images and objects in devices which otherwise do not have significant processing capabilities, such as televisions and mobile communication devices, low-cost laptop and notebook computers, mobile internet devices, telematics, and smartphones, for example and without limitation.

Another significant feature of several of the exemplary action script accelerator embodiments is the hardware processing acceleration of a wide variety of content as a graphical object, rather than as another data type. For example, text and sprites may be converted to corresponding graphical information (also as operational codes with variable length operands), and rendered as corresponding line segments to form a graphical area and fill of the graphical area, rather than requiring processing of a different type of information, such as processing of a font table (e.g., a font table included as part of an operating system in the prior art protocol stack).

One of the various exemplary embodiments is an apparatus for processing an action script for a graphical image for visual display, and comprises: a first memory to store data; and a plurality of processors to convert a plurality of descriptive elements of the action script into a plurality of operational codes and to perform one or more operations corresponding to an operational code of the plurality of operational codes to generate pixel data for the graphical image.

In one of the exemplary embodiments, a first processor of the plurality of processors may convert at least some descriptive elements of the plurality of descriptive elements of the action script into at least some operational codes and corresponding data, and a second processor of the plurality of processors may perform at least one operation corresponding to an operational code of the plurality of operational codes using corresponding data to generate pixel data for the graphical image.

In another one of the exemplary embodiments, a first processor of the plurality of processors may convert at least some descriptive elements of the plurality of descriptive elements of the action script into at least some operational codes and corresponding data, and may transfer at least some operational codes of the plurality of operational codes to a second processor and to a third processor of the plurality of processors, wherein the second processor may perform a first operation corresponding to a first operational code of the plurality of operational codes using corresponding data and the third processor may perform a second operation corresponding to a second operational code of the plurality of operational codes using corresponding data to generate pixel data for the graphical image.

In various exemplary embodiments, at least one processor of the plurality of processors may be coupled to the first memory through at least one of the following: an interconnection network, a configurable interconnect, a packet-based interconnect, a circuit-switched interconnect, a crosspoint switch, a serial bus, a parallel bus, or a network. Similarly, in another exemplary embodiment, a first processor of the plurality of processors may be coupled to a second processor of the plurality of processors through at least one of the following: the first memory, an interconnection network, a configurable interconnect, a packet-based interconnect, a circuit-switched interconnect, a crosspoint switch, a serial bus, a parallel bus, or a network.

In several of the various exemplary embodiments, at least one processor of the plurality of processors further may parse the action script into the plurality of descriptive elements and corresponding data, and at least one processor of the plurality of processors further may decode a descriptive element to determine a corresponding parsing operational code of the plurality of operational codes to control the parsing of the action script.

In one of the exemplary embodiments, the plurality of processors may further comprise: a decoder to determine a type of descriptive element; a parsing controller to determine or select a number of bits to parse parameter; a stream register to store a plurality of bits of the action script; and at least one barrel shifter to shift out of the stream register a number of bits designated by the number of bits to parse parameter.

Similarly, in another exemplary embodiment, at least one processor of the plurality of processors further may parse the action script into a plurality of temporally descriptive elements and corresponding data, and at least one processor of the plurality of processors further may parse the action script into a plurality of positionally descriptive elements and corresponding data.

In an exemplary embodiment, at least one processor of the plurality of processors further may extract data from the action script and store in the first memory a plurality of control words comprising the extracted data in predetermined fields, and the at least one processor of the plurality of processors further may store the plurality of operational codes and plurality of control words in a database structure. In another exemplary embodiment, at least one processor of the plurality of processors further may separate the action script from other data.

In various exemplary embodiments, each control word of the plurality of control words may comprise a starting or an ending x-coordinate and y-coordinate for a corresponding line or curve segment for the graphical image; each control word of the plurality of control words may further comprise a control x-coordinate and control y-coordinate for a corresponding curve segment for the graphical image; each control word of the plurality of control words may further comprise a first memory address for line style array for a corresponding line or curve segment for the graphical image and a second memory address for fill style array for a plurality of line or curve segments comprising the graphical image; and each control word of the plurality of control words may further comprise a line style array for a corresponding line or curve segment for the graphical image and a fill style array for a plurality of line or curve segments comprising the graphical image.

In various exemplary embodiments, the plurality of descriptive elements may be a plurality of tags or bytecodes. Similarly, in another exemplary embodiment, the plurality of descriptive elements may be a plurality of control tags, definition tags, and dictionary tags or dictionary repositories.

In one of the exemplary embodiments, an exemplary apparatus may further comprise a second memory to store the plurality of operational codes, wherein at least one processor of the plurality of processors further may convert the action script directly to the plurality of operational codes by performing a deterministic function on each descriptive element of the plurality of descriptive elements to generate a corresponding result and may use the result to determine a corresponding operational code of the plurality of operational codes. In another exemplary embodiment, an exemplary apparatus may further comprise a second memory to store a look up table having the plurality of operational codes, wherein at least one processor of the plurality of processors further may convert the action script directly to the plurality of operational codes by performing a hash function on each descriptive element of the plurality of descriptive elements to generate a corresponding hash result and may use the hash result as an index or entry into the look up table to determine a corresponding operational code of the plurality of operational codes.

In an exemplary embodiment, at least one processor of the plurality of processors further may decode each operational code of the plurality of operational codes to generate a corresponding plurality of control signals to control circuitry to perform a selected operation, of a plurality of operations, corresponding to a selected operational code of the plurality of operational codes.

In various exemplary embodiments, at least one processor of the plurality of processors may further comprise a floating point circuit, and wherein at least one processor of the plurality of processors further may generate a first corresponding control signal to enable the floating point circuit to perform the selected operation. In an exemplary embodiment, at least one processor of the plurality of processors further may generate a second corresponding control signal to select a floating point calculation result provided by the enabled floating point circuit. In another of the exemplary embodiments, at least one processor of the plurality of processors may further comprise an arithmetic logic unit, and wherein at least one processor of the plurality of processors further may decode an operational code of the plurality of operational codes to generate a corresponding plurality of control signals to select a calculation result generated by the arithmetic logic unit.

Similarly, in another exemplary embodiment, at least one processor of the plurality of processors may further comprise at least one arithmetic logic unit and at least one floating point circuit. An exemplary arithmetic logic unit may further comprise: an adder circuit; a subtractor circuit; a bitwise-OR logic circuit; a bitwise-AND logic circuit; a bitwise-exclusive OR logic circuit; a barrel shifter circuit; and an output multiplexer. An exemplary floating point circuit may further comprise: a floating point adder and subtractor circuit; a floating point multiplier circuit; a floating point divider circuit; a floating point comparator circuit; an integer-to-floating point converter circuit; a floating point-to-integer converter circuit; and an output multiplexer.

In an exemplary embodiment, at least one processor of the plurality of processors further may control two floating point comparator circuits to perform a comparison and may use results of the comparisons to perform a conditional branch operation during a single clock cycle. Similarly, in another exemplary embodiment, at least one processor of the plurality of processors further may control a plurality of floating point comparator circuits to perform at least four comparisons corresponding to four conditions and may use results of the comparisons to perform a conditional branch operation during a single clock cycle.

In another one of the exemplary embodiments, an exemplary apparatus may further comprise a configurable interconnect coupled to the at least one arithmetic logic unit and to the at least one floating point execution unit, with the configurable interconnect comprising: a multiport register; and a cross-point switch for configuration of a data path.

In various exemplary embodiments, at least one processor of the plurality of processors further may match a plurality of line or curve segments of a boundary of the graphical image, at least one processor of the plurality of processors further may determine a sequential ordering of the plurality of line or curve segments to form boundary coordinates of the graphical image, and/or at least one processor of the plurality of processors further may apply a fill style to generate pixel data for an area of the graphical image. In various exemplary embodiments, at least one processor of the plurality of processors further may apply a line style by forming a second graphical image from a boundary of the graphical image, and at least one processor of the plurality of processors further may apply a fill style to the second graphical image to generate pixel data for the line style.

In an exemplary embodiment, at least one processor of the plurality of processors may perform a Transmission Control Protocol ("TCP"), or Internet Protocol ("IP"), or both TCP and IP, for reception of a data file, at least one processor of the plurality of processors may perform hypertext transfer protocol ("HTTP") for reception of a data file, at least one processor of the plurality of processors further may pre-fetch referenced data of the data file, and/or at least one processor of the plurality of processors further may generate pixel data for hypertext markup language ("HTML") data, or extensible markup language ("XML") data, or both HTML and XML data of the data file.

In another one of the various exemplary embodiments, an exemplary apparatus may further comprise a frame buffer, wherein at least one processor of the plurality of processors further is to transfer the pixel data for the graphical image to the frame buffer and wherein at least one processor of the plurality of processors further is to transfer the pixel data for the HTML or XML data to the frame buffer. In yet another one of the various exemplary embodiments, an exemplary apparatus may further comprise: a frame buffer and a visual display, wherein at least one processor of the plurality of processors further may transfer the pixel data for the graphical image to the frame buffer and wherein at least one processor of the plurality of processors further may transfer the pixel data for the HTML or XML data to the visual display. In yet another one of the various exemplary embodiments, an exemplary apparatus may further comprise: a frame buffer and a display controller, wherein at least one processor of the plurality of processors further may transfer the pixel data for the graphical image to the frame buffer and wherein at least one processor of the plurality of processors further may transfer the pixel data for the HTML or XML data to the display controller.

In various exemplary embodiments, the plurality of processors may be embodied in a single integrated circuit. In an exemplary embodiment, the plurality of processors comprise a plurality of processor cores. In another exemplary embodiment, at least one processor of the plurality of processors may be at least one of the following: a field programmable gate array, an application-specific integrated circuit, a microprocessor, a processor core, a cell processor, a plurality of processor cores, a digital signal processor, a reduced instruction set processor, a reconfigurable processing element, a graphics processing unit, or a computing grid.

In various exemplary embodiments, the plurality of descriptive elements are a specification of at least one graphical image at least partially in a non-pixel-by-pixel form, or stated another way, the plurality of descriptive elements are a specification of at least one graphical image in a form which at least partially is not a pixel bitmap and at least partially is not a pixel matrix. In various exemplary embodiments, each operational code of the plurality of operational codes comprises at least one of the following: a hardware-level instruction, or a hardware-level sub-instruction, or a hardware-level control code, or a hardware-level binary instruction, or hardware-level configuration, or a hardware-level control signal, or hardware-level microcode. Also in various exemplary embodiments, the action script is a data file which has not been fully compiled to machine code and which comprises at least one descriptive element specifying the graphical image at least partially in a form which is not pixel-based, or stated another way, the action script is a data file specifying the graphical image at least partially using non-pixel data and which comprises an ASCII-encoded scripting language or bytecode. Similarly, in an exemplary embodiment, the graphical image is an image of any kind for visual display which has been specified at least partially in a form in the action script which is not a pixel bitmap and is not a pixel matrix.

In another one of the various exemplary embodiments, at least one processor of the plurality of processors may further comprise a hardware decoder to decode a selected operational code of the plurality of operational codes into at least one of the following: a hardware-level instruction, or a hardware-level sub-instruction, or a hardware-level binary instruction, or hardware-level configuration, or a hardware-level control signal, or hardware-level microcode.

In another one of the exemplary embodiments, an exemplary apparatus for processing an action script for a graphical image for visual display comprises: a first memory circuit to store data; and a plurality of processor circuits to separate the action script from other data, to parse the action script, to convert a plurality of descriptions of the action script into a plurality of operational codes, and to perform one or more operations in response to a selected operational code of the plurality of operational codes to generate pixel data for the graphical image.

In an exemplary embodiment, a first processor circuit of the plurality of processor circuits may convert at least some descriptions of the plurality of descriptions of the action script into at least some operational codes and corresponding data, and a second processor circuit of the plurality of processor circuits may perform at least one operation corresponding to an operational code of the plurality of operational codes using the corresponding data to generate pixel data for the graphical image. In another exemplary embodiment, a first processor circuit of the plurality of processor circuits may convert at least some descriptions of the plurality of descriptions of the action script into at least some operational codes and corresponding data, and may transfer at least some operational codes of the plurality of operational codes to a second processor circuit and to a third processor circuit of the plurality of processor circuits, wherein the second processor circuit may perform a first operation corresponding to a first operational code of the plurality of operational codes using corresponding data to generate pixel data for the graphical image and the third processor circuit may perform a second operation corresponding to a second operational code of the plurality of operational codes using corresponding data to generate pixel data for the graphical image.

In various exemplary embodiments, at least one processor circuit of the plurality of processor circuits further may parse the action script into the plurality of descriptions and corresponding data, and at least one processor circuit of the plurality of processor circuits further may decode a description of the plurality of descriptions to determine a corresponding parsing operational code of the plurality of operational codes to control the parsing of the action script.

In an exemplary embodiment, the plurality of processor circuits may further comprise: a parser circuit to parse the action script into the plurality of descriptions and the corresponding data; a converter circuit to convert the plurality of descriptions of the action script into the plurality of operational codes; and an execution circuit to use the corresponding data to perform the one or more operations in response to the selected operational code to generate the pixel data. In various exemplary embodiments, at least one processor circuit of the plurality of processor circuits may further comprise: a decoder circuit to decode a description to determine a corresponding parsing operational code of the plurality of operational codes to control the parsing of the action script by the parser circuit. Similarly, in various exemplary embodiments, at least one processor circuit of the plurality of processor circuits may further comprise a decoder circuit to decode each operational code of the plurality of operational codes to generate a corresponding plurality of control signals to control the execution circuit to perform the one or more operations corresponding to the selected operational code.

In various exemplary embodiments, the plurality of processor circuits may further comprise: a decoder to determine a type of description; a parsing controller to determine or select a number of bits to parse parameter; a stream register to store a plurality of bits of the action script; and at least one barrel shifter to shift out of the stream register a number of bits designated by the number of bits to parse parameter.

In an exemplary embodiment, at least one processor circuit of the plurality of processor circuits may further comprise a post-processing circuit to match a plurality of line or curve segments of a boundary of the graphical image and to determine a sequential ordering of the plurality of line or curve segments to form boundary coordinates of the graphical image. In another exemplary embodiment, at least one processor circuit of the plurality of processor circuits may further comprise a graphics rendering circuit to apply a fill style to generate pixel data for an area of the graphical image.

In another exemplary embodiment, an apparatus is disclosed for processing a data file for visual display of a graphical image, with the data file comprising interpretable descriptions of the graphical image in a non-pixel-bitmap form, and with the data file not having been fully compiled to a machine code. Such an exemplary apparatus comprises: a first memory storing corresponding data; and a plurality of processors to separate the data file from other data, to parse and convert the data file to a plurality of hardware-level operational codes and corresponding data, and to perform a plurality of operations in response to at least some hardware-level operational codes of the plurality of hardware-level operational codes to generate pixel data for the graphical image.

In another exemplary embodiment, an apparatus is disclosed for processing a data file for visual display of a graphical image, with the data file comprising at least one description of the graphical image in a non-pixel-bitmap form, and the data file further comprising data which is not fully compiled to executable machine code. Such an exemplary apparatus comprises: a first memory circuit; and a plurality of processor circuits to separate the data file from other data, to determine at least one parsing operational code of a plurality of hardware control codes to control parsing of the data file, to parse and convert the data file into corresponding data and at least some hardware control codes of the plurality of hardware control codes, to store in the first memory a plurality of control words comprising the corresponding data in predetermined fields, and to use the corresponding data to perform one or more operations in response to a selected hardware control code of the plurality of hardware control codes to generate pixel data for the graphical image.

In another exemplary embodiment, the plurality of processors are embodied utilizing a first processor and a second processor. An exemplary apparatus, for processing an action script for a graphical image for visual display, comprises: a first memory to store data; a first processor; and a second processor coupled to the first processor, the second processor to convert a plurality of descriptive elements of the action script into a plurality of operational codes and to perform one or more operations corresponding to an operational code of the plurality of operational codes to generate pixel data for the graphical image.

In yet another exemplary embodiment, an apparatus for processing an action script for a graphical image for visual display, comprises: a first memory circuit to store data; a first processor circuit to separate the action script from other data; and a second processor circuit coupled to the first processor circuit and to the first memory circuit, the second processor circuit to parse the action script, to convert a plurality of descriptions of the action script into a plurality of operational codes, and to perform one or more operations in response to a selected operational code of the plurality of operational codes to generate pixel data for the graphical image.

In another exemplary embodiment, an apparatus is disclosed for processing a data file for visual display of a graphical image, with the data file comprising interpretable descriptions of the graphical image in a non-pixel-bitmap form, and with the data file not having been fully compiled to a machine code. Such an exemplary apparatus comprises: a first memory storing corresponding data; a first processor to separate the data file from other data; and a second processor coupled to the first processor and to the memory, the second processor to parse and convert the data file to a plurality of hardware-level operational codes and corresponding data, and to perform a plurality of operations in response to at least some hardware-level operational codes of the plurality of hardware-level operational codes to generate pixel data for the graphical image.

In yet another exemplary embodiment, an apparatus is disclosed for processing a data file for visual display of a graphical image, with the data file comprising at least one description of the graphical image in a non-pixel-bitmap form, and with the data file further comprising data which is not fully compiled to executable machine code. Such an exemplary apparatus comprises: a first memory circuit storing corresponding data; a first processor to separate the data file from other data; and a second processor coupled to the first processor and to the memory, the second processor to use the corresponding data to perform one or more operations in response to a selected hardware control code of a plurality of hardware control codes to generate pixel data for the graphical image.

In another exemplary embodiment, a system is disclosed for processing an action script for a graphical image for visual display, with the system comprising: a network input and output interface to receive data; a first memory to store data; a frame buffer to store pixel data; and a plurality of processors to convert a plurality of descriptive elements of the action script into a plurality of operational codes, to perform one or more operations corresponding to an operational code of the plurality of operational codes to generate pixel data for the graphical image, and to transfer the pixel data to the frame buffer. Such an exemplary system embodiment may further comprise: a display controller coupled to the frame buffer to receive the pixel data; a display coupled to the display controller to visually display the graphical image; a user input and output interface; and/or an audio input and output interface.

In another exemplary embodiment, a system is disclosed for processing an action script for a graphical image for visual display, with the system comprising: a network input and output interface to receive data; a first memory circuit to store data; a frame buffer to store pixel data; and a plurality of processor circuits to separate the action script from other data, to parse the action script, to convert a plurality of descriptions of the action script into a plurality of operational codes, and to perform one or more operations in response to a selected operational code of the plurality of operational codes to generate pixel data for the graphical image.

In yet another exemplary embodiment, a system is disclosed for processing a data file for visual display of a graphical image, with the data file comprising interpretable descriptions of the graphical image in a non-pixel-bitmap form, and with the data file not having been fully compiled to a machine code. Such an exemplary system comprises: a network input and output interface to receive data; a first memory to store data; a frame buffer to store pixel data; a first memory storing corresponding data; and a plurality of processors to separate the data file from other data, to parse and convert the data file to a plurality of hardware-level operational codes and corresponding data, and to perform a plurality of operations in response to at least some hardware-level operational codes of the plurality of hardware-level operational codes to generate pixel data for the graphical image.

In another exemplary embodiment, a system is disclosed for processing a data file for visual display of a graphical image, with the data file comprising at least one description of the graphical image in a non-pixel-bitmap form, and with the data file further comprising data which is not fully compiled to executable machine code. Such an exemplary system comprises: a network input and output interface to receive the data file; a first memory; first circuitry to convert a plurality of descriptive elements of the data file into a plurality of operational codes; second circuitry to perform one or more operations corresponding to an operational code of the plurality of operational codes to generate pixel data for the graphical image; and a frame buffer to store the pixel data.

Such an exemplary system may further comprise: a display controller coupled to the frame buffer to receive the pixel data; a display coupled to the display controller, the display to visually display the graphical image; third circuitry to parse the data file into the plurality of descriptive elements and corresponding data; fourth circuitry to decode a descriptive element to determine a corresponding parsing operational code of the plurality of operational codes to control the parsing of the data file; fifth circuitry to extract data from the data file and to store the extracted data in the first memory as a plurality of control words having corresponding data in predetermined fields; sixth circuitry to decode each operational code of the plurality of operational codes to generate a corresponding plurality of control signals to control the second circuitry to perform a selected operation, of a plurality of operations, corresponding to a selected operational code of the plurality of operational codes; a configurable interconnect coupled to the first circuitry and the second circuitry, the configurable interconnect comprising a multiport register and a cross-point switch for configuration of a data path; seventh circuitry to match a plurality of line or curve segments of a boundary of the graphical image and to determine a sequential ordering of the plurality of line or curve segments to form boundary coordinates of the graphical image; eighth circuitry to separate the data file from other received data; ninth circuitry to perform hypertext transfer protocol ("HTTP"); and/or tenth circuitry to generate pixel data for hypertext markup language ("HTML") data, or extensible markup language ("XML") data, or both HTML and XML data of the data file.

In another exemplary embodiment, a hardware-implemented method is disclosed for processing an action script for visual display of a graphical image, with an exemplary method comprising: converting a plurality of descriptive elements of the action script into a plurality of operational codes which at least partially control at least one processor circuit of a plurality of processor circuits; and using at least one processor circuit of the plurality of processor circuits, performing one or more operations corresponding to an operational code of the plurality of operational codes to generate pixel data for the graphical image.

Such an exemplary method may further comprise: separating the action script from other data; and parsing the action script into the plurality of descriptive elements. Such an exemplary method also may further comprise: decoding a descriptive element of the plurality of descriptive elements to determine a corresponding parsing operational code of the plurality of operational codes to control the parsing of the action script. An exemplary parsing step may further comprise parsing the action script into corresponding data, and wherein the performing step further comprises performing the one or more operations using the corresponding data. The exemplary parsing step may further comprise: determining a type of descriptive element; determining or selecting a number of bits to parse to form a number of bits to parse parameter; and shifting out of a memory a number of bits designated by the number of bits to parse parameter. The exemplary parsing step also may further comprise: extracting data from the action script and storing the extracted data in a hardware memory in the form of a plurality of control words having corresponding data in predetermined fields.

An exemplary converting step may further comprise: performing a deterministic operation on each descriptive element of the plurality of descriptive elements to generate a corresponding result; and using the corresponding result to determine a corresponding operational code of the plurality of operational codes. An exemplary converting step also may further comprise: performing a hash operation on each descriptive element of the plurality of descriptive elements to generate a corresponding hash result; and using the hash result to determine a corresponding operational code of the plurality of operational codes.

An exemplary performing step may further comprise: decoding a selected operational code of the plurality of operational codes to generate a corresponding plurality of control signals to at least partially control at least one processor circuit of the plurality of processor circuits to perform a selected operation, of a plurality of operations, corresponding to the selected operational code of the plurality of operational codes.

Such an exemplary method also may further comprise: matching a plurality of line or curve segments of a boundary of the graphical image; determining a sequential ordering of the plurality of line or curve segments to form boundary coordinates of the graphical image; applying a fill style to generate pixel data for an area of the graphical image; applying a line style by forming a second graphical image from a boundary of the graphical image; and/or applying a fill style to the second graphical image to generate pixel data for the line style.

Various exemplary methods also may further comprise: performing a Transmission Control Protocol ("TCP"), or Internet Protocol ("IP"), or both TCP and IP, for reception of a data file; performing a hypertext transfer protocol ("HTTP") for reception of a data file; pre-fetching referenced data of the data file; generating pixel data for hypertext markup language ("HTML") data, or extensible markup language ("XML") data, or both HTML and XML data; and/or merging the pixel data for the graphical image with pixel data for the hypertext markup language ("HTML") or extensible markup language ("XML") data.

Various exemplary methods also may further comprise: using a first processor circuit of the plurality of processor circuits to convert at least some descriptive elements of the plurality of descriptive elements of the action script into at least some operational codes and corresponding data; and using a second processor circuit of the plurality of processor circuits to perform at least one operation corresponding to an operational code of the plurality of operational codes using corresponding data to generate pixel data for the graphical image.

Yet another exemplary method may further comprise: using a first processor circuit of the plurality of processor circuits to convert at least some descriptive elements of the plurality of descriptive elements of the action script into at least some operational codes and corresponding data; using the first processor circuit of the plurality of processor circuits to transfer at least some operational codes of the plurality of operational codes to a second processor circuit and to a third processor circuit of the plurality of processor circuits; using the second processor circuit to perform a first operation corresponding to a first operational code of the plurality of operational codes using corresponding data to generate pixel data for the graphical image; and using the third processor circuit to perform a second operation corresponding to a second operational code of the plurality of operational codes using corresponding data to generate pixel data for the graphical image.

Another exemplary hardware-implemented method of processing an action script for visual display of a graphical image is also disclosed, with the exemplary method comprising: using a first processor circuit, separating the action script from other data; and using a second processor circuit, parsing the action script into a plurality of descriptive elements; converting the plurality of descriptive elements into a plurality of operational codes which at least partially control the second processor circuit; and performing one or more operations corresponding to an operational code of the plurality of operational codes to generate pixel data for the graphical image.

Yet another exemplary method of processing an action script for visual display of a graphical image comprises: converting a plurality of descriptive elements of the action script into a plurality of hardware operational codes; and performing one or more operations corresponding to a hardware operational code of the plurality of hardware operational codes to generate pixel data for the graphical image; wherein the method is performed automatically by a system comprising one or more computing devices.

Yet another exemplary method is disclosed for processing a data file for visual display of a graphical image, with the data file comprising interpretable descriptions of the graphical image in a non-pixel-bitmap form, and with the data file not having been fully compiled to a machine code, with an exemplary method comprising: separating the data file from other data; parsing and converting the data file to a plurality of hardware-level operational codes and corresponding data; and performing a plurality of operations in response to at least some hardware-level operational codes of the plurality of hardware-level operational codes to generate pixel data for the graphical image; wherein the method is performed automatically by a system comprising one or more computing devices.

Exemplary one or more computing devices may comprise at least one of the following: a field programmable gate array, an application-specific integrated circuit, a microprocessor, a processor core, a cell processor, a plurality of processor cores, a digital signal processor, a reduced instruction set processor, a reconfigurable processing element, a graphics processing unit, a computer, a server, or a computing grid.

Another exemplary embodiment is an apparatus for processing an action script for visual display of a graphical image. The exemplary apparatus comprises: a first memory; first circuitry configured to convert a plurality of descriptive elements of the action script into a plurality of operational codes; and second circuitry configured to perform an operation corresponding to an operational code of the plurality of operational codes using corresponding data stored in the first memory to generate pixel data for the graphical image.

Such an exemplary apparatus may further comprise third circuitry configured to parse the action script into the plurality of descriptive elements and the corresponding data, and may also include fourth circuitry configured to decode a descriptive element to determine a corresponding parsing operational code of the plurality of operational codes to control the parsing of the action script. In this exemplary embodiment, the third circuitry may further comprise: a decoder configured to determine a type of descriptive element; a parsing controller coupled to the decoder and configured to determine or select a number of bits to parse parameter; a stream register configured to store a plurality of bits of the action script; and at least one barrel shifter configured to shift out of the stream register a number of bits designated by the number of bits to parse parameter.

In various exemplary embodiments, the apparatus may further comprise fifth circuitry configured to extract data from the action script and to store the extracted data in the first memory as a plurality of control words having the corresponding data in predetermined fields. In addition, the first memory may be further configured to store the plurality of operational codes and plurality of control words in a database structure. The exemplary apparatus may further comprise sixth circuitry configured to separate the action script from other data.

In various exemplary embodiments, the apparatus may further comprise a second memory storing the plurality of operational codes, wherein the first circuitry is further configured to convert the action script directly to the plurality of operational codes by performing a deterministic function on each descriptive element of the plurality of descriptive elements to generate a corresponding result and to use the result to determine a corresponding operational code of the plurality of operational codes. For example, the exemplary apparatus may further comprise a second memory storing a look up table having the plurality of operational codes, wherein the first circuitry is further configured to convert the action script directly to the plurality of operational codes by performing a hash function on each descriptive element of the plurality of descriptive elements to generate a corresponding hash result and to use the hash result as an index or entry into the look up table to determine a corresponding operational code of the plurality of operational codes.

In various exemplary embodiments, the apparatus may further comprise seventh circuitry configured to decode each operational code of the plurality of operational codes to generate a corresponding plurality of control signals to control the second circuitry to perform a selected operation, of a plurality of operations, corresponding to a selected operational code of the plurality of operational codes. For example, the second circuitry may further comprise a floating point circuit, and wherein the seventh circuitry is further configured to generate a first corresponding control signal to enable the floating point circuit to perform the selected operation, and/or to generate a second corresponding control signal to select a floating point calculation result provided by the enabled floating point circuit. Also for example, the second circuitry may further comprise an arithmetic logic unit, wherein the seventh circuitry is further configured to decode an operational code of the plurality of operational codes to generate a corresponding plurality of control signals to select a calculation result generated by the arithmetic logic unit.

In an exemplary embodiment, the second circuitry further comprises at least one arithmetic logic unit; and at least one floating point circuit. An exemplary arithmetic logic unit may further comprise: an adder circuit; a subtractor circuit; a bitwise-OR logic circuit; a bitwise-AND logic circuit; a bitwise-exclusive OR logic circuit; a barrel shifter circuit; and an output multiplexer. An exemplary floating point circuit may further comprise: a floating point adder and subtractor circuit; a floating point multiplier circuit; a floating point divider circuit; a floating point comparator circuit; an integer-to-floating point converter circuit; a floating point-to-integer converter circuit; and an output multiplexer. In addition, the exemplary apparatus may further comprise a control circuit configured to control two floating point comparator circuits to perform a comparison and to use results of the comparisons to perform a conditional branch operation during a single clock cycle, or a control circuit configured to control a plurality of floating point comparator circuits to perform at least four comparisons corresponding to four conditions and to use results of the comparisons to perform a conditional branch operation during a single clock cycle. In various exemplary embodiments, the apparatus may further comprise a configurable interconnect coupled to the at least one arithmetic logic unit and to the at least one floating point execution unit, with the configurable interconnect comprising: a multiport register; and a cross-point switch for configuration of a data path.

Exemplary apparatus embodiments may further comprise: eighth circuitry configured to match a plurality of line or curve segments of a boundary of the graphical image, which may be further configured to determine a sequential ordering of the plurality of line or curve segments to form boundary coordinates of the graphical image; ninth circuitry configured to apply a fill style to generate pixel data for an area of the graphical image; tenth circuitry configured to apply a line style by forming a second graphical image from a boundary of the graphical image, and wherein the ninth circuitry is further configured to apply a fill style to the second graphical image to generate pixel data for the line style; eleventh circuitry configured to perform a Transmission Control Protocol ("TCP") or Internet Protocol ("IP") for reception of a data file; twelfth circuitry configured to perform hypertext transfer protocol ("HTTP") for reception of a data file; thirteenth circuitry configured to pre-fetch referenced data of the data file; and/or fourteenth circuitry configured to generate pixel data for hypertext markup language ("HTML") or extensible markup language ("XML") data of the data file.

In various exemplary embodiments, the apparatus may further comprise a frame buffer; wherein the second circuitry is further configured to transfer the pixel data for the graphical image to the frame buffer and wherein the fourteenth circuitry is further configured to transfer the pixel data for the HTML or XML data to the frame buffer. In other exemplary embodiments, the apparatus may further comprise: a frame buffer; and a visual display; wherein the second circuitry is further configured to transfer the pixel data for the graphical image to the frame buffer and wherein the fourteenth circuitry is further configured to transfer the pixel data for the HTML or XML data to the visual display. In yet other exemplary embodiments, the apparatus may further comprise: a frame buffer; and a display controller; wherein the second circuitry is further configured to transfer the pixel data for the graphical image to the frame buffer and wherein the fourteenth circuitry is further configured to transfer the pixel data for the HTML or XML data to the display controller. In other exemplary embodiments, the second circuitry may further comprise a frame buffer memory circuit, and the apparatus may further comprise a display controller, wherein the second circuitry is further configured to transfer the pixel data for the graphical image to the display controller and wherein the fourteenth circuitry is further configured to transfer the pixel data for the HTML or XML data to the display controller.

In various exemplary embodiments, the first circuitry and the second circuitry may be embodied in a single integrated circuit. In addition, the first circuitry and the second circuitry may further comprise a plurality of processor cores, or one or more processors, or FPGAs, or GPUs, or otherwise be embodied using any type of circuitry, which may be co-located or remotely located, etc., as discussed in greater detail below.

In various exemplary embodiments, the plurality of descriptive elements (individually or collectively) are a specification of at least one graphical image in a form which at least partially is not pixel-by-pixel. For example, the plurality of descriptive elements may be a specification of at least one graphical image in a form which at least partially is not a pixel bitmap or a pixel matrix. Also in various exemplary embodiments, each operational code of the plurality of operational codes is a hardware-level instruction. In addition, the second circuitry may further comprise a hardware decoder configured to decode a selected operational code of the plurality of operational codes into a plurality of hardware-level microcode, or hardware-level binary instructions, or hardware-level control signals. In various exemplary embodiments, the action script is a data file which has not been fully compiled to machine code and which comprises at least one descriptive element specifying the graphical image at least partially in a non-pixel-by-pixel form (and/or a non-macroblock or non-frame form), and the graphical image is an image of any kind for visual display which has been specified at least partially in a non-pixel-by-pixel form in the action script. For example, the action script may be a data file specifying the graphical image at least partially in a non-pixel-by-pixel form and which comprises an ASCII-encoded scripting language or bytecode.

Another exemplary apparatus for processing an action script for visual display of a graphical image comprises: a first memory circuit; a parser circuit to parse the action script into a plurality of descriptive elements and corresponding data; a converter circuit to convert the plurality of descriptive elements of the action script into a plurality of operational codes; and an execution circuit to perform a selected operation in response to a selected operational code of the plurality of operational codes using corresponding data stored in the first memory circuit to generate pixel data for the graphical image.

The exemplary apparatus may further comprise: a decoder circuit to decode a descriptive element to determine a corresponding parsing operational code of the plurality of operational codes to control the parsing of the action script by the parser circuit. For example, the decoder circuit may further comprise: a decoder to determine a type of descriptive element; and wherein the parser circuit may further comprise: a parsing controller to determine or select a number of bits to parse parameter; a stream register to store a plurality of bits of the action script; and at least one barrel shifter to shift out of the stream register a number of bits designated by the number of bits to parse parameter.

The exemplary parser circuit further may extract data from the action script and to store the extracted data in the first memory as a plurality of control words having the corresponding data in predetermined fields. In addition, the first memory may further store the plurality of operational codes and plurality of control words in a database structure.

The exemplary apparatus may further comprise: a second memory storing a look up table having the plurality of operational codes, wherein the converter circuit further is to perform a hash function on each descriptive element of the plurality of descriptive elements to generate a corresponding hash result and to use the hash result as an index or entry into the look up table to determine a corresponding operational code of the plurality of operational codes. In various exemplary embodiments, the apparatus may further comprise a decoder circuit to decode each operational code of the plurality of operational codes to generate a corresponding plurality of control signals to control the execution circuit to perform the selected operation, of a plurality of operations, corresponding to the selected operational code of the plurality of operational codes.

In various exemplary embodiments, the apparatus may further comprise a post-processing circuit to match a plurality of line or curve segments of a boundary of the graphical image and to determine a sequential ordering of the plurality of line or curve segments to form boundary coordinates of the graphical image, and a graphics rendering circuit to apply a fill style to generate pixel data for an area of the graphical image. The execution circuit may further apply a line style by forming a second graphical image from a boundary of the graphical image, and wherein the graphics rendering circuit further is to apply a fill style to the second graphical image to generate pixel data for the line style.

In various exemplary embodiments, the apparatus may further comprise a first processor to separate the action script from other data. The first processor may be further configured to perform hypertext transfer protocol ("HTTP") for reception of a data file and to generate pixel data for hypertext markup language ("HTML") or extensible markup language ("XML") data of the data file. In various exemplary embodiments, the apparatus may further comprise: a frame buffer, wherein the graphics rendering circuit is further configured to transfer the pixel data for the graphical image to the frame buffer and wherein the first processor is further configured to transfer the pixel data for the HTML or XML data to the frame buffer. In other various exemplary embodiments, the apparatus may further comprise: a frame buffer; and a visual display; wherein the graphics rendering circuit is further configured to transfer the pixel data for the graphical image to the frame buffer and wherein the first processor is further configured to transfer the pixel data for the HTML or XML data to the visual display. In yet other various exemplary embodiments, the apparatus may further comprise: a frame buffer; and a display controller; wherein the graphics rendering circuit is further configured to transfer the pixel data for the graphical image to the frame buffer and wherein the first processor is further configured to transfer the pixel data for the HTML or XML data to the display controller.

Another exemplary embodiment provides a system for processing an action script for visual display of a graphical image. The exemplary system comprises: a network input and output interface configured to receive data; a first memory circuit; first circuitry configured to convert a plurality of descriptive elements of the action script into a plurality of operational codes; second circuitry configured to perform an operation corresponding to an operational code of the plurality of operational codes using corresponding data stored in the first memory to generate pixel data for the graphical image; and a frame buffer to store the pixel data. The exemplary system may further comprise a display controller coupled to the frame buffer to receive the pixel data; and a display coupled to the display controller and configured to visually display the graphical image.

In various exemplary embodiments, the system may further comprise: third circuitry configured to parse the action script into the plurality of descriptive elements and the corresponding data, and/or fourth circuitry configured to decode a descriptive element to determine a corresponding parsing operational code of the plurality of operational codes to control the parsing of the action script. For example, the third circuitry may further comprise: a decoder configured to determine a type of descriptive element; a parsing controller coupled to the decoder and configured to determine or select a number of bits to parse parameter; a stream register configured to store a plurality of bits of the action script; and at least one barrel shifter configured to shift out of the stream register a number of bits designated by the number of bits to parse parameter. The exemplary system may further comprise fifth circuitry configured to extract data from the action script and to store the extracted data in the first memory as a plurality of control words having the corresponding data in predetermined fields; sixth circuitry configured to decode each operational code of the plurality of operational codes to generate a corresponding plurality of control signals to control the second circuitry to perform a selected operation, of a plurality of operations, corresponding to a selected operational code of the plurality of operational codes; seventh circuitry configured to match a plurality of line or curve segments of a boundary of the graphical image and to determine a sequential ordering of the plurality of line or curve segments to form boundary coordinates of the graphical image; eighth circuitry configured to separate the action script from other received data; ninth circuitry configured to perform hypertext transfer protocol ("HTTP"); and/or tenth circuitry configured to generate pixel data for hypertext markup language ("HTML") or extensible markup language ("XML") data of the data file.

In various exemplary embodiments, the second circuitry may be further configured to transfer the pixel data for the graphical image to the frame buffer and wherein the tenth circuitry is further configured to transfer the pixel data for the HTML or XML data to the frame buffer. The exemplary system may further comprise a visual display, wherein the second circuitry is further configured to transfer the pixel data for the graphical image to the frame buffer and wherein the tenth circuitry is further configured to transfer the pixel data for the HTML or XML data to the visual display. In other exemplary embodiments, the system may further comprise: a display controller, wherein the second circuitry is further configured to transfer the pixel data for the graphical image to the frame buffer and wherein the tenth circuitry is further configured to transfer the pixel data for the HTML or XML data to the display controller.

In various exemplary embodiments, the first circuitry, the second circuitry, the eighth circuitry, the ninth circuitry, and the tenth circuitry are embodied in a single integrated circuit. In other exemplary embodiments, the first circuitry, the second circuitry, the eighth circuitry, the ninth circuitry, and the tenth circuitry further comprise a plurality of processor cores, or one or more processors, or FPGAs, or GPUs, or otherwise be embodied using any type of circuitry, which may be co-located or remotely located, etc., as discussed in greater detail below.

An exemplary hardware-implemented method of processing an action script for visual display of a graphical image is also disclosed. The exemplary method comprises: parsing the action script into a plurality of descriptive elements and a corresponding data; storing the corresponding data in a hardware memory; converting the plurality of descriptive elements to a plurality of operational codes which control execution circuitry; and using the execution circuitry, performing an operation corresponding to an operational code of the plurality of operational codes using the corresponding data to generate pixel data for the graphical image. In various exemplary embodiments, the hardware-implemented method may further comprise separating the action script from other data, and/or decoding a descriptive element of the action script to determine a corresponding parsing operational code of the plurality of operational codes to control the parsing of the action script.

In various exemplary embodiments, the converting step may further comprise: performing a hash operation on each descriptive element of the plurality of descriptive elements to generate a corresponding hash result; and using the hash result to determine a corresponding operational code of the plurality of operational codes. In addition, the parsing step may further comprise: determining a type of descriptive element; determining or selecting a number of bits to parse to form a number of bits to parse parameter; and shifting out of the stream register a number of bits designated by the number of bits to parse parameter. In other exemplary embodiments, the parsing step may further comprise extracting data from the action script and storing the extracted data in the hardware memory in the form of a plurality of control words having the corresponding data in predetermined fields. In addition, the performing step may further comprise decoding a selected operational code of the plurality of operational codes to generate a corresponding plurality of control signals to control the execution circuit to perform a selected operation, of a plurality of operations, corresponding to the selected operational code of the plurality of operational codes.

In exemplary embodiments, the hardware-implemented method also may further comprise matching a plurality of line or curve segments of a boundary of the graphical image; determining a sequential ordering of the plurality of line or curve segments to form boundary coordinates of the graphical image; and/or applying a fill style to generate pixel data for an area of the graphical image. In addition, the method may further comprise: applying a line style by forming a second graphical image from a boundary of the graphical image; and applying a fill style to the second graphical image to generate pixel data for the line style.

The exemplary hardware-implemented method also may further comprise: generating pixel data for hypertext markup language ("HTML") or extensible markup language ("XML") data, and merging the pixel data for the graphical image with pixel data for the hypertext markup language ("HTML") or extensible markup language ("XML") data.

In various exemplary embodiments, another system for processing an action script for visual display of a graphical image is also provided. The exemplary system comprises: a network input and output interface to receive a data file; a user input and output interface; a first memory; a frame buffer to store the pixel data; first circuitry to separate the action script from other data; second circuitry to parse the action script into the plurality of descriptive elements and corresponding data and to store the corresponding data in the first memory as a plurality of control words having the corresponding data in predetermined fields; third circuitry to convert a plurality of descriptive elements of the action script into a plurality of hardware operational codes; fourth circuitry to perform an operation corresponding to an operational code of the plurality of hardware operational codes using the corresponding data stored in the first memory to generate first pixel data for the graphical image and to transfer the first pixel data to the frame buffer; and fifth circuitry configured to generate second pixel data for hypertext markup language ("HTML") or extensible markup language ("XML") data of the data file and to transfer the second pixel data to the frame buffer.

Other exemplary embodiments are also disclosed. Another exemplary apparatus comprises: a first processor configured to separate the action script from other data; and a second processor coupled to the first processor, the second processor configured to parse and convert the action script into a plurality of operational codes, and to execute the plurality of operational codes using corresponding data to generate pixel data for the graphical image.

Yet another exemplary apparatus embodiment comprises: a memory; and a processor configured to parse and convert the action script into a plurality of operational codes, and to execute the plurality of operational codes using corresponding data stored in the memory to generate pixel data for the graphical image. In another exemplary apparatus embodiment, the apparatus comprises: a memory; and a processor configured to separate the action script from other data, to parse and convert the action script into a plurality of operational codes, and to execute the plurality of operational codes using corresponding data to generate pixel data for the graphical image.

Another exemplary embodiment provides an apparatus for processing a data file for visual display, with the data file including an action script file for a graphical image. In this exemplary embodiment, the apparatus comprises: a first processor configured to identify and separate the action script file from the data file; and a second processor coupled to the first processor, the second processor configured to parse the action script file, to convert the parsed action script file directly to a plurality of operational codes and a plurality of control words having corresponding data in predetermined fields, and to execute the plurality of operational codes using the corresponding data to generate pixel information for the graphical image.

Another exemplary embodiment is an integrated circuit apparatus for processing an action script file for a graphical image for visual display. The exemplary integrated circuit comprises: a first circuit to parse the action script file; a second circuit coupled to the first circuit, the second circuit to convert the parsed action script file directly to a plurality of operational codes; a third circuit to generate a plurality of control signals from a selected operational code of the plurality of operational codes; and a fourth circuit coupled to the third circuit, the fourth circuit to generate pixel information for the graphical image in response to the plurality of control signals.

In addition, an exemplary apparatus for processing an action script file for a graphical image for visual display is also disclosed, in which the apparatus comprises: a parser circuit to parse the action script file and to convert data of the parsed action script file to a plurality of control words having data in predetermined fields; a converter circuit to convert a plurality of parsed tags or bytecodes of the parsed action script file to a corresponding plurality of instructions, each instruction of the plurality of instructions having an address pointer to a corresponding control word of the plurality of control words; and an execution circuit to execute the plurality of instructions natively using the corresponding data to generate pixel information for the graphical image.

Lastly, another exemplary system is disclosed, comprising: an input and output interface configured to receive a data file for visual display, the data file including an action script file for a graphical image; a first processor configured to separate the action script file from the data file; a memory circuit coupled to the first processor; a frame buffer coupled to the first processor; a second processor coupled to the first processor, to the memory and to the frame buffer, the second processor configured to parse the action script file, to convert the parsed action script file directly to a plurality of operational codes and a plurality of control words having corresponding data in predetermined fields, and to execute the plurality of operational codes using the corresponding data to generate pixel information for the graphical image and to transfer the pixel information to the frame buffer; a display controller coupled to the frame buffer; and a display configured to visually display the graphical image.

Numerous other advantages and features of the claimed invention will become readily apparent from the following detailed description of the invention and the embodiments thereof, from the claims and from the accompanying drawings.

BRIEF DESCRIPTION OF THE DRAWINGS

The objects, features and advantages of the claimed invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

Figure (or "FIG.") 1 is a diagram illustrating a prior art software protocol stack for action script processing.

Figure (or "FIG.") 2 is a block diagram illustrating an exemplary network and exemplary network components having system and apparatus embodiments in accordance with the teachings of the present invention.

Figure (or "FIG.") 3 is a block diagram illustrating in greater detail an exemplary first system embodiment and exemplary first and second apparatus embodiments in accordance with the teachings of the present invention.

Figure (or "FIG.") 4 is a block diagram illustrating in greater detail an exemplary second system embodiment and exemplary first and third apparatus embodiments in accordance with the teachings of the present invention.

Figure (or "FIG.") 5 is a block diagram illustrating in greater detail an exemplary third system embodiment and exemplary fourth and fifth apparatus embodiments in accordance with the teachings of the present invention.

Figure (or "FIG.") 6 is a diagram illustrating, at a high or conceptual level, operation of an exemplary system embodiment in accordance with the teachings of the present invention.

Figure (or "FIG.") 7 is a diagram illustrating, at a high or conceptual level, exemplary graphical rendering by an exemplary system embodiment in accordance with the teachings of the present invention.

Figure (or "FIG.") 8 is a block diagram illustrating in greater detail an exemplary third action script processor embodiment and sixth apparatus embodiment in accordance with the teachings of the present invention.

Figure (or "FIG.") 9 is a block and circuit diagram illustrating exemplary parser circuit and converter circuit embodiments in accordance with the teachings of the present invention.

Figure (or "FIG.") 10 is a diagram illustrating exemplary control and data fields of a control word embodiment in accordance with the teachings of the present invention.

Figure (or "FIG.") 11 is a block diagram illustrating in greater detail an exemplary fourth action script processor embodiment and seventh apparatus embodiment in accordance with the teachings of the present invention.

Figure (or "FIG.") 12 is a block diagram illustrating an exemplary floating point unit embodiment in accordance with the teachings of the present invention.

Figure (or "FIG.") 13 is a block diagram illustrating an exemplary arithmetic logic unit embodiment in accordance with the teachings of the present invention.

Figure (or "FIG.") 14 is a block diagram illustrating an exemplary post-processing graphics circuit embodiment in accordance with the teachings of the present invention.

Figure (or "FIG.") 15 is a block diagram illustrating an exemplary graphics rendering circuit embodiment in accordance with the teachings of the present invention.

Figure (or "FIG.") 16 is a block diagram illustrating an exemplary reconfigurable interconnect embodiment in accordance with the teachings of the present invention.

Figure 17A:
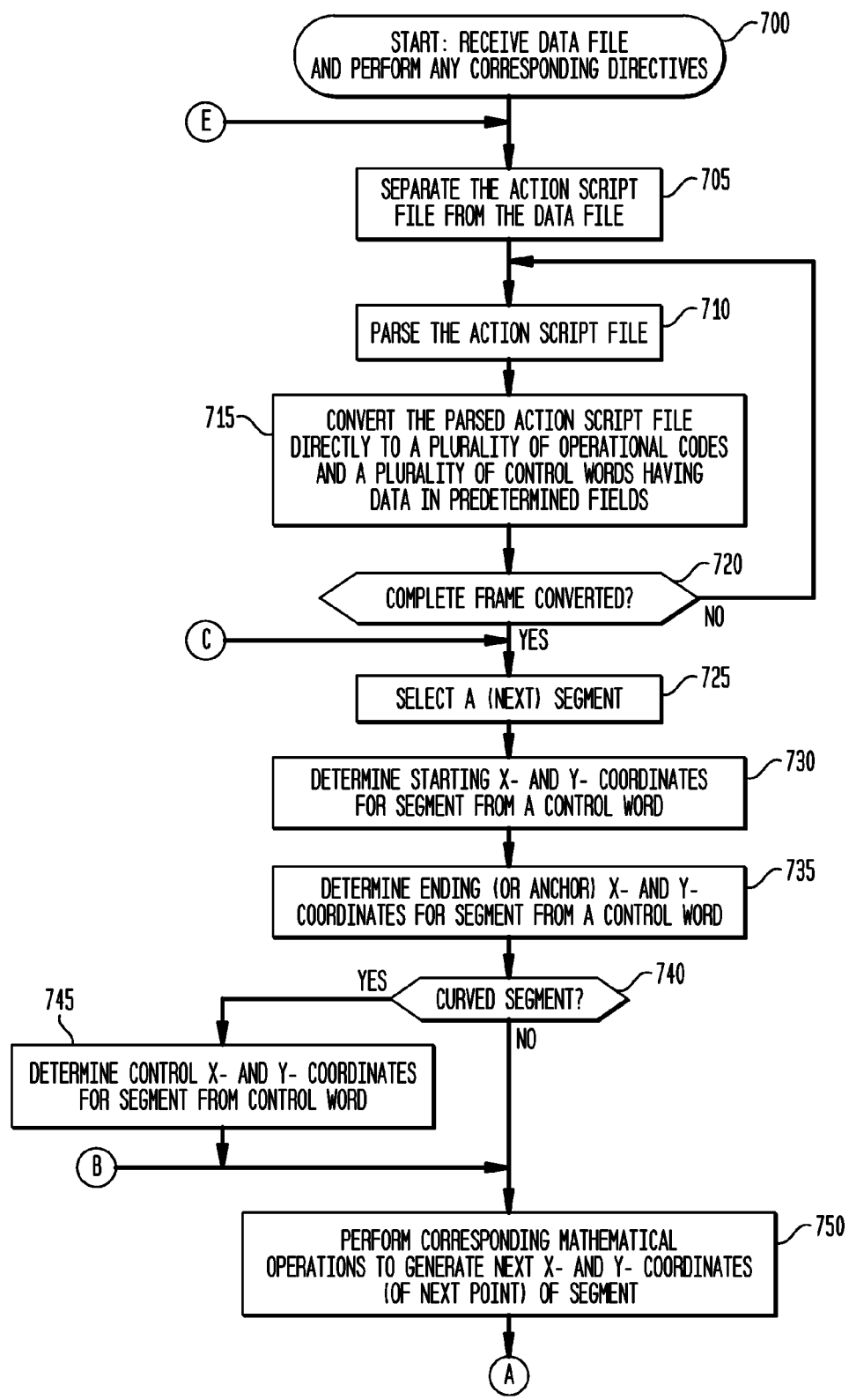
Figure 17C:
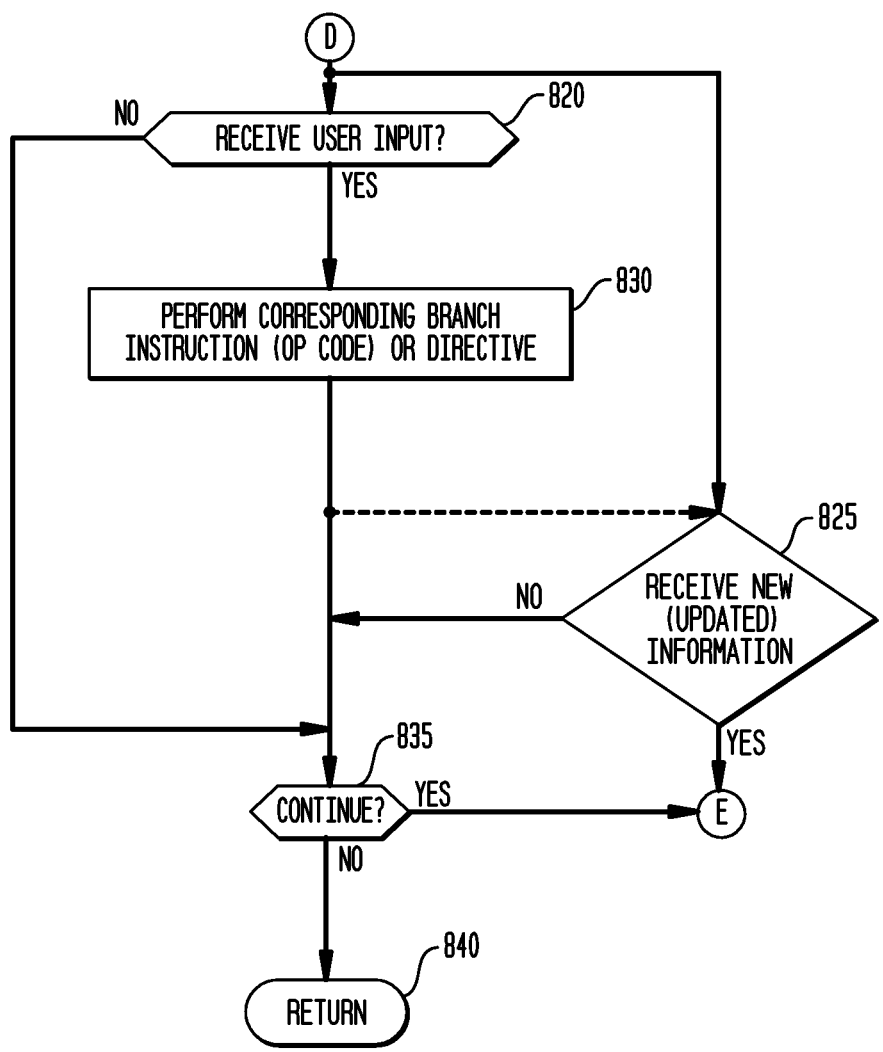

Figure (or "FIG.") 17, divided into FIGS. 17A, 17B, and 17C, is a flow diagram illustrating an exemplary method embodiment in accordance with the teachings of the present invention.

Figure (or "FIG.") 18 is a block diagram illustrating in greater detail an exemplary fourth system embodiment, fifth, sixth and seventh action script processor embodiments, and additional apparatus embodiments in accordance with the teachings of the present invention.

Figure (or "FIG.") 19 is a block diagram illustrating in greater detail an exemplary fifth system embodiment and additional apparatus embodiments in accordance with the teachings of the present invention.

DETAILED DESCRIPTION OF EXEMPLARY EMBODIMENTS

While the claimed invention is susceptible of embodiment in many different forms, there are shown in the drawings and will be described herein in detail specific examples and embodiments thereof, with the understanding that the present disclosure is to be considered as an exemplification of the principles of the invention and is not intended to limit the invention to the specific examples and embodiments illustrated, and that numerous variations or modifications from the described embodiments may be possible and are considered equivalent. In this respect, before explaining at least one embodiment consistent with the claimed invention in detail, it is to be understood that the invention is not limited in its application to the details of construction and to the arrangements of components set forth above and below, illustrated in the drawings, or as described in the examples. Methods, systems and apparatuses consistent with the claimed invention are capable of other embodiments and of being practiced and carried out in various ways. Also, it is to be understood that the phraseology and terminology employed herein, as well as the abstract included below, are for the purposes of description and should not be regarded as limiting.

Figure 2:
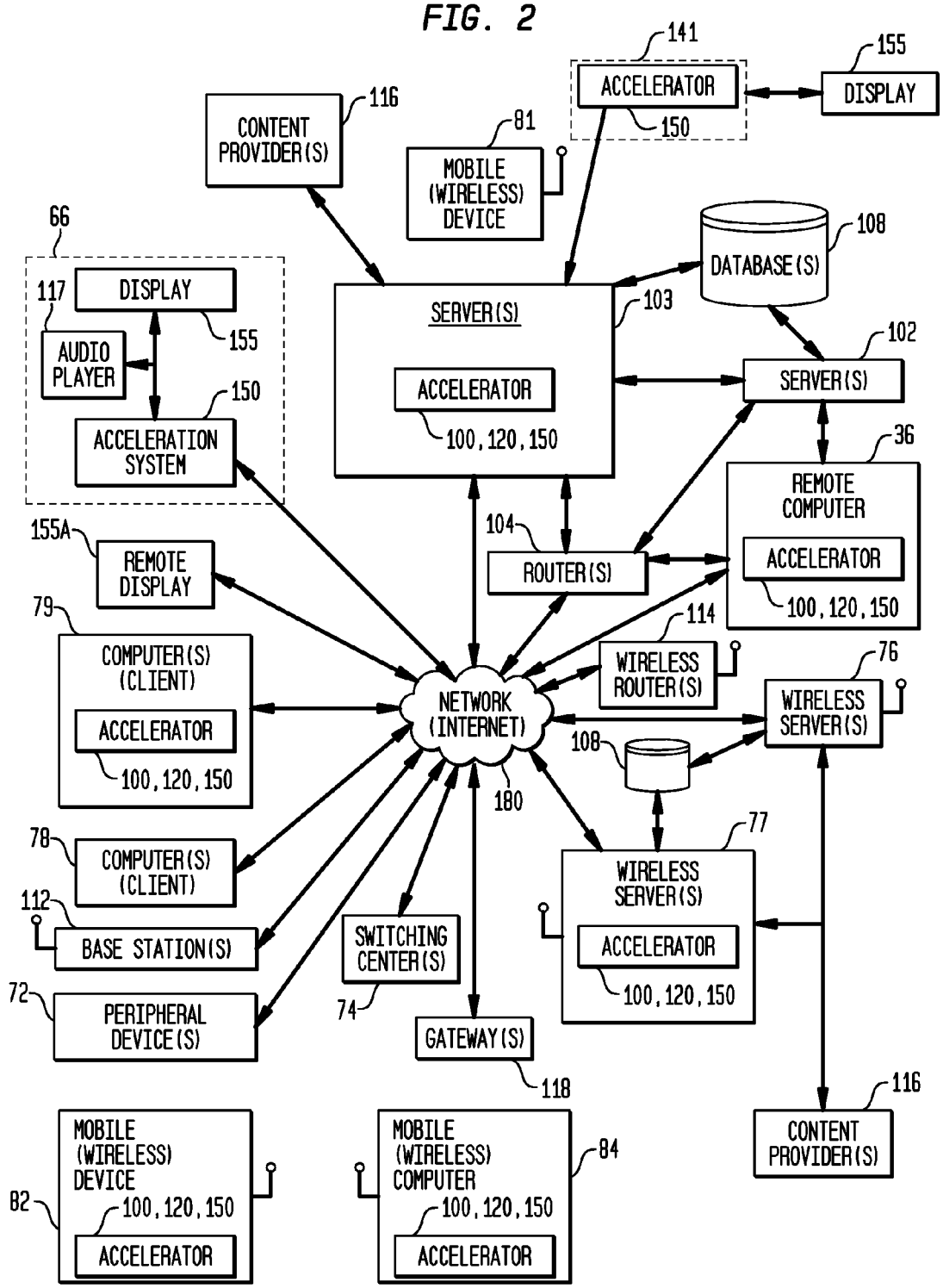
Figure 3:
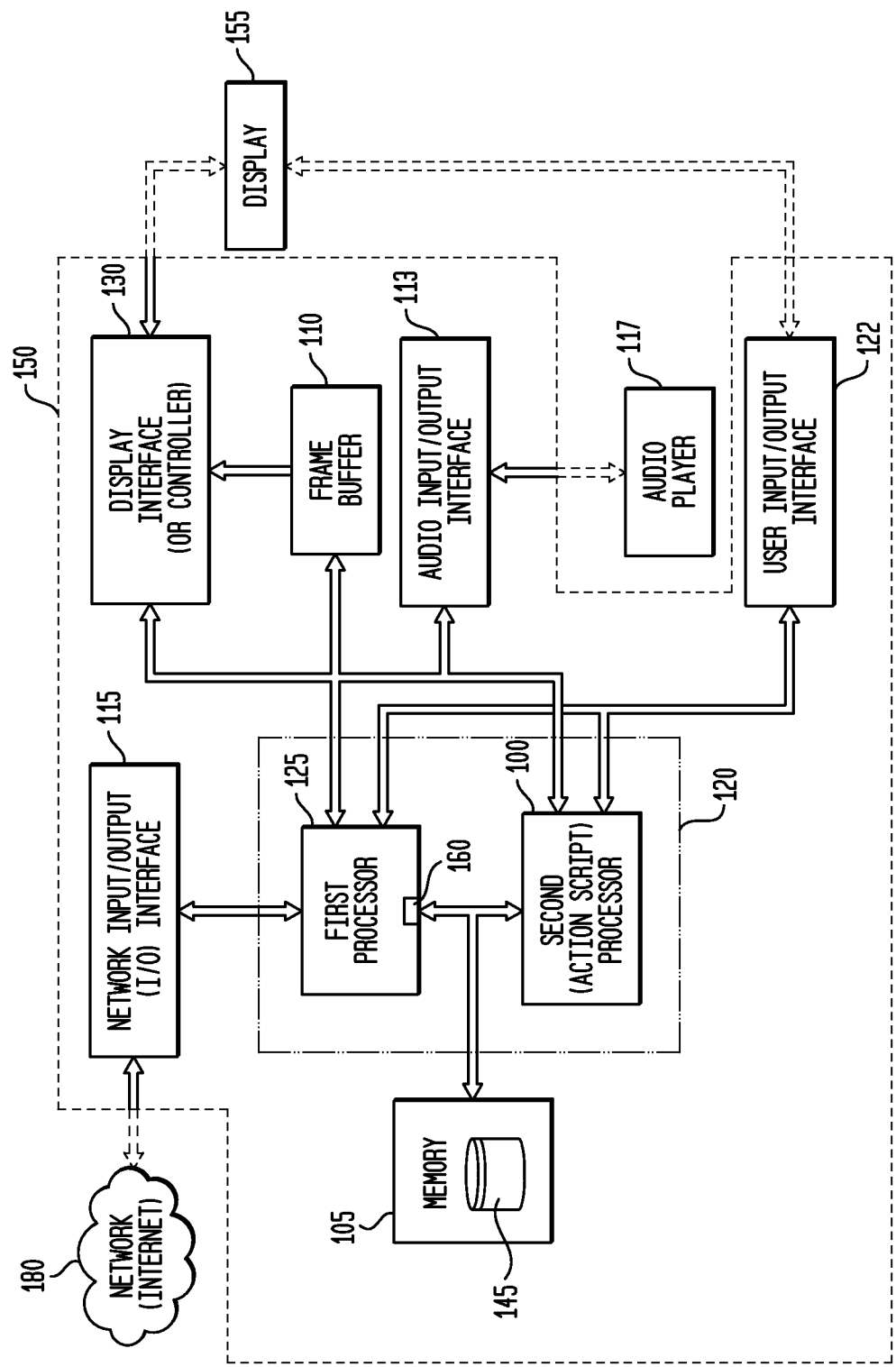

As indicated above, various exemplary embodiments of the claimed invention provide an apparatus, method and system to accelerate the actual processing of an action script, also referred to as a media action script, typically provided as part of a web page or other data file, such as Flash®, Silverlight®, JavaFX® and/or Javascript®, to render a graphical image (or object). FIG. 2 is a block diagram illustrating an exemplary network and exemplary network components having system and apparatus embodiments in accordance with the teachings of the present invention. FIG. 3 is a block diagram illustrating an exemplary first system embodiment 150 and exemplary first and second apparatus embodiments 100 and 120, respectively, in accordance with the teachings of the present invention. In the interests of brevity, the system and apparatus embodiments as illustrated in FIG. 2 are individually and collectively referred to equivalently herein as an "accelerator" (100, 120, and/or 150) or "acceleration" system (150). It also will be understood that references to accelerator (system 150 or apparatus 100, 120) embodiments also mean and include other embodiments or variations discussed below, such as systems 150A, 150B, 150C, 150D, processors 100, 100A-100F, 125, 125A-125D and the various other apparatuses 120, 120A, 120B.

Referring to FIG. 2, as illustrated, an exemplary first system 150, for example and without limitation, may be a separate, stand-alone device 141, such as to provide internet capability to a display device 155 such as a television or monitor; or may be included or incorporated within any other type of device, such as a mobile device, a cellular telephone, a wireless smartphone, a personal digital assistant, or another mobile communication or multimedia device, e.g., the mobile devices illustrated in FIG. 2 as mobile (wireless) device 82 and mobile (wireless) computer 84; or may be included or directly incorporated within a non-mobile device, such as a television or other display system 66, computers 79, 36, server(s) 103, 77, for example and without limitation. (Those having skill in the art will recognize that these various components, such as stand-alone device 141 having an accelerator 150, will also include other common or otherwise known features or devices, such as appropriate connectors, device containers, power supplies, batteries, bus interfaces, controllers, etc., which are not separately illustrated in the various Figures and which are unnecessary for the explanation of the exemplary embodiments of the invention.)

Continuing to refer to FIG. 2, as illustrated, an exemplary network 180 may be of any type of kind, using any medium such as wired, optical, or wireless, using any current or future protocols, such as Internet Protocol ("IP"), Transmission Control Protocol ("TCP") (collectively with IP referred to as "TCP/IP"), which may further incorporate other current or future protocols, such as hypertext transfer protocol ("HTTP"), various email and file transfer protocols (e.g., SMTP, FTP), or other types of networks, such as the public switched telephone network ("PSTN"), cellular, GSM, EDGE, GPRS, Institute of Electrical and Electronic Engineers ("IEEE") 802.11, CDMA, WCDMA, or 3G, or any other network which provides for communication for data, voice or multimedia, for user input, selection, evaluation, reporting, media provision, and so on. The network 180, in turn, may be utilized to provide any type of communication to or from the accelerator (system 150 or apparatus 100, 120), and may be directly or indirectly coupled to any of a plurality of other devices for such internet, voice, multimedia or any other form of data communication, whether switched or routed, including without limitation router(s) 104 and server(s) 102, 103 of any type or kind (and further coupled to database(s) 108 and content provider(s) 116); switching center(s) 74; cellular, RF, WiFi, 802.11 or other wireless base station(s) 112; wireless server(s) 76, 77 and wireless router(s) 114; peripheral device(s) 72 (e.g., home location registers, visitor location registers, intelligent peripherals, service control points, service nodes, etc.), various gateway(s) 118, one or more remote displays 155A; wireless device(s) 81, and/or one or more (client) computer(s) 78, 79, 36.

Many of these network components may also include an exemplary accelerator (system 150 or apparatus 100, 120 embodiments) of the claimed invention. For example and without limitation, exemplary accelerator (system 150 or apparatus 100, 120) embodiments may be included within server(s) 103, wireless server(s) 77, computer(s) 79, remote computer(s) 36, mobile (wireless) computer 84, mobile (wireless) device 82 (such as a cellular telephone, a cellular smartphone, personal digital assistant, or any other wireless handheld device), a display or monitor device 66 (such as a television or other multimedia device having a display 155 and audio player 117). Those having skill in the art will recognize that the exemplary system 150 and/or apparatus 100, 120 embodiments may be included in a wide variety of devices, all of which are considered equivalent and within the scope of the present invention.

In addition to utilizing an exemplary system 150 and/or apparatus 100, 120 embodiment locally for acceleration of action script processing, such as within a computer 79 or mobile (wireless) device 82, the exemplary accelerator (system 150 or apparatus 100, 120) embodiments may also be utilized separately or remotely from a display 155, 155A to provide such acceleration. For example, stand-alone accelerator device 141 may be separate from and coupled to a display 155 over a coaxial, HDMI, S-video, VGA, LVDS, DVI, or Y—Cr-Cb component cable or other wired or wireless connection (for example and without limitation), with the stand-alone accelerator device 141 processing any action script (e.g., which may be included in an HTML or XML web page) and providing the resulting graphics pixel information to the display 155 for visual display. Also for example, an HTML or XML page may be provided by a server 103, 77, with any included action script processed by an exemplary system 150 and/or apparatus 100, 120 embodiment within the server 103, 77 and provided as a processed data stream to a remote display 155A via network 180. In another embodiment, an HTML or XML page may be provided by a server 102, 76, with any included action script transferred from the end user device (e.g., mobile (wireless) device 83, such as by using a "shim" as discussed below) to a server 103, 77 or a computer 36, 79 having an exemplary system 150 and/or apparatus 100, 120 embodiment, which then provides the accelerated processing of the action script and the resulting processed data is transmitted as a data stream via network 180 to the corresponding end user device. In these instances of remote processing, the resulting data stream may be provided in a wide variety of formats, depending upon where (or at what point) the data stream may be merged with other data in the end user device or in the server 103, 77 (or a computer 36, 79), such as merging with the balance of the HTML or XML page, or merging as a separate window (picture-in-a-picture or "PIP") within a displayed television channel, for example, and as discussed in greater detail below. The use of the various accelerator apparatus and system (100, 120, 150) embodiments of the claimed invention in such remote servers 103, 77 and computers 36, 79 enables such remote processing of an action script that would have been completely impractical using the software stack of the prior art, which would require too many sophisticated microprocessors to render the graphics of multiple actions scripts for a large number of users.

Referring to FIG. 3, the exemplary first system 150 comprises a first processor 125; a second, action script processor 100; a network input/output ("I/O") interface 115, a user input/output ("I/O") interface 122, and memories 105 and 110 (with the latter memory illustrated as frame buffer 110). (The action script processor 100 is a first embodiment of such a second processor referred to as an action script processor 100). Depending upon the selected embodiment, the system 150 may also include an audio input/output interface 113 (e.g., for coupling to a microphone, to audio speakers or other audio player 117) and a display interface or controller 130; other exemplary systems 150 may also include a display 155. A display interface (130) is typically utilized when the system 150 is not provided as part of a display 155 device, while a display controller (130) is typically utilized when the system 150 is provided with a display 155 device, such as within a television or a mobile telephone.

The first processor 125 may be a general purpose microprocessor such as an X.86 processor (e.g., an Intel Pentium processor, an ARM processor, a Freescale processor) or a multimedia processor (e.g., a Texas Instruments OMAP processor), also for example and without limitation, or any other type of processor as described in greater detail below, such as a digital signal processor ("DSP"), and is typically implemented as one or more integrated circuits ("ICs"). The functions of the first processor 125 may also be combined with the functions of the second processor 100, in any combinations and using any type of circuitry, currently known or developed in the future, whether as a single IC or a plurality of ICs, for example and as discussed in greater detail below. The first apparatus embodiment comprises the second processor 100, also referred to as an "action script" processor 100 (which may be implemented as any type of processor, using any type of circuitry, as described in greater detail below, and further is typically implemented as an IC), and provides hardware-based acceleration of the processing of an action script to render a graphical object (or, equivalently, a graphical image). The action script processor 100 may operate as a co-processor with the first processor (or microprocessor) 125 (when implemented as a separate IC or otherwise implemented separately) to provide graphical computation and rendering from an action script (or other scripted information or string-based tags), including vector graphics or SVG. As mentioned above, the second, action script processor 100 is not required to be co-located with the first processor 125 and, for example, may be located remotely or located in a separate device. In addition, the second processor 100 may also be located remotely from a device, such as located in a server 77, 103 which provides action script acceleration to another device located elsewhere. In one exemplary embodiment, the action script processor 100 is implemented as a reconfigurable IC, e.g., as an FPGA, a processor array or grid, an elemental computing array, etc. In another exemplary embodiment, the action script processor 100 is implemented using other types of custom hardware, such as an FPGA or as an ASIC, while in other exemplary embodiments, the action script processor 100 is implemented more generally as a microprocessor or a microprocessor in combination with the first processor 125, such as using a multimedia processor or graphics processing unit ("GPU"). More generally, the various functions of the first processor 125 and the second processor 100 may be embodied in any circuitry, in any combinations or distributions, as discussed in greater detail below.

The second apparatus 120 embodiment is the combination of the second, action script processor 100 and the first processor 125, which may be implemented as a singular integrated circuit, or as multiple integrated circuits (typically coupled together on a circuit board). This second apparatus 120 embodiment, whether implemented using one or multiple ICs, incorporates the functionality of both the second, action script processor 100 and the first processor 125, as discussed in greater detail below. In exemplary embodiments discussed below with reference to FIGS. 4 and 5, the second apparatus 120 embodiment is implemented respectively as a system-on-a-chip (an "SOC") and as an array of a plurality of processor cores. It should also be noted that when the functionality of the first processor 125 and the functionality of the second processor 100 is implemented as a single IC (e.g., an apparatus 120), the first processor 125 and second processor 100 may no longer be discernable as distinct entities. Accordingly, an apparatus 120 comprising a single IC, having the functionality of the first and second processors 125, 100, is considered equivalent and within the scope of the present invention. Representative, exemplary electronic circuitry (i.e., hardware) for the second processor 100, illustrated using circuit block diagrams, is discussed in greater detail below.

In exemplary embodiments discussed below with reference to FIGS. 18 and 19, the functionalities of the first processor 125 and the second processor 100 have been distributed between and among a number of components, which may be implemented on the same IC or on multiple ICs, further illustrating the wide range of potential embodiments within the scope of the present invention. For example, in FIG. 19, an exemplary system is embodied as one or more processors (an array or "sea" of processors) which have been configured, programmed, or implemented in custom or non-custom, configurable or non-configurable circuitry (hardware) to perform the exemplary methodology of the invention. Similarly, in FIG. 18, different apparatus and system embodiments result from distributing the various claimed functions in various components, either as multiple, separate ICs or co-located on the same IC, such as part of an SOC. For example, one or more of the several action script acceleration functions may be included in a first processor 125 embodiment, with other of the several action script acceleration functions included in one or more second processor 100 embodiments, such as for parallel execution of various graphical primitive mathematical, logic and memory functions, also for example and without limitation. Accordingly, it is to be understood that any and all distributions of the claimed functions, in a single IC, processor or other circuit, or between and among a plurality of ICs, processors or other circuits, which may be co-located or which may be remote from each other, which may be serial, single-threaded, parallel or multi-threaded implementations, and which may be comprised of any of myriad types of circuitry (e.g., one or more processors, processor cores, FPGAs, ASICs, custom or non-custom, configurable or non-configurable circuitry or other hardware, such as one or more commercially available microprocessors or DSPs) currently known or which become known, are considered equivalent and within the scope of the present invention.

As indicated above, the apparatus embodiments such as the action script processor 100 and/or the action script processor 100 in conjunction with the first processor 125, provide hardware-based acceleration of the processing of an action script to render a graphical object (or, equivalently and interchangeably, a graphical image). As used herein, a "graphical object" or "graphical image" should be construed broadly, to mean and include: (1) any image of any kind for visual display, such as a visual shape of any kind, a sprite, text, a box, a button, a character, animation, or other form of graphics; and (2) which has been specified descriptively (i.e., at least partially in a non-pixel-by-pixel form). Such descriptive specifications typically use some type of vector graphics, text, string, bytecode or script description, such as having been specified using the attributes, values, events and other tag, string or bytecode-based descriptions provided in an action script (even though such a description may be ASCII-encoded and therefore has a binary form, it is not pixel-by-pixel binary data), rather than having been specified purely non-descriptively in a pixel bitmap form, or a pixel matrix form, or some other pixel-by-pixel format (e.g., a macroblock or frame). Stated another way, a graphical image or object as used herein is an image of any kind for visual display which has been specified descriptively, at least partially, in non-pixel-by-pixel data form (e.g., a non-bitmap and non-matrix form). For example, a graphical image such as a straight line may be specified or described in vector graphics and SVG in a non-pixel-by-pixel form by its starting and ending points (or pixels), without the pixel-by-pixel information concerning all of the pixels in between the starting and ending points, rather than as a matrix or mapping (compressed or uncompressed) of all pixels which comprise the line. Such a descriptive form is "at least partially" in a non-pixel-by-pixel form because in some action scripts, such as Flash, some data or images may include a bitmap, such as for a fill style or a jpeg file; in all instances, however, at least one description or a graphical object within the action script is not in a bitmap form, such as a color specification, a gradient specification, a width specification, an end cap or edge specification, along with descriptive tags such as DefineShape, FillStyle, LineStyle, etc., for example and without limitation. Also for example, a graphical image or object may be constructed descriptively, as a composite image for example, from image components which have been specified as a bitmap, and as such, has nonetheless been specified descriptively for purposes of the claimed invention (e.g., such as a composition of a plurality of JPEG photographic images).

As a corollary, with such a descriptive specification, subsequent rendering of the graphical image in the prior art requires interpretation of the description, using a specialized application, rather than merely executing a machine-encoded program based solely upon pixel-by-pixel bitmapped data having a standardized format, such as a JPEG, MPEG or H.264 data file. Accordingly, a graphical image or object, as used herein, is distinct from and is not merely an image such as a photograph specified using a pixel bitmap or matrix having a JPEG standard format, or such as a video frame specified using a pixel bitmap or matrix having an H.264 standard matrix format (e.g., a macroblock, including compressed matrix forms, which may delete or compress some pixel information, particularly for data following a macroblock), for example, although a graphical image or object may be combined in a wide variety of ways with such a photograph or video, or may be comprised of a plurality of such photographs or videos, also for example. As a very simple example, a box or border for a web page may be specified as a graphical image using descriptions such as attributes and attribute values, such as a box or border surrounding a photograph or video. As another simple example, a graphical image may be comprised of a plurality of photographs or videos, with the overall composition or layout specified descriptively, using tags such as control tags, attributes and attribute values. Those having skill in the art will recognize that very complex graphical images and/or 3D rendered graphical objects (including moving images) may also be specified using various types of vector graphics, text, string, bytecode or script descriptions, and are also within the scope of the present invention. As yet another example, in various exemplary embodiments, text and sprites may be rendered as types of graphical objects, e.g., as a shape, rather than rendered using a font table of an operating system.

Also as used herein, an "action script" or "media action script" or "media action graphics" will mean and refer to: (1) any set of information or data which contains at least one descriptive element (i.e., a description of a graphical image at least partially in a non-pixel-by-pixel form, as an ASCII-encoded or bytecode data file of a string or bytecode-based scripting language); and (2) which has not been fully compiled to machine (or processor) code. Stated another way, an action script is a data file which has not been fully compiled to machine (or processor) code (e.g., it is provided in the form of an ASCII-encoded scripting language or has been semi-compiled to bytecode) and which, at least in part, contains descriptions of a graphical image (which are at least partially in a non-pixel-by-pixel form). Such action scripts are typically descriptive (rather than purely instruction-based), containing "descriptive elements" such as tags, attributes and attribute values, content, and events, provided as tag-based, string-based, bytecode-based or bit code-based interpretable media files with variable-length operands providing corresponding data, which is or are used to provide multimedia rendering, such as graphical rendering, for visual display, audio playback or other sensory feedback, such as the various scripting languages utilized for rendering web page, animation, gaming, graphics, other multimedia content, and other images for display, including without limitation Adobe Flash®, Sun Microsystems JavaFX® and Javascript®, Microsoft Silverlight®, HTML 5, Adobe AIR®, Blu-ray Disc BD-J, OpenLaszlo, ECMA Script, Scalable Vector Graphics ("SVG"), Vector Markup Language ("VML"), Precision Graphics Markup Language, "PGML"), Action Graphics, Adobe Flash® Lite®, Ruby, Perl, Python, and so on, for example and without limitation.

Accordingly, also as used herein, a "descriptive element" will mean and refer to a description or set of descriptions which individually or collectively specify a graphical image at least partially in a non-pixel-by-pixel form, such as, for example and without limitation, an ASCII-encoded or bytecode data file of a string or bytecode-based scripting language, such as tags, bytecodes, attributes, attribute values, and the other types of descriptive elements discussed below. A descriptive element, then, would not mean and include a fully compiled, executable instruction which would be executed directly by a microprocessor, for example, but would mean and include an interpretable instruction, such as a DefineShape tag or another directive of a scripting language which would indicate (when interpreted) that a described graphical image should be constructed (using attributes which are also descriptive elements) and subsequently displayed on a visual display. Many examples of such descriptive elements are discussed below, such as designations of types of shapes (e.g., a rectangle), height and width specifications for a rectangle, color fill specifications, button specifications, etc. In many instances, a plurality of descriptive elements collectively describe a graphical object, such as in the rectangle and button examples described below.

For example, such an action script may be specified in an HTML or XML page as an interpretable file located between a start tag ("<script>") and an end tag ("</script>"), or more simply as an interpretable file commencing after the start tag (without use of an end tag). Graphical objects may be specified as the interpretable file located following a start tag ("<object>") or between a start tag and an end tag ("</object>"). Continuing with the example, as used herein, an action script includes, without limitation, any of the following descriptive elements: a data sequence having a header and tagged data blocks, including file attributes tags, definition tags, and control tags, such as a compressed or uncompressed SWF file used in Flash®, in which definition tags define objects known as characters (and may be stored in a dictionary) and control tags manipulate characters and control the flow of the file; a data sequence created using or comprising an extensible application markup language (XMAL) or the .NET language scripts, including Silverlight® (having, for example, canvas tags and operands), .WMA and compressed or uncompressed forms such as .xap and .js; a javascript file; a javafx script file (javafx.ext), a vector graphics file and/or a scalable vector graphics file, and any other data file containing static data and/or action (or dynamic) data (such as a .pdf file (static data) with an embedded .swf (Flash) file (action data)).

Accordingly, as used herein, an action script should be understood to include any and all interpretable or executable data files (which have not been fully compiled to machine code) having some form of control for rendering of an instance of a graphical object (e.g., draw line, draw shape) and having at least some non-bitmapped form of data description or descriptors for the graphical object (e.g., file attributes, attribute values, definitions, operands), such as for line width, line curves, colors, etc. In exemplary embodiments, such an action script may also include an action or event capability, such as for responding to user input (e.g., mouse or pointer movement or clicks), such as for displaying additional content as a pointer is moved over a displayed object, and may also include timing information, such as a designation of frames per second. A typical action script may include several components, for example, such as (1) a description of graphical objects; (2) a description of the assembly of the graphical objects or other images on a canvas or display screen; and (3) timing or other control information.

Some action scripts such as JavaFX® may describe graphical objects using a class or other code, which are nonetheless descriptive elements. For example, the following JavaFX action script (as a shape class) creates a rectangle with twenty pixel rounded corners (Example 1):

```
import javafx.scene.shape.*;
Rectangle {
    x: 50 y: 50
    width: 200 height: 100
    arcWidth: 20 arcHeight: 20
}
```

A text class in JavaFX, also for example, defines a node that displays textual content, such as the following code which produces "This is a test" (Example 2):

```
import javafx.scene.text.*;
Text {
    x: 10
    y: 50
    font: Font { size: 20 }
    content "This is a test"
}
```

Exemplary descriptive elements in Examples 1 and 2 include, for example and without limitation, "Rectangle", "width", "height", "arcHeight", "arcWidth", "Text", "font", "content", "x", and "y", with attribute values "50", "200", "100", "20", "10" and text content "This is a test" comprising corresponding data, also for example and without limitation, all of which are interpreted (rather than executed) to produce the graphical object.

Similarly, in XAML used with Silverlight, various tags referred to as "objects" include, for example, <Grid Background=>, </Grid>, <Canvas>, </Canvas>, <Rectangle>, and </Rectangle>. For example, the following Silverlight® action script creates a rectangle with blue fill (Example 3):

```
<Rectangle
    Width="100"
    Height="100"
>
    <Rectangle.Fill>
        <SolidColorBrush Color="Blue"/>
    </Rectangle.Fill>
</Rectangle>
```

Exemplary descriptive elements in Example 3 include, for example and without limitation, "Rectangle", "Width", "Height", "SolidColorBrush", and "Color", with attribute values "100" and "Blue" comprising corresponding data, also for example and without limitation, all of which are interpreted (rather than executed) to produce the graphical object.

Innumerable examples may also be found in Adobe Flash®, such as tags such as DefineButton, DefineFont, DefineShape, FileAttributes, Place Object, for example, and common structures, such as swf_fill_style_array, swf_gradient, swf_line_style_array, swf_button, swf_rect, swf_text_entry, etc. For example, the following Adobe Flash® action script creates a rectangle (where "twips" is a parameter or variable which is $\frac{1}{20}^{th}$ of a point or pixel) (Example 4):

```
struct swf_rect {
    char align;
    unsigned      f_size : 5;
    signed twips  f_x_min : f_size;
    signed twips  f_x_max : f_size;
```
```
    signed twips  f_y_min : f_size;
    signed twips  f_y_max : f_size;
};
```

Also for example, the following Adobe Flash® action script creates a button (Example 5):

```
struct swf_button {
    char align;
    unsigned          f_button_reserved : 2;
    if(version >= 8) {
        unsigned      f_button_blend_mode : 1;
        unsigned      f_button_filter_list : 1;
    }
    else {
        unsigned      f_button_reserved : 2;
    }
    unsigned          f_button_state_hit_test : 1;
    unsigned          f_button_state_down : 1;
    unsigned          f_button_state_over : 1;
    unsigned          f_button_state_up : 1;
    if(any f_button_state_... != 0) {
        unsigned short    f_button_id_ref;
        unsigned short    f_button_layer;
        swf matrix        f_matrix;
        if(f_tag == DefineButton2) {
            swf color transform f_color_transform;
        }
        if(f_button_filter_list) {
            unsigned char     f_filter_count;
            swf any filter    f_filter;
        }
        if(f_button_blend_mode) {
            unsigned char     f_blend_mode;
        }
    }
};
```

Exemplary descriptive elements in Examples 4 and 5 include, for example and without limitation, "struct", "swf_rect", "char align", "unsigned", "f_size", "signed twips", "f_x_min", "f_x_max", "f_y_min" and "f_y_max", with attribute values "0", "1", "2", etc., also for example and without limitation, all of which are interpreted (rather than executed) to produce the graphical object.

Figure 1:
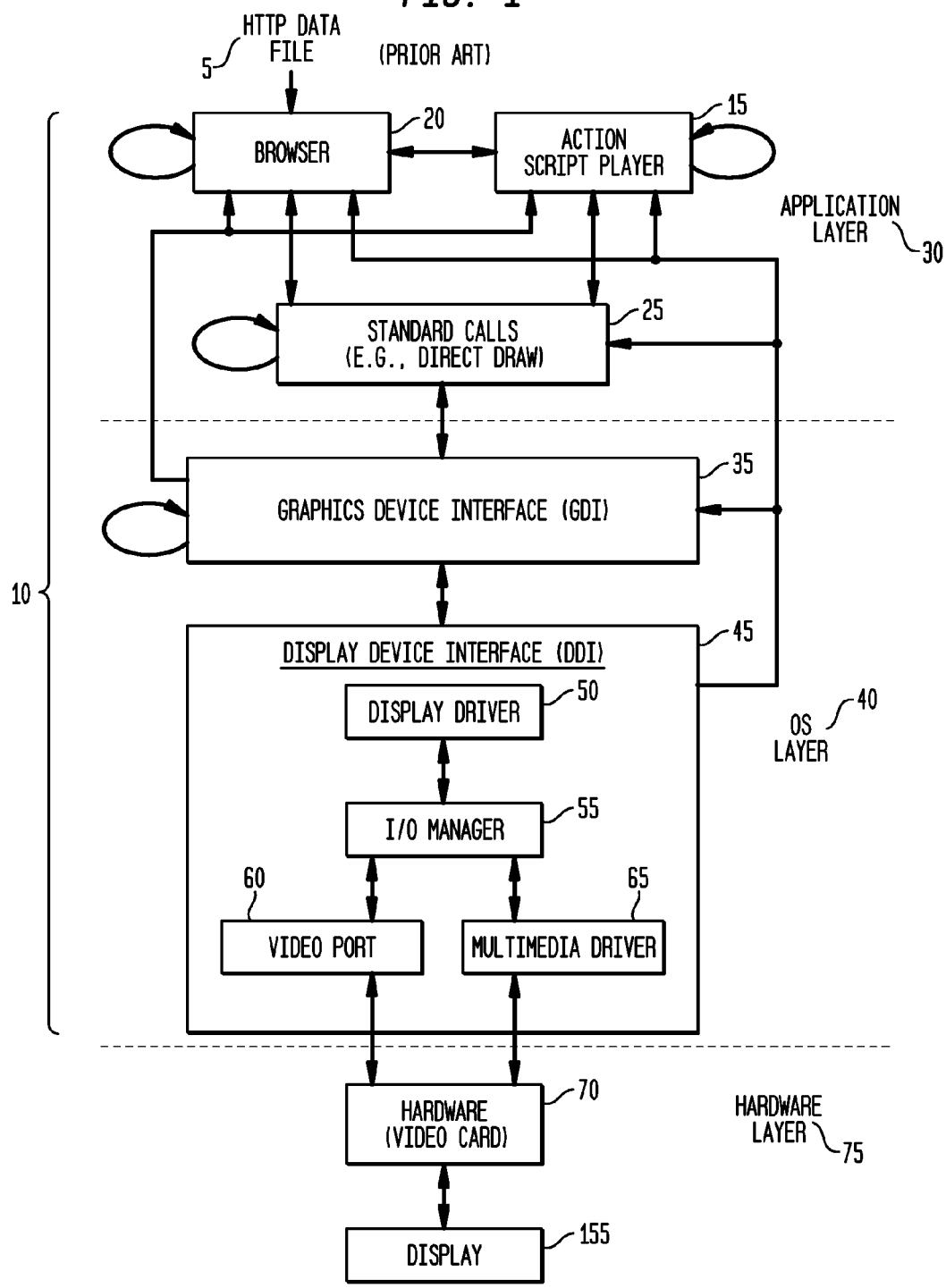

In the prior art, such action scripts are typically interpreted as part of or embedded within another application or program, such as by a media player or virtual machine operating as an application layer or plug-in within a web browser, as illustrated in FIG. 1, and is not directly executed by hardware or a single application. All of these various representative scripting language files are provided as tag-based, string-based (as known in the art as a sequence of ASCII-based characters) and/or bytecode or bit code-based (or their equivalent) interpretable files with variable-length operands and are to indicate a desired graphical image that should be rendered, currently using specific or dedicated software for each type of action script, in an application layer such as a Flash Media Player or a Java virtual machine as part of web browser operation, such as Internet Explorer, Google Chrome, Safari, Mozilla Firefox, Netscape Navigator, etc.

In prior art systems, such an action script may be contrasted with an instruction-based program, which has been compiled (typically) to assembly code which is then further converted to native binary instructions for actual execution on a selected microprocessor architecture of a computer. Such action script descriptions, in the prior art, would be interpreted through many software layers, rather than being directly executed as machine code instructions. As mentioned above, such graphical rendering from an action script file provided as part of an HTML, XML, or more generally as part of an HTTP or other data file, is extremely computationally intensive using the prior art software stacks and API calls, requiring significant microprocessor capability and typically at least one additional, separate graphics processor provided in a powerful computing system, and effectively eliminating the ability for such graphical rendering in most handheld devices. Because such prior art handheld devices do not have this significant processing capability, web-based graphics for such devices are typically provided in modified, stripped-down versions, such as Flash® Lite™, or by redirection to another, related web site which does not require rendering of such computationally-intensive action scripts. It should also be noted that while the various embodiments may be described using examples from Adobe Flash®, such as Flash® versions 9 or 10, as an exemplary action script with widespread use (and sufficient use to potentially be a de facto standard), it will be understood by those having skill in the art that any and all such scripting languages used to create corresponding action scripts are considered equivalent and within the scope of the present invention.

Referring again to Examples 1-5, several significant features are apparent. First, there is significant and substantial variation among the descriptive elements for each of the scripting language comprising the exemplary action scripts. For example, each of JavaFX®, Adobe Flash® and Silverlight® utilize very different descriptions, such as different string-based tags, to specify a rectangle as a graphical image. Second, there is significant and substantial variation among the data elements, parameters, or variables for each of the scripting language comprising the exemplary action scripts. Also for example, each of JavaFX®, Adobe Flash® and Silverlight® utilize very different data descriptions, such as different string-based parameters and values, to specify the data (e.g., size and color) for a rectangle as a graphical image.

In accordance with the exemplary embodiments, to address these very different descriptions, the exemplary embodiments convert such descriptive elements (individually or collectively) to a common platform for both hardware-level instructions and corresponding data, such that any of these different action scripts may be executed directly at a hardware level using the hardware-level instructions and using corresponding data which has been converted to have a uniform format with expected, predetermined data fields. The action script processor 100 and/or apparatus 120 (and potentially in conjunction with processor 125, depending on the selected embodiment) converts both the descriptions (string-based tags, bytecodes, control information or other descriptions) and the data of the action script (and its related or referenced data files) directly into a plurality of directly executable operational codes (or instructions) having variable-length operands. More particularly, as discussed in greater detail below, the action script processor 100: (1) directly converts the action script descriptive elements (string-based tags, control information, control tags, definition tags, dictionary tags, or other descriptions, which may be ASCII-encoded or bytecode-based) into basic, graphical primitive instructions (e.g., operational codes or "op codes") for native or direct execution in the action script processor 100; and (2) directly converts the data of the action script (and its related or referenced data files) into "control words" having operand data, memory addresses, and various control bits and flags organized in a predetermined (or standard) data format (in database 145) for the corresponding graphical primitive instructions (as operational codes). The action script processor 100 then performs the corresponding mathematical, arithmetic and logical operations of the graphical primitive instructions (as op codes or sequences of op codes) using the data (and address) fields of the corresponding control word(s), and provides corresponding pixel information to the frame buffer 110 or directly to the display interface (or controller) 130, which in turn may then perform various display functions.

Accordingly, as used herein, an "operational code" or "op code" is one or more hardware-level control codes, instructions, sub-instructions, microcode, configuration code, or other binary sequence which controls the relevant or selected hardware (e.g., a first processor 125 or a second processor 100 or any of their respective circuits) to execute one or more operations (e.g., a sequence of operations, such as mathematical, arithmetic, logical, control, shifting, memory, and other operations). In various exemplary embodiments, when these operations have completed, the selected hardware will have produced pixel information or an interim result subsequently utilized to produce pixel information (such as another control code, data, a control word, an interim arithmetic result subsequently utilized as another operand, etc.). Examples of the operational codes utilized to produce interim results include, without limitation, a parsing operational code utilized to parse an action script into one or more descriptive elements, a converting operational code utilized to convert the descriptive elements into operational codes and control words, and control operational codes to direct, schedule and control execution. Examples of the operational codes utilized to produce pixel information and interim arithmetic results include, without limitation, execution operational codes to control mathematical, arithmetic, logical, control, memory and other operations, and post-processing and graphical rendering operational codes to control graphical operations such as line connecting, line thickening, gradients, and object filling, with their corresponding mathematical, arithmetic, logical, control, memory and other operations.

Stated another way, an operational code is a hardware-level instruction, sub-instruction, microcode or binary sequence or is otherwise recognizable or usable by the hardware as control or configuration information to control an operation or sequence of operations or select a result of such operations executed by the hardware, such as fetching and loading microcode and executing operations corresponding to the microcode, e.g., mathematical, arithmetic, logical, control, bit shifting, parsing, decoding, memory operations, output selection, output enabling, other operations, etc. In exemplary embodiments, these op codes are utilized to generate pixel information for a graphical object or to produce interim computation results, control codes, control signals, output selection, and so on, for example and without limitation. In some instances, an operational code may be directly translatable or otherwise convertible into a sequence of hardware-level instructions, which itself may be machine code (e.g., native or otherwise executable microcode, binary code, control or configuration information, control signals), or decoded, translated or otherwise directly or indirectly converted into machine code (e.g., native or otherwise executable hardware sub-instructions such as microcode, binary, control or configuration information, or other hardware control signals which control the operation or output selection of the circuitry which performs corresponding mathematical, arithmetic, logical, control, shifting, memory and other operations). An indirect conversion may be, for example and without limitation, conversion of a descriptive element into an op code recognized by selected hardware as comprising a pointer to a memory storing a sequence of hardware instructions, sub-instructions, microcode, control signals, etc. Other types of operational codes and conversions methodologies will be apparent to those having skill in the art, and are considered equivalent and within the scope of the claimed invention.

Many of the operational codes generally (although not exclusively) will correspond to a graphical primitive operation, such as "draw line", "draw shape", "draw rectangle", "draw shape and fill", which are then directly converted by the selected hardware into or otherwise represent or point to the corresponding one or more hardware-level instructions, sub-instructions, microcode, binary, control or configuration information, or other hardware control signals which control the operation or output selection of the circuitry which performs corresponding mathematical, arithmetic, logical, control, memory and other operations, as described below. In an exemplary embodiment using customized hardware, the operational codes are at a comparatively fine-grained or lower level of graphical primitive operations, such as "draw line", "draw curve" or "draw segment", which in turn are converted by the selected hardware into one or more binary sequences or control signals which control a corresponding circuit at a more detailed level, such as a parser circuit 205 or an execution circuit 250, to perform a series of bit shifting, multiplication, addition, comparison, logic and memory operations to generate a next pixel of a line segment, for example and without limitation. In another exemplary embodiment using generally or commercially available microprocessors, the operational codes also may be at such a lower level of graphical primitive operations (e.g., "draw line"), or may be at a more coarse-grained or comparatively higher level of graphical primitive operations, such as "draw rectangle" (which also may be decomposed into lower level primitives for execution, such as a sequence of four draw line operations, or which may be converted, for example and without limitation, directly into a loop or other sequence of microcode, binary, or other hardware control or configuration signals).

Accordingly, the selection of the type and level of operational code, and its correspondence to a selected graphical primitive, generally will correspond to the selected hardware embodiment, the degree of acceleration desired, and the degree of parallel computation desired (as discussed in greater detail below), in addition to other design considerations; any and all such operational codes and conversions of descriptive elements of an action script into operational codes, however, are within the scope of the claimed invention. For example, to increase the opportunities for parallel execution, op codes may be selected which may be executed generally independently of each other, without data dependencies, such as by using four "draw line" op codes to render a rectangle, each of which may be executed independently of the other, with the resulting pixel information for each segment combined (like "Lego®" building blocks) in the frame buffer 110. Under other circumstances, such as when an array of general purpose microprocessors are utilized (e.g., as illustrated in FIG. 19), such lower level op codes or comparatively higher level (more "granular" and less fine-grained) op codes also may be utilized for example, such as "draw rectangle and fill", potentially with parallel execution occurring across multiple microprocessors, each of which is rendering a comparatively larger portion of the action script. In these various embodiments, the control code (or native instruction set or configuration code) of the hardware is utilized, e.g., as hardware-level instructions, sub-instructions or microcode, which corresponds to or otherwise executes or processes an op code corresponding to the graphical primitive operation or instruction, rather than the hardware performing an intervening software call to another software application or library.

Also for example and without limitation, such operational codes may be custom instructions, such as customized to a selected or custom hardware implementation (e.g., an ASIC), or may be more general instructions, such as a set of instructions utilized to operate or control a selected microprocessor, or may be pointers to a memory location providing a sequence of instructions, or may be configuration information for configuring interconnections, operation selections and operation outputs of configurable circuitry. Those having skill in the art will recognize and appreciate the myriad variations available, and all such variations are considered equivalent and within the scope of the claimed invention.

As another, simplified example, for purposes of explanation and not limitation, in an exemplary embodiment, the sets of descriptive elements for a rectangle as a graphical object, such as in Examples 1, 3 and 4, may be converted into four "draw line" op codes, each having corresponding data comprising starting and ending points for creating a line segment (where the ending point for one line segment may be the starting point for a next line segment, or the starting point for one line segment may be the ending point for a next line segment), in addition to other data elements for line styles, fill styles, gradients, etc. Yet another simplified example, for purposes of explanation and not limitation, in another exemplary embodiment, the sets of descriptive elements for a rectangle as a graphical object, such as in Examples 1, 3 and 4, may be converted into a single "draw rectangle" op code, having corresponding data comprising a starting point (e.g., a vertex or corner) and height and width specifications, in addition to other data elements for line styles, fill styles, gradients, etc. In turn, in an exemplary embodiment, each of these op codes may be decoded in hardware (rather than interpreted in another software layer) to microcode, binary or other control signals that both initialize one or more loop counters and create a series or sequence of mathematical, logical and memory operations (e.g., multiplication, addition, comparison and load/store) operations, for example, to generate pixel data for the successive pixels comprising each line segment and/or the rectangle (which also may be further decomposed into line segments), followed by other operations such as comparisons and loop counting for matching segments and filling the rectangular area. Those having skill in the art will also recognize that each of these op codes may be decoded, converted or translated at other hardware code or operational levels, and combinations of such hardware code or operational levels, which are suited to the selected embodiment, such as for embodiments comprising one or more general purpose microprocessors, processor cores, GPUs, ASICs, FPGAs, and/or DSPs, which may have pre-defined instruction sets or may have customizable instruction sets, and any and all such variations are considered equivalent and within the scope of the claimed invention.

Referring again to Examples 1-5, another feature of these different action scripts may also be apparent. Because of the significant variation among action scripts, and due to the use of descriptive elements as variable data elements and potential nesting of descriptive elements, among other things, it may not be clear whether a given element within an action script constitutes a descriptive element or a data element or data parameter. Such a distinction, however, does not affect the exemplary embodiments of the invention, because every action script has at least some descriptive elements and at least some data elements, even if the data elements are variables, and even if a descriptive element potentially must be converted and processed to determine a value of a variable data element. Accordingly, such action scripts may still be parsed and converted, in accordance with the exemplary embodiments of the invention, into a plurality of hardware-level operational codes and a plurality of control words having corresponding data in predetermined fields, which may then be executed at a hardware level. (In addition, it is also possible that some action scripts may have some additional features, especially new and currently unknown features, which may require processing as exceptions, in either the first or second processors 125, 100.)

Referring again to FIG. 3, in addition to the first and second processors 125, 100, the system 150 further comprises a network input and output ("I/O") interface 115; a user I/O interface 122, an audio I/O interface 113, a display interface (or controller) 130; and one or more memories, illustrated as memory 105 storing any type of data which may be utilized by the processors 100, 125, and as the frame buffer 110 storing data for use by the display interface (or controller) 130 to display an image on the display 155. The memories illustrated as memory 105, frame buffer 110, and the various other memories and registers (105A, 106, 107, 660, 367, 360, 450, 455, 460, 465, 695, 697, 570) discussed below, may be implemented utilizing any type of memory circuit or other data storage device, as known or may become known in the art, including without limitation RAM, FLASH, DRAM, SDRAM, SRAM, MRAM, FeRAM, ROM, EPROM or E2PROM and the other circuits and devices described in greater detail below. The memories illustrated as memory 105, frame buffer 110, and the various other memories and registers (105A, 106, 107, 660, 367, 360, 450, 455, 460, 465, 695, 697, 570) discussed below may be discrete or may be distributed (not separately illustrated), may also be located remotely (providing remote storage), and also may be included within other components and devices, e.g., frame buffer 110 may be included within or distributed among first processor 125, second processor 100, and/or display controller 130, with one component controlling the final data output to the display 155, for example. Also for example, in various system embodiments discussed below, the various memories may have other forms, such as including the frame buffer 110 within or as part of memory 105.

Depending upon the selected embodiment, the system 150 may include a display controller (130), such as when implemented within a display 155 such as a television, for example, or may include a display interface (130), such as when implemented as a separate device which will be connected via a cable, or other connectors or wires to the display device 155, such as an HDMI interface, also for example.

The memory 105 may store any type of information, as described in greater detail below, and may include one or more databases or file systems (individually and collectively referred to as data repositories) 145. The database 145 may be integrated, namely, that the information resides within a singular, co-located or otherwise centralized database structure or schema, or may be a distributed database, with information distributed between and among a plurality of databases, some of which may be remotely located from the other databases. (A "data repository", "database", and "data warehouse", as used herein, are considered interchangeable, and may be relational, object-oriented, object-relational, or use files or flat files, or any combinations of the above).

The network I/O interface 115 may be implemented as known or may become known in the art, to provide data communication between the first processor 125 (and/or the second processor 100 or apparatus 120) and any type of network (internet) 180, such as wireless, optical, or wireline, and using any applicable standard (e.g., one of the various PCI, USB, RJ 45, Ethernet (Fast Ethernet, Gigabit Ethernet, 100 Base-TX, 100 Base-FX, etc.), IEEE 802.11, WCDMA, WiFi, GSM, GPRS, EDGE, or 3G standards, for example and without limitation), and may include impedance matching capability, voltage translation for a low voltage processor to interface with a higher voltage control bus, wireline or wireless transceivers, and various switching mechanisms (e.g., transistors) to turn various lines or connectors on or off in response to signaling from the first processor 125 (and/or second processor 100 or apparatus 120). In addition, the network I/O interface 115 may also be configured and/or adapted to receive and/or transmit signals externally to the system 150, such as through hard-wiring or RF or infrared signaling, for example, to receive information in real-time for output on a dynamic display 155, for example. The network I/O interface 115 may provide connection to any type of bus or network structure or medium, using any selected architecture. By way of example and without limitation, such architectures include Industry Standard Architecture (ISA) bus, Enhanced ISA (EISA) bus, Micro Channel Architecture (MCA) bus, Peripheral Component Interconnect (PCI) bus, SAN bus, or any other communication or signaling medium, such as Ethernet, ISDN, T1, satellite, wireless, and so on.

As illustrated and as mentioned above, the network(s) 180 may be of any type or kind, using any medium such as wired, optical, or wireless, using any current or future protocols, such as TCP/IP, which may further incorporate other current or future protocols, such as HTTP, SMTP, FTP, or may be another type of networks, such as the public switched telephone network ("PSTN"), cellular, GSM, EDGE, GPRS, IEEE 802.11, WCDMA, or 3G, or any other network which provides for communication for data, voice or multimedia, for user input, selection, evaluation, reporting, media provision, and so on. The network 180, in turn, may be utilized to provide any type of communication to or from the system 150, without limitation, and may be directly or indirectly coupled to any of a plurality of other devices for such internet, voice, multimedia or any other form of data communication, whether switched or routed, as mentioned above.

The display interface or controller 130 may be implemented as known or may become known in the art, to provide either an I/O interface to and from the display 155 and/or to control the creation of images on the display 155. The display 155 also may be implemented as known or may become known in the art, including without limitation, the display 155 may be a display screen on a mobile device, a television, an addressable LED billboard display, a computer screen or display, or any other type of addressable or raster-scanning display.

The audio I/O interface 113 provides for input and output of audio information, such as for speech and other audio command input through a microphone, and audio output, such as through audio speakers or other type of audio player 117. The user I/O interface 122 provides for the reception of user input, such as through a mouse, trackball or other pointing device, a keyboard, an accelerometer or other form of motion detector, or any other type of user input device which is known or becomes known. In alternative embodiments, the user I/O interface 122 may also be included within or coupled to (illustrated as dashed lines) a display 155 device, such as a display 155 having a touch screen user I/O interface for user input, or having ports for other types of user inputs, such as a mouse or other pointing device, a keyboard, etc. Depending on the selected embodiment, the user I/O interface 122 may also include audio I/O interface 113 functionality, such as for speech and other audio command input through a microphone. The memories 105 and 110, network I/O interface 115, user I/O interface 122, the audio I/O interface 113, the display interface or controller 130, and a display 155 may be embodied or implemented as known or becomes known in the art, with all such implementations considered equivalent and within the scope of the present invention.

As described in greater detail below, the action script processor 100 is utilized as a hardware accelerator for converting the tags, bytecodes, control information (or other descriptions or instructions) and data contained within an action script into information, such as pixel information, suitable for use directly by a display controller (130) to form a corresponding image on a display 155, such as a computer display, a television, a cellular telephone display, a smartphone or PDA display, an LCD billboard display, any other pixel addressable or raster-scanning display (or any other display types or systems as known or may become known in the art), and so on. In an exemplary embodiment, the first processor 125 receives a data file (from network I/O interface 115), identifies and separates the action script file from the remainder of the data file, and transfers the action script file to the action script processor 100. If the action script file is compressed, either the first processor 125 or the second, action script processor 100 may decompress it, and as it is being decompressed, the action script processor 100 may commence processing of the decompressed portion (in a pipleline) as the balance of the file continues to be decompressed. The action script processor 100 converts both the descriptions (string-based tags, bytecodes, control information or other descriptions) and the data of the action script (and its related or referenced data files) directly into a plurality of directly executable operational codes (or instructions) having variable-length operands. More particularly, the action script processor 100: (1) directly converts the action script descriptions (string-based tags, control information, control tags, definition tags, dictionary tags, or other descriptions, which may be ASCII-encoded or bytecode-based) into basic, graphical primitive instructions (e.g., operational codes or "op codes") for native or direct execution in the action script processor 100 as mentioned above and as further discussed below; and (2) directly converts the data of the action script (and its related or referenced data files) into "control words" having operand data, memory addresses, and various control bits and flags organized in a predetermined (or standard) data format (in database 145) for the corresponding graphical primitive instructions (as operational codes).

The action script processor 100 then performs the corresponding mathematical, arithmetic, logical and memory operations of the graphical primitive instructions (as op codes or sequences of op codes) using the data (and address) fields of the corresponding control word(s), and provides corresponding pixel information to the frame buffer 110 or directly to the display interface (or controller) 130, which in turn may then perform various display functions such as alpha ($\alpha$) blending. In exemplary embodiments, the op codes may be included within the control word, or the op code may also include an address pointing to the memory (105, or database 145) location of a separate control word having the corresponding data fields (such as the exemplary control word illustrated in FIG. 10). As mentioned above, the op code also may comprise a pointer to a memory location, which in turn then provides the desired sequence of hardware instructions or other control information. Also as mentioned above, the op code itself may be machine code (e.g., native or otherwise executable microcode or binary code), or may also be decoded or converted into additional levels of control information, such as decoded, translated or otherwise directly or indirectly converted into machine code (e.g., native or otherwise executable hardware sub-instructions such as microcode, binary, or other hardware control signals which control the operation or output selection of the circuitry which performs corresponding mathematical, arithmetic, logical, control, and memory operations).

It should be noted that this direct conversion of the action script descriptions, such as string-based tags and bytecodes, into actionable (executable) instructions as operational codes with variable length operands, using a standardized format for data to form one or more control words, for direct execution by the action script processor 100, enables several significant features. Especially important, it enables the accelerator apparatus and system (100, 120, 150) to process graphics for visual display from any of a plurality of different types of actions scripts, rather than the prior art requirement of a separate plug-in, application or program for each different type of action script. In this way, different types of actions scripts are converted to the same set of op codes for direct execution. In addition, any of a plurality of different data structures which may be utilized by any of these different action scripts are converted into a single, uniform data structure, which then may be utilized for direct execution by the accelerator apparatus and system (100, 120, 150). Moreover, as discussed in greater detail below, the accelerator apparatus and system (100, 120, 150) may be utilized to process graphics for visual display from new and currently unknown actions scripts, simply by updating the memory 105.

This direct conversion of the action script descriptions, such as string-based tags and bytecodes, into actionable (executable) instructions as operational codes with variable length operands, using a standardized format for data to form one or more control words, for direct execution by the action script processor 100, eliminates the innumerable software stacks and API calls of the prior art software-based script processing, and provides significant hardware and software acceleration, enabling display of graphics in devices which otherwise do not have significant processing capabilities, such as televisions and mobile communication devices. In an exemplary embodiment, the first processor 125 and/or apparatus 120 (when the functionality of the first processor 125 and the functionality of the second processor 100 is implemented as a single IC) is then utilized to perform all or most other internet-related functions, such as hypertext transfer protocol ("HTTP") processing, various email and file transfer protocol processing (e.g., SMTP, FTP), Transmission Control Protocol ("TCP") and Internet Protocol ("IP") (TCP/IP) processing, including hypertext markup language ("HTML") and extensible markup language ("XML") processing, and in some exemplary embodiments, all other audio and video processing of web-pages for display. In another exemplary embodiment, the second, action script processor 100 also performs audio and video processing. The first processor 125 may also be utilized for exception processing. A wide variety of distributions of functionality are available and are within the scope of the claimed invention, as discussed in greater detail below. This hardware acceleration of an action script to produce a graphical image or object is conceptually illustrated in FIG. 6.

The first processor 125 also may be further configured to pre-fetch data which has been referenced in a data file such as an HTML file or other web page data. For example, the first processor 125 may be configured to identify tags or references within the data file indicating that some additional data (e.g., a video file) is to be fetched to complete the web page. Without waiting for the browser software stack to process intervening information, the first processor 125 may pre-fetch the referenced data and store it in memory 105, to further reduce processing delays in rendering the complete web page.

It should also be noted that when the action script processor 100 is to be implemented with a pre-existing first processor 125 (having a predetermined architecture), it may be memory-mapped to the first processor 125, such that the action script processor 100 appears to the first processor 125 as a virtual memory or as a virtual display 155, and no retrofitting or other modification is required for the first processor 125. For example, the action script processor 100 may connect to the first processor 125 (through port or pin "80" (illustrated as port or pin 160 in FIG. 3)) using a secure digital I/O (SDIO) protocol. Using such a bidirectional I/O, the action script processor 100 may also provide feedback to the first processor 125, including user input from an executed or displayed action script, such as a mouse-click on an action script button. Moreover, the first processor 125 and the action script processor 100 may be configured to share memory circuits, such as memory 105 (with database 145) and/or frame buffer 110, which are then utilized as a common memory for both processors. In addition, the action script processor 100 may receive information from the display interface or controller 130, including information pertaining to various display properties, such as available screen resolution.

Figure 4:
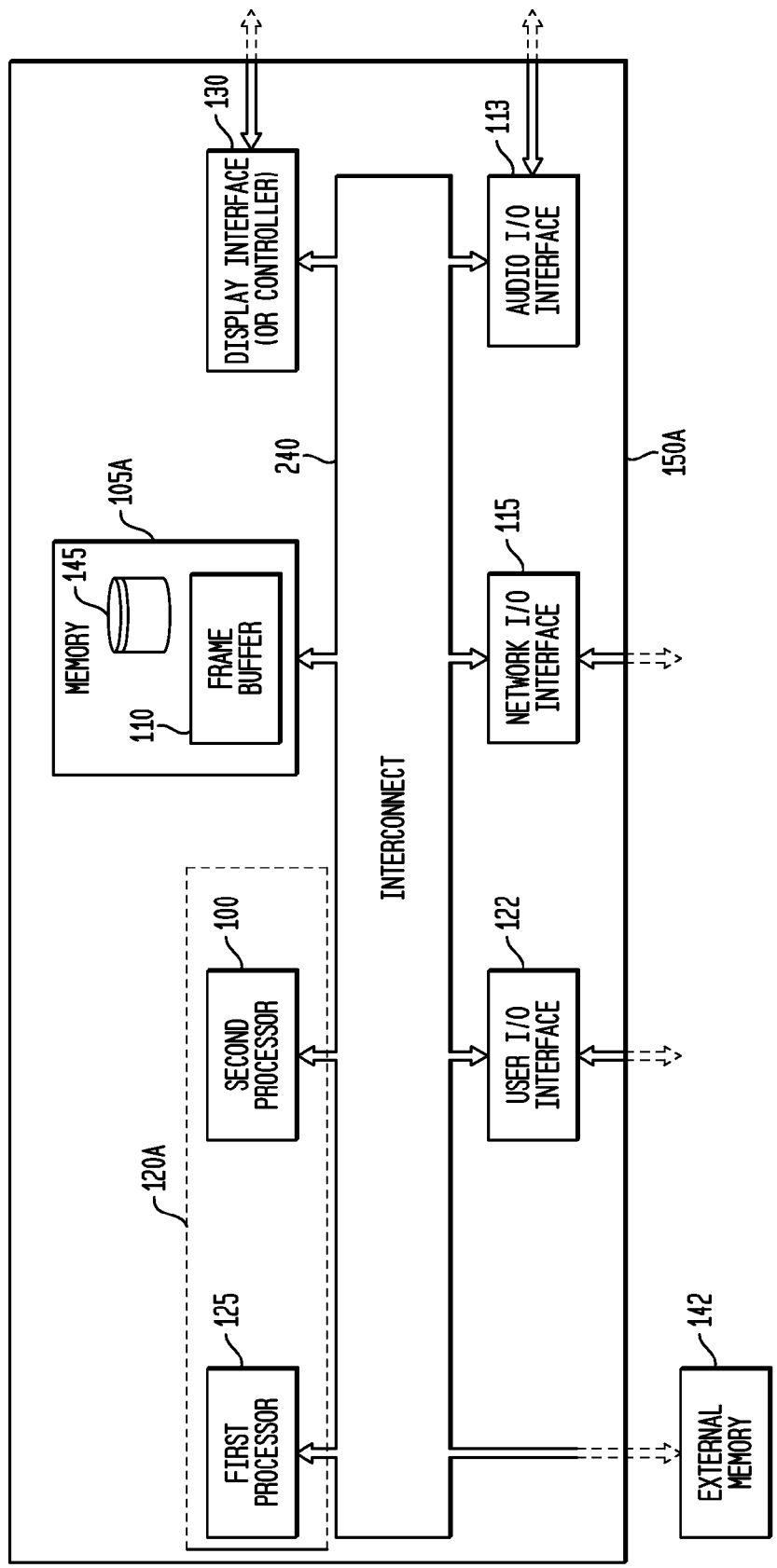

FIG. 4 is a block diagram illustrating in greater detail an exemplary second system 150A embodiment and exemplary first (100) and third (120A) apparatus embodiments in accordance with the teachings of the present invention. In this exemplary embodiment, the second system 150A is embodied as a "system on a chip" (an "SOC"), such that the second system 150A is implemented as a single integrated circuit. The second system 150A also comprises a first processor 125; a second, action script processor 100; a network I/O interface 115, a user I/O interface 122, and memories 105 and 110 (with the latter memory illustrated as frame buffer 110 within memory 105). Depending upon the selected embodiment, the system 150 may also include an audio input/output interface 113 (e.g., for coupling to a microphone, to audio speakers or other audio player 117 as discussed above), and a display interface or controller 130, also as discussed above. The third apparatus embodiment 120A differs from the second apparatus embodiment 120 in utilizing the interconnect 240, and otherwise functions substantially the same as the second apparatus embodiment 120 and may be utilized as discussed with respect to the second apparatus embodiment 120. The exemplary second system 150A functions substantially the same as the first system 150 and may be utilized as discussed with respect to first system 150. Also as illustrated, the second system 150A may be couplable to an external memory 142, such as a separate memory IC.

In selected embodiments, the exemplary second system 150A also utilizes an interconnect 240. In exemplary embodiments, the interconnect 240 is configurable, such as for configurable or variable data routing or data switching, and may also include local memory or buffer circuits for direct data transfer between circuit elements (without requiring additional load/store and fetch cycles for data transfer to and from memory 105 or another memory), in addition to providing data and control busses or other connections or couplings. For example, a configurable interconnect 240 may be coupled as illustrated to the first processor 125, the second, action script processor 100, the network I/O interface 115, the user I/O interface 122, the memories 105 and 110, the audio I/O interface 113, and the display interface or controller 130, also as discussed above. For example and without limitation, the configurable interconnect 240 may comprise switching or routing circuitry, for data packet routing, data streaming, or circuit switched communication, or combinations of such switching and/or routing circuitry, such as a cross-point switch, a cross-bar switch, a hybrid packet and circuit switched circuit, a multiplexer, a data router, and various combinations of such switching, streaming or packet routing circuitry, in addition to other bus and wiring structures, and may be hierarchical or non-hierarchical, for configuration of a data path between or among the first processor 125, the second, action script processor 100, the network I/O interface 115, the user I/O interface 122, the memories 105 and 110, the audio I/O interface 113, and the display interface or controller 130. The resulting data paths, for example and without limitation, may be point-to-point, broadcast (one-to-many), multicast (many-to-many), etc. In addition, not separately illustrated in FIGS. 4 and 5, the interconnect 240 may also be utilized to provide a direct connection to a display 155 or other component.

In an exemplary embodiment illustrated in FIG. 16 and discussed below, the interconnect 240 further comprises local memory or buffer circuits for direct data transfer between circuit elements (without requiring additional load/store and fetch cycles for data transfer to and from memory 105 or another memory), in addition to providing data and control busses or other connections or couplings. For example, a configurable interconnect 240 may be coupled to various execution circuits (which may comprise the first processor 125 and the second, action script processor 100), with the configurable interconnect comprising a memory circuit such as a multiport register and switching circuitry (e.g., a cross-point switch, a multiplexer, a router) for configuration of a data path between or among the execution circuits. When implemented as a configurable interconnect, the interconnect 240 may be configurable as part of the initial circuit design, or in advance of operation (such as during IC configuration (e.g., as part of advance configuration of FPGA-type components)), or during run-time (configurable and potentially reconfigurable during action script processing).

Figure 5:
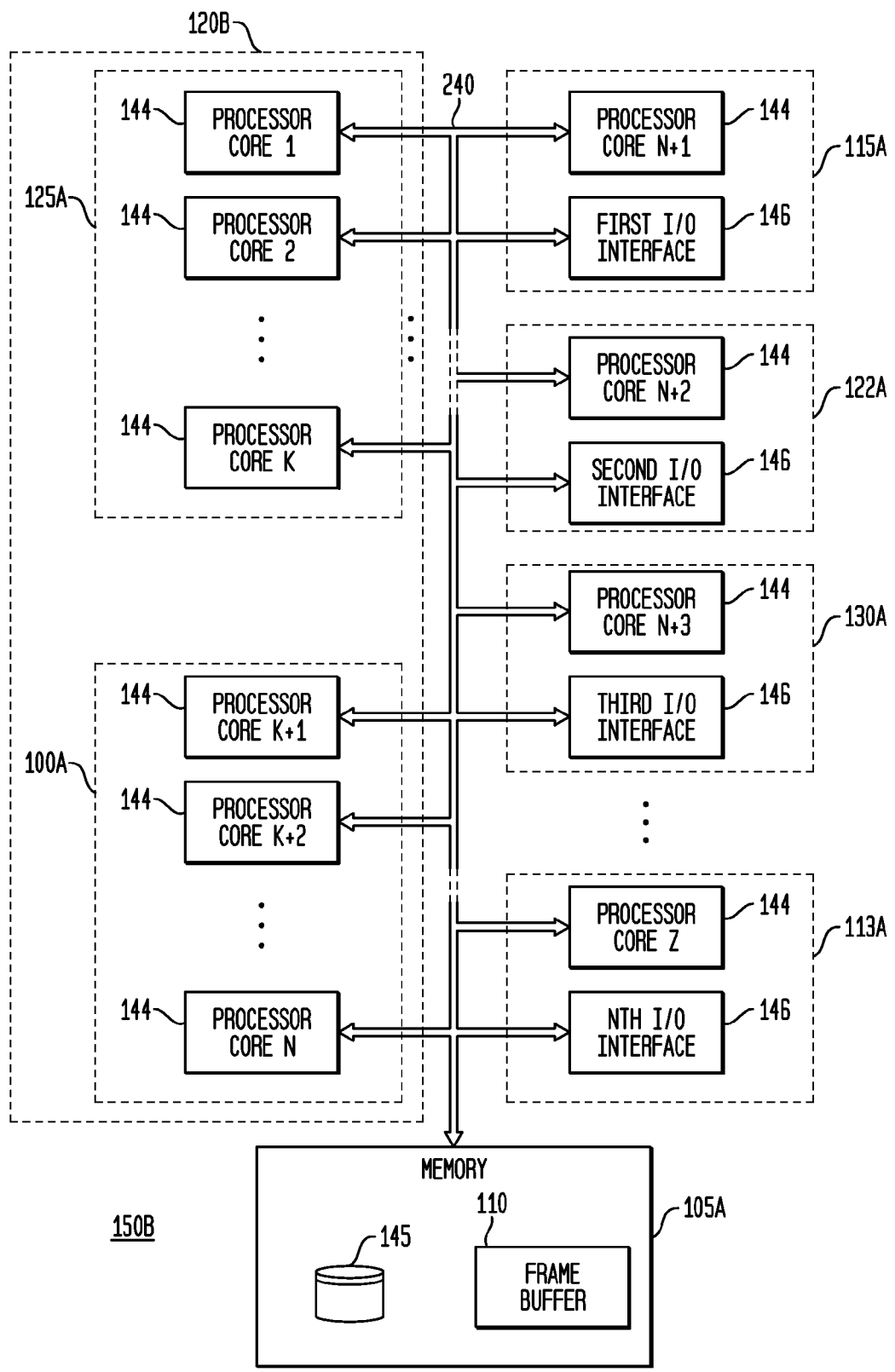

FIG. 5 is a block diagram illustrating in greater detail an exemplary third system 150B embodiment and exemplary fourth (100A) and fifth (120B) apparatus embodiments in accordance with the teachings of the present invention. (The action script processor 100A is a second embodiment of the second processor referred to as an action script processor 100, and is a fourth apparatus embodiment). The exemplary third system 150B functions substantially similarly to the first system 150 and the second system 150A, and may be utilized as discussed with respect to the first system 150 and the second system 150A. Similarly, the exemplary fourth (100A) apparatus functions substantially similarly to the first apparatus 100 and may be utilized as discussed with respect to the first apparatus 100, while the exemplary fifth apparatus 120B functions substantially similarly to the second and third apparatus embodiments 120, 120A, and the fifth apparatus 120B may be utilized as discussed with respect to the second and third apparatus embodiments 120, 120A. In this exemplary embodiment, the third system 150B, the fourth (100A) apparatus, and the fifth (120B) apparatus are embodied using a plurality of processor cores (or processing circuits) 144, such as the multiple processing cores that are or may be available on various processors, with the third system 150B further comprising a plurality of I/O interfaces 146. In many embodiments, the processor cores 144 may be implemented as substantially identical (or repeatable) circuits, and depending upon the type of off-chip communication necessary or desirable, the I/O interfaces 146 also may be substantially identical or quite different from each other (e.g., an I/O interface 146 for audio may be substantially different than an I/O interface 146 for a visual display).

The exemplary third system 150B also comprises a first processor 125A implemented utilizing a first plurality of processor cores 144 (processor core 1, processor core 2, through processor core K); a second, action script processor 100A (and fourth apparatus embodiment) implemented utilizing a second plurality of processor cores 144 (processor core K+1, processor core K+2, through processor core N); a network I/O interface 115A implemented utilizing an N+1 processor core 144 and a first I/O interface 146, a user I/O interface 122A implemented utilizing an N+2 processor core 144 and a second I/O interface 146, a display interface or controller 130A implemented utilizing an N+3 processor core 144 and a third I/O interface 146, an audio input/output interface 113 implemented utilizing a $Z^{TH}$ processor core 144 and an $N^{TH}$ I/O interface 146, and memories 105A and 110 (with the latter memory illustrated as frame buffer 110 within memory 105). In selected embodiments, the exemplary third system 150B may also utilize an interconnect 240 or any other bus or connection structure. The fifth apparatus 120B embodiment comprises the first processor 125A and second processor 100A.

Not separately illustrated, any of these various system 150, 150A and 150B implementations may include a mix or combination of components, such as a combination of processors, processor cores, custom (e.g., ASIC) circuitry, and configurable circuitry such as FPGAs. For example, any of the various first or second processors 125, 125A, 100, 100A may be configurable and/or reconfigurable, at design time, at a separate configuration in advance of data processing, or during data processing run time. In addition, as illustrated and discussed with reference to FIG. 18, the various functions of the claimed invention may be distributed between and among components in a wide variety of equivalent ways, in addition to the exemplary distributions between and among the first processor 125 and the second processor 100.

Figure 6:
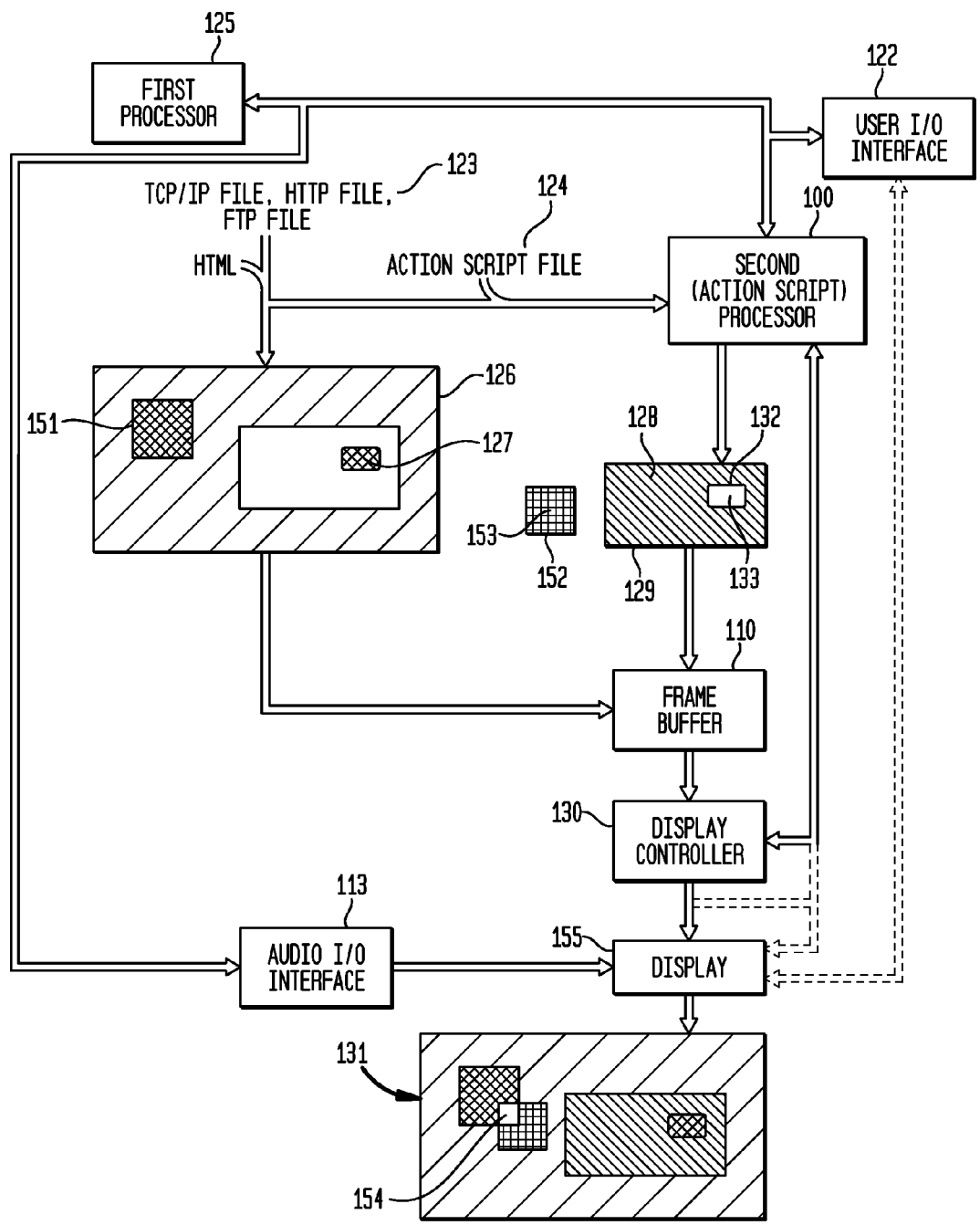

FIG. 6 is a diagram illustrating, at a high or conceptual level, operation of an exemplary system 150 embodiment in accordance with the teachings of the present invention. As illustrated, the first processor 125 is running the HTTP protocol software stack, and has obtained an HTTP file 123 (or a TCP/IP packet or file, or an FTP file, for example). Using instructions provided in accordance with the claimed invention (a software "shim" within the HTTP protocol stack), the action script 124 portion of that file or packet, in its entirety, is transferred by the first processor 125 to the second, action script processor 100, or more particularly, to the memory 105 for use by the action script processor 100. In a selected embodiment, the first processor 125 renders the HTML 126, photographic (jpeg) 151, and video 127 portions (along with any audio), which are then provided as data to the frame buffer 110, for display (via the display interface (or controller) 130) by the display 155. (In an alternative embodiment, the action script processor 100 also provides the audio and video processing, and provides that corresponding data to the frame buffer 110.) The action script processor 100 processes the action script, providing data corresponding to the graphical lines 129, 132, 152, and fill 153, fill 128, and no fill 133 (which, instead, will be filled with video 127), which it then provides to the frame buffer 110, for display (via the display interface (or controller) 130) by the display 155, illustrated as a complete web page 131. It should also be noted that via the display controller 130, an overlay 154 is also provided between photographic portion 151 and image 152/153.

Data merging of the data for processed images from the action script and other data (e.g., video, HTML, jpeg, may be provided at a wide variety of system 150 (150A, 150B) locations, in addition to providing data merging (of digital data) at the level of the frame buffer 110. Audio data merging may occur directly to the display 155 or other audio output device, or through the first processor 125, the second processor 100, or any of the memories, such as frame buffer 110, for example and without limitation. Also for example, visual data merging may occur at innumerable places within the accelerator apparatus and system (100, 120, 150), such as at the level of the display controller 130 or at the level of the display 155 (illustrated as dotted lines from the second processor 100, with such dotted lines not illustrated separately for the first processor 125), such as by merging S video; Y, Cr and Cb components, composite signals, HDMI, VGA, cable modulation, LVDS, or DVI, for example and without limitation, which may have any of various digital or analog formats. In addition, such visual and/or audio data may also be routed to or through either the first processor 125 or second processor 110, which then provides the overall data merging provided to the frame buffer 110 or directly to the display controller 130 or display 155. A wide variety of types of data may be merged; for example and without limitation, a processed web page may be merged (as a "picture in a picture" or "PIP") with the visual display from a television/cable/satellite channel, with the processed web page itself a merger of many data streams, such as graphical objects, video, text, etc. All such variations of data types and data merging are considered equivalent and within the scope of the present invention.

In addition, also as illustrated in FIG. 6, user input may be provided at a wide variety of system 150 (150A, 150B) locations, such as via the display 155 or via a user I/O interface 122, for example.

Figure 7:
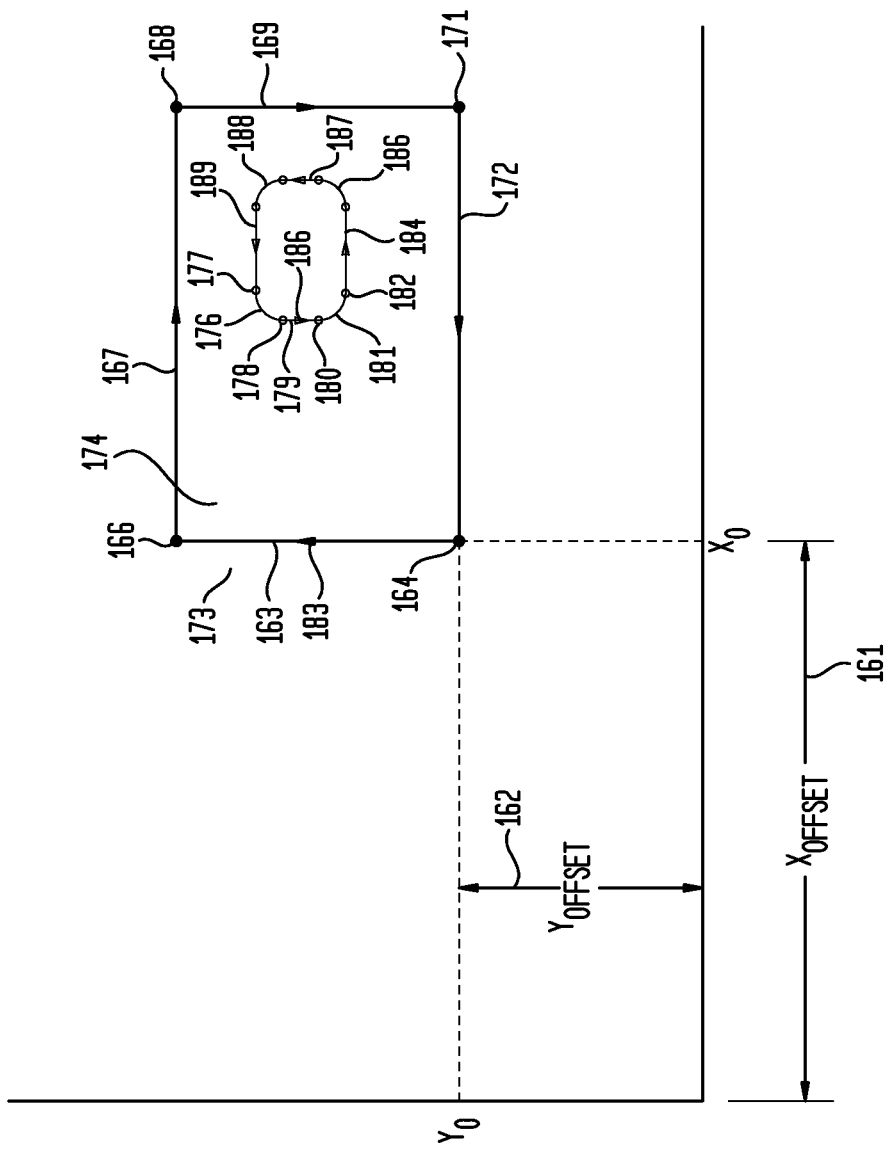
Figure 10:
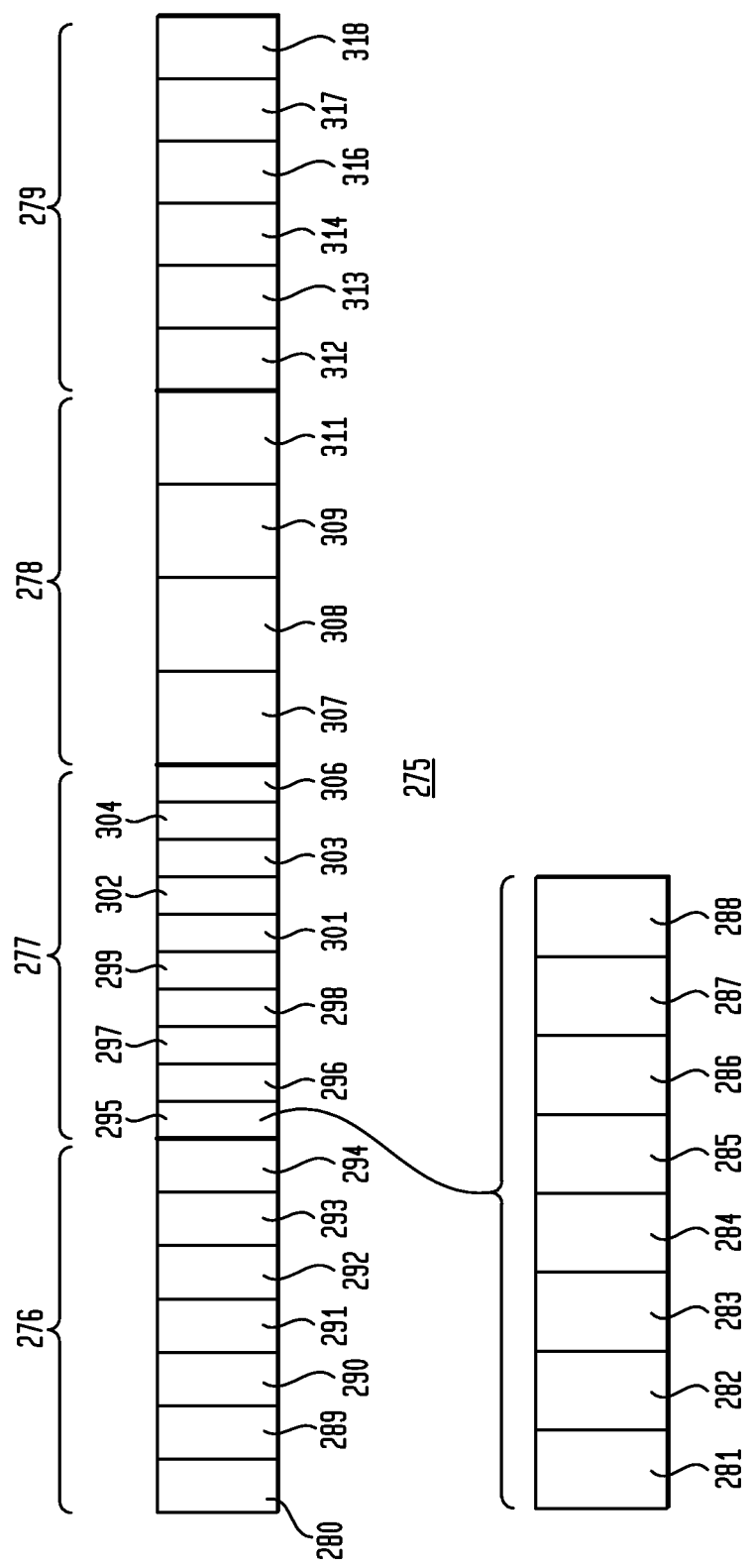

FIG. 7 is a diagram illustrating, at a high or conceptual level, exemplary graphical rendering by an exemplary system 150 embodiment in accordance with the teachings of the present invention, using the operational codes (as graphical primitive instructions) and corresponding data of the control word having a standardized format mentioned above. The various operational codes or "op codes" for native execution by the action script processor 100 include, for example, "draw line", "draw curve" (or arc), and data for their various styles, such as line styles (thickness, color) and fill styles (color, gradient), all with temporal sequencing available (such as to indicate linear or rotational movement successively from display frame to frame). The draw line and draw curve op codes will each control the action script processor 100 to calculate the next pixel (in x-y coordinates) of the corresponding line or curve (arc), respectively, executing a corresponding sequence of mathematical operations (also controlled by corresponding op codes) (such as the sequences of mathematical instructions used in a Bresenham line drawing algorithm or used in a parametric Bezier curve drawing algorithm, for example), and storing the result in frame buffer 110 or another register (such as a register for interim results). As illustrated, a draw line op code (or primitive) will iteratively execute to determine the pixels correspond to a line (or line segment) 163, which will be defined by (1) its starting point (164, in x-y coordinates) as specified in a predetermined field of its corresponding control word; and (2) its end point (166, in x-y coordinates), which is the starting point for the next, connecting line segment, so may be specified as such in the current control word and automatically used as the starting point for the next line or curve (as illustrated in FIG. 10). In an alternative embodiment, the end point may be specified in the current control word by the memory address for or pointer to the control word corresponding to the next line segment, and is obtained as the starting point defined in a predetermined field of that control word for the next segment 167)). Matrix coordinates used in various scripting languages are also converted to a display coordinate system (e.g., Cartesian). Straight lines are defined by the typical linear equation (y=mx+b, where x and y are display coordinates, m is the slope, and b is the y-intercept), while curved lines are defined by a Bezier equation:

$$B(t) = \sum_{i=0}^{n} \binom{n}{i}(1-t)^{n-i}t^{i}P_{i} = (1-t)^{n}P_{0} + \binom{n}{1}(1-t)^{n-1}tP_{1} + \ldots + t^{n}P_{n},$$

for $t \in [0, 1]$, which includes the start and end (anchor) points, and also one or more control points (not illustrated) which are not part of the curve, but which are used to mathematically define the curve, and which control points are also stored in defined fields within the control word. Alternative methods of specifying or defining straight lines and curves and calculating the corresponding pixels are considered equivalent and within the scope of the present invention.

The draw line or draw curve op codes will continue to be executed to produce each successive point of the line or curve, respectively, until the end points for the line or curve segment are reached. Draw line or draw curve op codes will then be executed for successive, connecting line or curve segments, until a complete (or closed) image, loop or area is formed (e.g., closed or completed loop or area because the ending point 164 of the last segment 172 is the starting point of the first segment 163 for the illustrated rectangle), such as the complete rectangle defined by segments 163, 167, 169, and 172, and the complete oval defined by segments 176, 179, 181, 184, 186, 187, 188, and 189. Each line segment (curved or linear) also includes a directionality (as a vector), such as direction 183 for segment 163 and the opposite direction 186 for segment 179, which then enables a determination of a right side 174 (for right side line and fill properties) and a left side 173 (for left side line and fill properties) for the given line or curve segment. Such line and fill properties, for right and left sides, such as color, thickness, or gradient, are also specified within predetermined data fields of the control word. Also as illustrated, the graphical image has an offset from the x-y origin, illustrated as $Y_{OFFSET}$ 162 and $X_{OFFSET}$ 161, which will be included in various arithmetic calculations to provide the correct pixel coordinates for the graphical image, which may then be provided without modification to the frame buffer 110 and is thereby automatically integrated with the other display data (for other regions of the display area) provided by the first processor 125.

Figure 8:
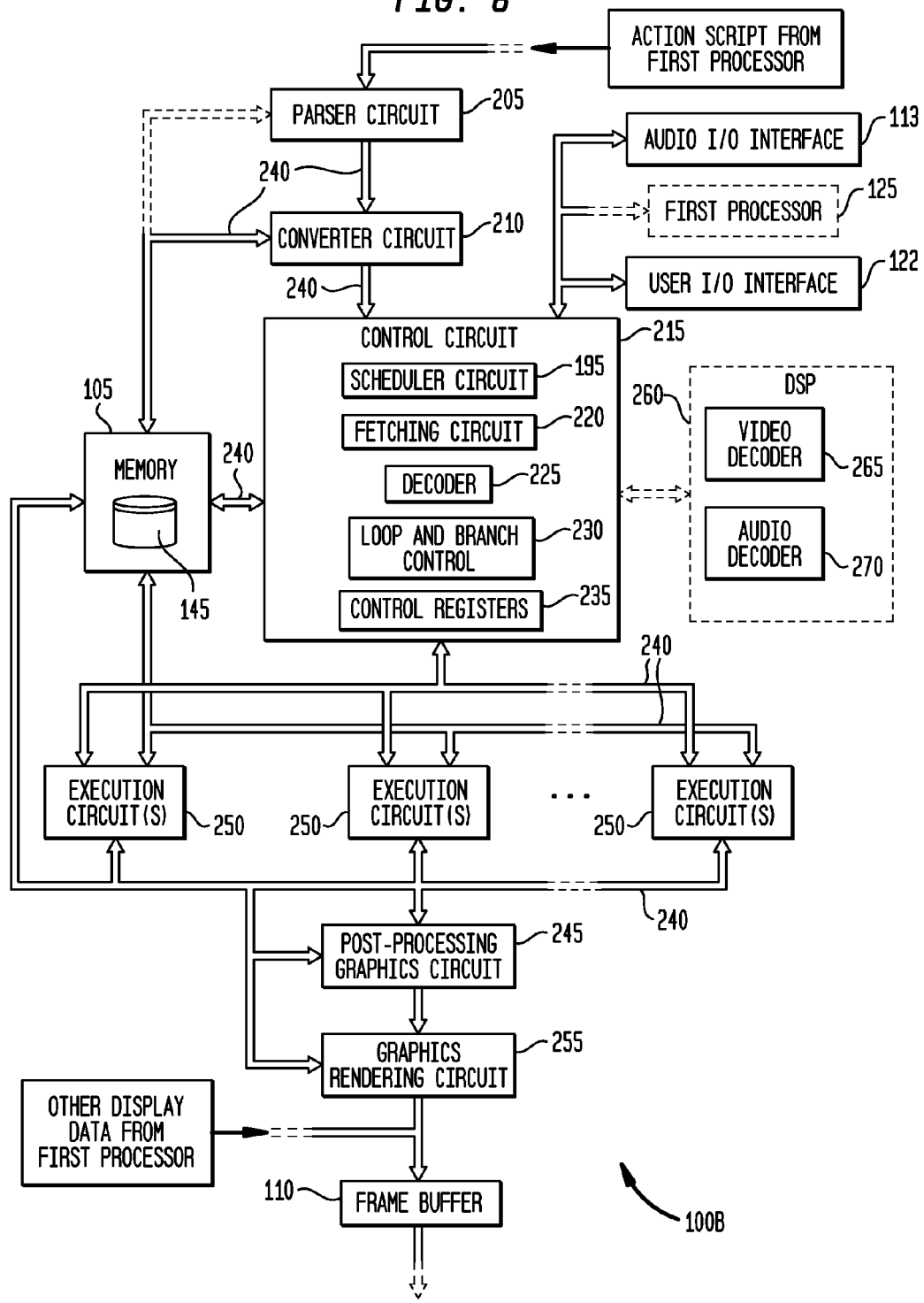

FIG. 8 is a block diagram illustrating in greater detail an exemplary action script processor 100B embodiment (as a sixth apparatus embodiment) in accordance with the teachings of the present invention. (More particularly, the action script processor 100B is a third embodiment of the second processor referred to as an action script processor 100 and is a sixth apparatus embodiment). The action script processor 100B comprises a parser circuit 205, a converter circuit 210, a control circuit 215, one or more execution circuits 250, a post-processing graphics circuit 245, a graphics rendering circuit or engine (unit or module) 255, and interconnect 240. In an exemplary embodiment, the post-processing graphics circuit 245 and/or graphics rendering circuit 255 may be included within or may utilize various components of the one or more execution circuits 250, or may be separate from the execution circuits 250. As an alternative option in an exemplary embodiment, the action script processor 100B may also include a digital signal processor ("DSP") 260 having a video decoder 265 and audio decoder 270, for video and audio processing, respectively (and, for this alternative embodiment, these functions are not required to be performed by the first processor 125), and which may also be coupled to memory 105 (not separately illustrated for ease of reference). The control circuit 215 typically comprises a scheduler (or scheduling) circuit 195, a fetching circuit 220, a decoding circuit 225, a loop and branch control circuit 230, and one or more control registers 235 (which may be separate registers or included within memory 105 or another memory circuit). In exemplary embodiments, as mentioned above, the interconnect 240 is configurable, such as for configurable or variable data routing or data switching, and may also include local memory or buffer circuits for direct data transfer between circuit elements (without requiring additional load/store and fetch cycles for data transfer to and from memory 105 or another memory), in addition to providing data and control busses or other connections or couplings. For example, a configurable interconnect 240 may be coupled to execution circuits 250, such as an arithmetic logic unit and a floating point execution unit discussed below, with the configurable interconnect comprising a memory circuit such as a multiport register and switching circuitry (e.g., a cross-point switch, a multiplexer, a router) for configuration of a data path between or among the execution circuits 250. In alternative embodiments, a reconfigurable interconnect 240 is not utilized, and any other type of bus or connection structure may be utilized instead, as illustrated and discussed with reference to FIGS. 18 and 19.

Figure 9:
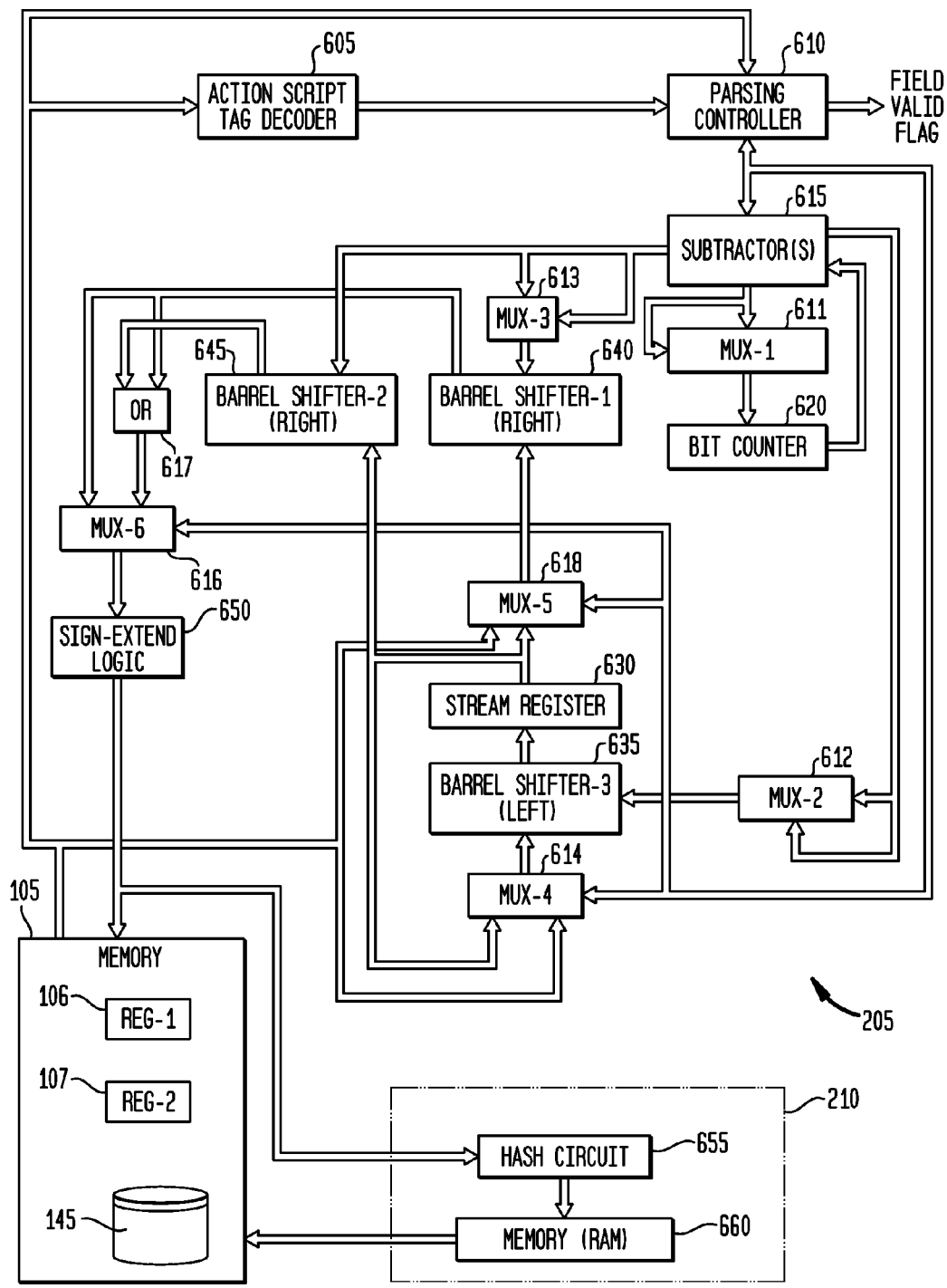

As mentioned above, in an exemplary embodiment of the first processor 125, executable code (such as a software "shim" or plug-in) has been inserted into its HTTP protocol software stack, enabling the first processor 125 to be configured to identify and separate an action script file from other incoming data (such as the remaining files comprising a web page when rendered), and to transfer the action script file to the action script processor 100, 100A, 100B (and 100C, and others described below) for processing, thereby performing a binning function, in addition to the other functions described above. In other embodiments of the first processor 125, circuitry (hardware) may be included within the first processor 125 to provide this identification, separation, and transferring functionality. The action script file may be provided to the parser circuit 205 as illustrated, or may be provided to the memory 105 in an alternative embodiment as illustrated in FIG. 9, and then read from the memory 105 by the parser circuit 205. Other data from the first processor 125 (e.g., data from rendering HTML, video, audio, etc.) may be provided directly to the frame buffer 110, with the display controller (130) configured to perform other data processing for proper display on the selected display 155, including any data or image overlays, such as through alpha blending. The control circuit 215 also may communicate directly with the first processor 125, such as for exception processing and for processing of user input.

The parser circuit 205 parses the action script file, field by field, based on its corresponding descriptive content, such as any delimiting tags or bytecodes, separating it into corresponding tags (or other descriptions) and data fields. Parsing, in this context, should be understood to mean and include extracting, partitioning, or otherwise separating out a number of bits from a bit stream, such as by shifting out the number of bits from a register, which may be a fixed, predetermined, or variable number of bits (e.g., due to the variable length of the descriptions such as tags). The parser circuit 205 also forms a data conversion, populating predetermined fields of a corresponding control word with the extracted (parsed) data fields, and then transfers the descriptions (such as tags or other bytecodes) to the converter circuit 210. To perform these operations, the parser circuit 205 initially decodes each description (e.g., tag) to determine its type. Then based on the type of description (tag), the parser circuit 205 will select a corresponding parsing op code (or instruction) and parse the corresponding data accordingly, selecting the corresponding number of bits specified, which may be constant or variable, which may or may not include a flag for a conditional operation, which may examine but not consume the specified bits, or which may reset various counters or registers. This parsing will continue for each description (tag or bytecode) of the action script file, with the extracted data corresponding to each description (tag or bytecode) placed into predetermined fields of a corresponding control word stored in memory 105.

Exemplary parsing operational codes include, without limitation: (1) parse constant, such as for a define shape tag or style change record, which will extract (parse or pass) the number of bits specified in the tag, and whether it is signed or unsigned; (2) parse variable, which will extract or parse a number of bits specified by a variable at selected or indexed positions in the action script file or field; (3) parse constant and parse variable with flags, for a conditional bit extraction, which will examine a specified location to determine if the corresponding bit is set and, if so, will extract or parst the corresponding constant or variable number of bits; (4) parse constant and parse variable which is incrementable, with or without flags, which will extract the corresponding bits and increment an index value for the bit parsing (data transfer); (5) parse with removing padding zeroes, in which padding zeroes utilized for bit alignment are removed from the corresponding data stream; (6) parse to determine, but not disturb (or consume) the next bits in the data stream; and (7) parse with resetting, such as to reset values for pointer addresses in various registers or to reset counter values, for example. These parsing op codes, in binary form, are utilized as control signals (provided by the parsing controller 610) in the exemplary parser circuit 205 illustrated in FIG. 9, such as for providing selection signals to various multiplexers and to input the number of bits to parse, for example. Those having skill in the art will recognize that the executable, binary form of the parsing op codes, and of the other op codes utilized in the exemplary embodiments, will depend upon and correspond to the selected circuit implementations (for both control and data calculation and manipulation), and all such op codes utilized to perform the functionality of the exemplary embodiments are considered equivalent and within the scope of the present invention.

FIG. 9 is a block and circuit diagram illustrating exemplary parser circuit 205 and converter circuit 210 embodiments in accordance with the teachings of the present invention. As indicated above, the action script tag decoder 605 performs an initial decoding of each of the descriptions (tags or bytecodes) of the action script file to determine the corresponding type of description (tag or bytecode), and any immediate values contained in a corresponding data field indicative of the number of bits which are to be parsed. The decoder 605 may be implemented as a conventional decoder configured for the decoding of the specific descriptions (tags or bytecodes) of anticipated or relevant action script files, as known or becomes known in the art. In an exemplary embodiment not separately illustrated, the decoder 605 may be implemented similarly to the converter circuit 210, such as having a hash circuit to perform a hash operation on the description (tag or bytecode) and to use the hash result as an entry into a memory having a look-up table which, in this case, would provide the corresponding type of description (tag or bytecode), which are then provided as control bits (signals) to the parsing controller 610. Such an implementation is advantageous, as the decoder 605 (and converter circuit 210) may be updated for operating on new types of action scripts, descriptions, tags, and bytecodes through a memory update of the corresponding look-up table, which may be provided by a network 180 service provider, such as an internet service provider or content provider, for example.

Based upon the type of description (tag or bytecode), the parsing controller 610 (typically implemented as combinational logic and memory) selects the corresponding parsing op code. Also based upon the type of description (tag or bytecode), the parsing controller 610 may obtain (from the memory 105) flag information (set/unset, from register 106) and variable information (e.g., the value of a variable, as determined from previously parsed tags and data, if any, from register 107). The parsing controller 610 may also include an adder (or utilize an adder within an execution circuit 250), such as to add an immediate value to a variable from memory 105. Based upon the type of description (tag or bytecode), and in addition based upon information determined from other circuits of the converter circuit 210 (such as subtractors 615, any immediate values provided by the decoder 605, any values of variables obtained from the memory 105, and any values of variables determined by the parsing controller 610 (e.g., incremented values), the parsing controller 610 provides the corresponding control bits (as signals) to other circuits of the parser circuit 205, such as selection control bits to multiplexers ("MUXes") 614, 616, 618, and a parameter indicating the number of bits to parse ("BITS_TO_PARSE" or the number of bits to parse parameter) to subtractors 615. The control bits indicating the number of bits to parse (selected or determined by the parsing controller 610 from a decoded immediate value from decoder 605, or as a variable from memory 105, or as an incremented value) are then provided to subtractors 615. In an exemplary embodiment, the parsing controller 610 is implemented using multiplexers (with selection signals provided by the decoder 605), an adder, and combinational logic gates. Other control bits (as signals) are also generated by the subtractors 615 and provided to other circuits of the parser circuit 205 as described below, such as multiplexers 611, 612, 613.

The stream register 630 stores bits from the action script file. For purposes of explanation and not of limitation, such as for explanation of the control bits provided by subtractors 615, it may be assumed that the stream register 630 may hold up to 32 bits. Barrel shifters (right) 640 and 645 will shift out and provide as output the required number of bits to parse, which will subsequently be stored in a predetermined field in a corresponding control word in memory 105. A bit counter 620 contains the value of the number of bits currently in the stream register 630. When bits have been shifted out of the stream register 630, additional bits will be shifted in from memory 105, via barrel shifter (left) 635 and multiplexer 614. If there are too few bits in the stream register 630, a selection signal to multiplexer 614 will be provided (from parsing controller 610 using the results provided by subtractors 615) for shifting additional bits in from memory 105. In other circumstances, the output from the stream register 630 may also be shifted back in, also via a selection signal to multiplexer 614.

In an exemplary embodiment, four subtractors 615 are utilized. First and second subtractors 615 each determine a difference between the number of bits in the bit counter 620 and the number of bits to be parsed. For example, when the bit counter 620 is 32 (indicating 32 bits in the stream register 630), and the number of bits to parse is eight, the first and second subtractors 615 will provide an output equal to twenty-four. The output from the first subtractor 615 will be utilized to update the bit counter 620, via multiplexer 611. The output from the second subtractor 615 is provided as an input to a third subtractor 615, along with the maximum number of bits available to be held in the stream register 630 which, in the example is thirty-two. The result from the third subtractor 615, in this case eight, is provided via multiplexer 611 to the bit counter 620. A fourth subtractor 615 determines a difference between the maximum number of bits available to be held in the stream register 630 (which, in the example is thirty-two) and the number of bits to be parsed (eight in the example), providing an output equal to twenty-four.

When there are a sufficient number of bits available in the stream register 630 (e.g., 32 (stream register 630 is full), and 8 are to be parsed), as indicated by the first subtractor 615 (as 24 will still be remaining in the stream register 630), a corresponding selection signal to multiplexer 613 selects that number of bits to be parsed (as an output from either the third or fourth subtractor 615), so that the barrel shifter 640 will shift out the corresponding number of bits (which are then passed via a corresponding selection signal to multiplexer 616), and the bit counter 620 is also updated, also via a corresponding selection signal to multiplexer 611 (as an output from either the third or first subtractor 615). When there are not a sufficient number of bits available in the stream register 630 (e.g., 8 remaining, and 24 are to be parsed), barrel shifter 645 shifts out the first 8 bits, the stream register 630 is replenished with 32 bits, barrel shifter 640 shifts out the next 16 bits, which are then concatenated with the first 8 bits via OR-gate 617 (which are then passed via a corresponding selection signal to multiplexer 616).

When the parsed field is signed, as indicated by its most significant bit ("MSB") (which may be provided as a selection signal to sign-extend logic block 650, not separately illustrated), the parsed bits (e.g., 10) are sign-extended (e.g., to 32 bits) by sign-extend logic block 650. The resulting parsed data is then provided to memory 105 (e.g., database 145) for storage in a predetermined field of the corresponding control word. Parsing then continues with the next data field for the tag or bytecode of the action script file, followed by decoding the next tag or bytecode and parsing its data fields, and so on, until a complete frame has been decoded and parsed.

The converter circuit 210, in turns, converts the description (tag or bytecode) into a corresponding op code. For example, as illustrated in FIG. 9, using hash circuit 655, the converter circuit 210 may perform a hash operation on the parsed description (tag or bytecode), and use the hash result as an address entry or index into a memory 660 (e.g., RAM having a look up table ("LUT")), which then provides the corresponding op code as its output. In an alternative embodiment, the hash result is compared to a plurality of pre-existing bit sequences, which a matching sequence utilized to provide the corresponding op code. While illustrated using a hash circuit 655 to perform a hash function or operation on the parsed description (tag or bytecode), any other type of deterministic conversion function may be utilized equivalently to such a hash function, generally for the purpose of reducing the number of bits which may be needed to be compared or matched to determine the resulting op code. In another exemplary embodiment, the descriptions (tags or bytecodes) are not required to be separately converted into a hash or other deterministic result having a reduced number of bits, but are used directly as entries into a LUT to determine the corresponding op code. The op code is then provided either as a field in the control word, or as an op code with an additional field having an address pointing to the memory (105, or database 145) location of the control word having the corresponding data fields. As mentioned above, this implementation is advantageous, as the converter circuit 210 may be updated for operating on new types of action scripts, descriptions, tags, and bytecodes through a memory update of the memory (e.g., look-up table) 660, which may be provided by a network 180 service provider, such as an internet service provider or content provider, for example.

This direct conversion of the action script descriptions, such as string-based tags and bytecodes, into actionable (executable) instructions as operational codes, enables the accelerator apparatus and system (100, 120, 150) to process graphics for visual display from any of a plurality of different types of actions scripts. In this way, different types of actions scripts are converted to the same op codes for direct execution. In addition, through the decoding and parsing of the action script descriptions, any of a plurality of different data structures which may be utilized by any of these different action scripts are converted into a single, uniform data structure, which then may be utilized for direct execution by the accelerator apparatus and system (100, 120, 150). Moreover, the accelerator apparatus and system (100, 120, 150) may be utilized to process graphics for visual display from new and currently unknown actions scripts, simply by updating the memory 660.

FIG. 10 is a diagram illustrating exemplary control and data fields of a control word embodiment in accordance with the teachings of the present invention. As indicated above, in this exemplary embodiment, the op code includes the additional field with an address pointing to the location in memory 105 (or database 145 in memory 105) of a separate control word 275 having the corresponding, predetermined data fields. The parser circuit 205 is utilized to populate the predetermined data fields, while the converter circuit 210 is utilized to convert an action script tag or bytecode into an executable op code (with an address generator (illustrated in FIG. 11) utilized to provide the pointer to the control word address in memory 105. The exemplary control word 275 is illustrated having a plurality of predetermined data fields (276, 277, 278, 279), each of which contains a plurality of predetermined data sub-fields, and which are utilized to define any graphical shape. Header field 276 comprises a plurality of sub-fields for specifying the number of links (or segments) utilized to form a line or curve as a closed loop (291); the starting address location of the shape data (289); the number of different styles utilized for the selected shape (as a count of style changes) (290); the starting bit position of the first link or segment (292); the fill style array ("FSA") or the address for where the FSA is stored (293); the line style array ("LSA") (294) and/or the address for where the LSA is stored (280); the address for the shape data. Style change record field 277 comprises a plurality of sub-fields for specifying control bits (295); a link to the next segment (on the left) (296); a link to the next segment (on the right) (297); left and right fill indices (or addresses) (298); a line index or address (299); a starting x-coordinate (301); a starting y-coordinate (302); the start address for the segment data (303); the next segment address (304); and optionally if a new style is present (e.g., for the same graphical object having a second instantiation with different fill and line properties), additional sub-fields comprising the starting addresses for the new LSA, the new FSA, the new LSA, the starting x-coordinate; the starting y-coordinate, and any move flag (306). The control bits (295), in turn, comprise various flags indicating if new styles are present (281), use of left (282) and right (283) fills, starting (284) and ending (285) bits for a closed loop with corresponding vector directions (forward or reverse), a disjoint flag (so successive linkage is not required) (286), a segment with no fill flag (287), and a movement type (288), indicating if the particular graphic will move (i.e., be re-rendered in a next or new location, such as part of a temporal sequence). A straight segment (or edge) record field 278 comprises ending x- and y-coordinates (308, 309) (which will also be the starting x- and y-coordinates for the next segment), and any pertinent flags to indicate the start (307) and end (311) of the field or record. A curved segment (or edge) record field 279 comprises ending x- and y-coordinates (313, 314) (which will also be the starting x- and y-coordinates for the next segment), control x- and y-coordinates (for defining the curvature) (316, 317), and any pertinent flags to indicate the start (312) and end (318) of the field or record.

As mentioned above, in an exemplary embodiment, the control words and the op code with an address indicating the location of its corresponding control word are stored in the memory 105, and more particularly stored as a linked list in a database 145 in the memory 105.

Referring again to FIG. 8, the control circuit 215 (using fetching circuitry 220) fetches from the memory 105 or database 145 an op code with an address indicating the location of the control word having the graphics data in its predetermined fields. Depending upon the op code, the decoding circuit 225 decodes the op code into a plurality of control bits (or successive sets of control bits) utilized to control the execution of the various execution circuits 250 to provide a specified result, such as a multiplication of two operands, or an addition of two operands, and so on. In other embodiments, the op code itself may comprise such control bits without additional decoding. Loop and branch control 230 is utilized for controlling successive operations (e.g., sequential multiplications) and conditional branching, typically also utilizing control registers 235, which may contain a link stack, branch addresses, flag bits, loop terminal counts, etc. For example, a draw line or draw curve op code, for calculation of next x- and y-coordinates, may be decoded into a sequence of sets of control bits, successively applied (e.g., using a program counter within the loop and branch control 230, not separately illustrated), with each set of control bits utilized for controlling a corresponding operation (e.g., incrementing a previous $x_0$ to provide $x_1$, multiplication ($mx_1$) and addition ($mx_1+b$), and converting (or rounding) the result to an integer value to generate the corresponding $y_1$ coordinate, followed by comparing the new $x_1$, $y_1$ with the end bits $x_n$, $y_n$, and a branch to a next segment (next draw line or draw curve) when $x_1$, $y_1$ are the end bits $x_n$, $y_n$, and otherwise repeating the sequence of sets of control bits until the line or curve is completed). Scheduler circuit 195 is utilized to coordinate and schedule various operations, whether sequential or in parallel, and may be implemented as known or becomes known in the art. For example, the scheduler circuit 195 may be utilized to implement temporal attributes of operation codes (from corresponding temporal attributes of descriptive elements of an action script), such as to coordinate and schedule a frame rate for dynamic graphical images, or to coordinate and schedule operations to be executed in parallel among a plurality of execution circuits 250.

Execution circuits 250, using the settings provided by the control bits, retrieve all or part of the control word from memory 105 or database 145, and perform corresponding mathematical, arithmetic, and logic operations. Exemplary execution circuits 250 are discussed below with reference to FIGS. 12 and 13. For example, selecting starting and ending x- and y-coordinates from the control word 275, an exemplary execution circuit 250 may calculate a line slope using two subtraction operations and a division ($m=(y_0-y_n)/(x_0-x_n)$), calculate a y-intercept using a multiplication and a subtraction ($b=y_1-m_1$), and use the resulting values in a plurality of successive calculations of pixel coordinates ($x_3$, $y_3$; $x_4$, $y_4$, etc.) for the selected line. In addition, to determine whether the end point of the selected line has been reached, the execution circuits 250 may perform a plurality of comparisons and other logical operations, determining whether the most recently calculated x- and y-coordinates are equal to the ending x- and y-coordinates from the control word as mentioned above, and if so, branching to the next segment for rendering (or if the last segment, proceeding to post-processing and graphics rendering), and if not, continuing to generate pixel locations for the current segment. In exemplary embodiments, a plurality of execution circuits 250 are provided, enabling parallel processing. For any selected graphical object, the pixels for each line (straight or curved) are calculated, either until a closed loop is formed or is not required (the disjoint flag or control bit). Also in various exemplary embodiments, when a right or left fill is to be applied, corresponding flags may be set, for each pixel, such that each pixel on the boundary of the graphical object will indicate whether an inside fill is to be created for the graphical object (e.g., a right fill or a left fill, depending upon the vector direction of the corresponding line or curve segments), or stated another way, that the pixels are boundary pixels. Floating point units ("FPUs", also referred to as floating point circuits) 350 and arithmetic logic units ("ALUs") 340 are exemplary execution circuits 250, illustrated and discussed below with reference to FIGS. 12 and 13.

Figure 14:
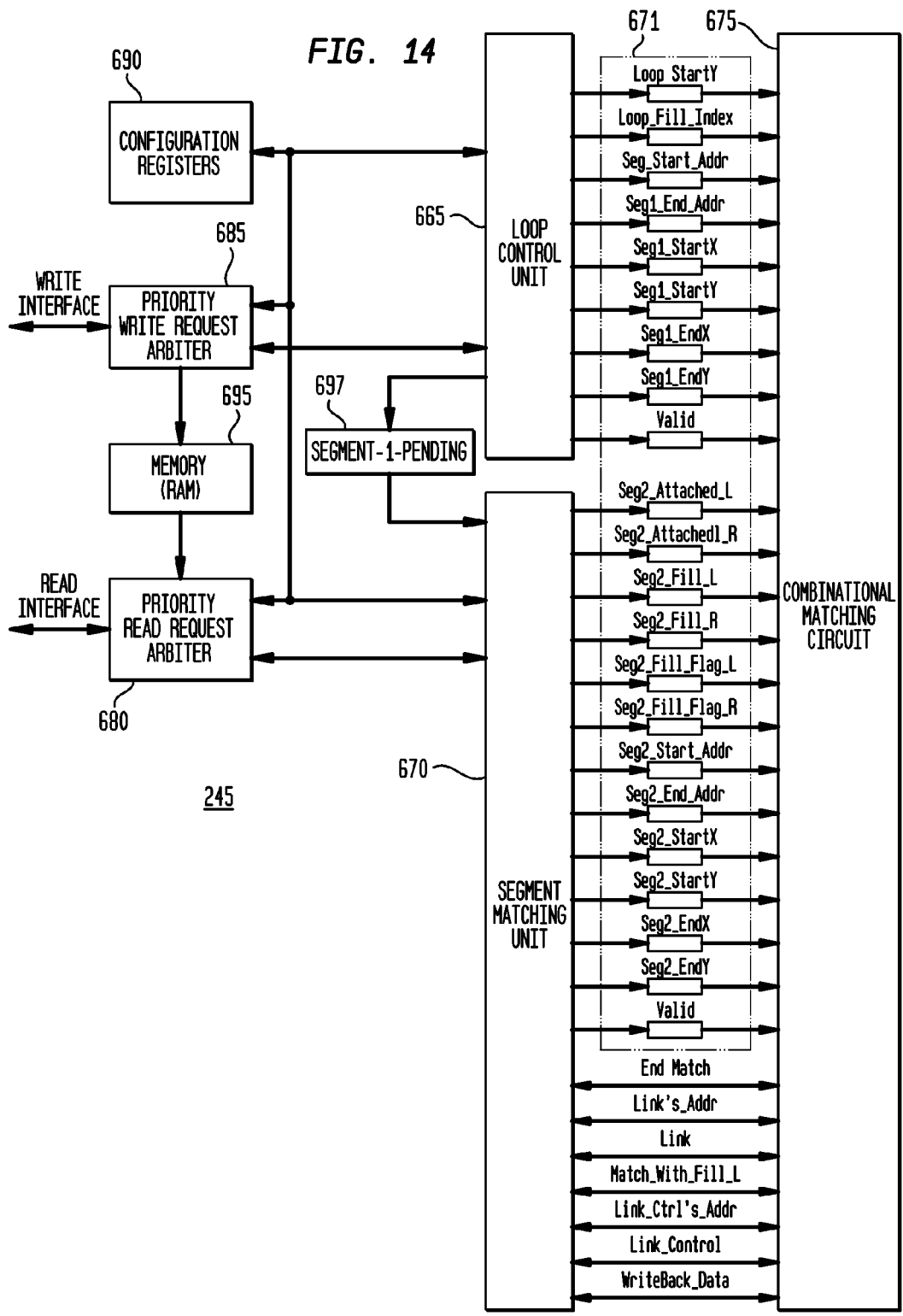

Once the closed loop for the selected graphical object has been completed, post-processing is commenced, either by the post-processing graphics circuit 245 or by the execution circuits 250 (when configured with the functionality of the post-processing graphics circuit 245). An exemplary post-processing graphics circuit 245 is illustrated FIG. 14. Referring to FIG. 14, because a plurality of line or curve segments may be completed and stored in memory (RAM) 695 in any order (with contention resolved by write request arbiter 685) (and more particularly, completed out of sequential order, especially when a plurality of line or curve segments are processed in parallel), the post-processing graphics circuit 245 provides matching of start and end points, for attaching the segments to each other in order and in a forward direction (the end of line 1 is the start of line 2) or in a reverse direction (end of line 1 is the end of line 2), followed by matching the segments for color, fill, etc. for graphics rendering. A loop control unit 665 fetches information for a first segment from memory (RAM) 695 (with read contention resolved by read request arbiter 680), such as a control word for the first segment and its corresponding pixel (x- and y-coordinates) information generated by execution circuits 250, loads corresponding registers 671, and maintains the segment to be matched (segment-1 pending) in register 697. A segment matching unit 670 fetches corresponding information for a second segment from memory (RAM) 695, such as a control word for the second segment and its corresponding pixel (x- and y-coordinates) information generated by execution circuits 250, and loads corresponding registers 671. When implemented using configurable hardware, configuration information is provided by configuration registers 690.

A combinational matching circuit 675 performs the matching discussed above, matching starting and end points, and matching color and fill properties. If a match is not found, a state machine within the segment matching unit 670 fetches corresponding information for a third segment from memory (RAM) 695, a fourth segment from memory (RAM) 695, etc., until a matching segment is found. This matching continues iteratively until a closed or complete loop (unless disjoint) is completed, and the resulting data provided to the graphics rendering circuit 255. For example, one of the line or curve segments may be shared across multiple shapes, and only needs to be rendered once; its corresponding control word, however, may have an opposing vector direction (consistent with a second shape). Accordingly, based upon the matching, the combinational matching circuit 675 provides the data for one segment in a first, forward direction (e.g., south-west to north-east), and then provides the data for the next segment (having been generated in second, reverse direction, such as south-east to north-west) in its reverse order (e.g., north-west to south-east), such that the resulting sequence has the same vector directionality and fill and line properties may be applied consistently by the graphics rendering circuit 255 (e.g., both segments having the same right-side for corresponding application of right-side fill, with the second segment potentially having a different left side fill corresponding to its joint membership in the second shape, also for example).

The graphics rendering circuit 255, using the LSA and FSA of the control word, which respectively provide line and fill properties, determines the corresponding pixels and properties for the remaining items of the graphical object, such as fill colors and gradients, and in an exemplary embodiment, utilizes an edge (or boundary) flag contour filling algorithm. The graphics rendering circuit 255 may be implemented as control circuitry (such as a state machine) using the execution circuits 250 (e.g., the ALUs and FPUs discussed below) to perform calculations of next pixels of the fill area, or in an alternative embodiment, may be implemented using such control circuitry with corresponding execution circuits 250 (e.g., having its own separate ALUs and FPUs discussed below).

Figure 15:
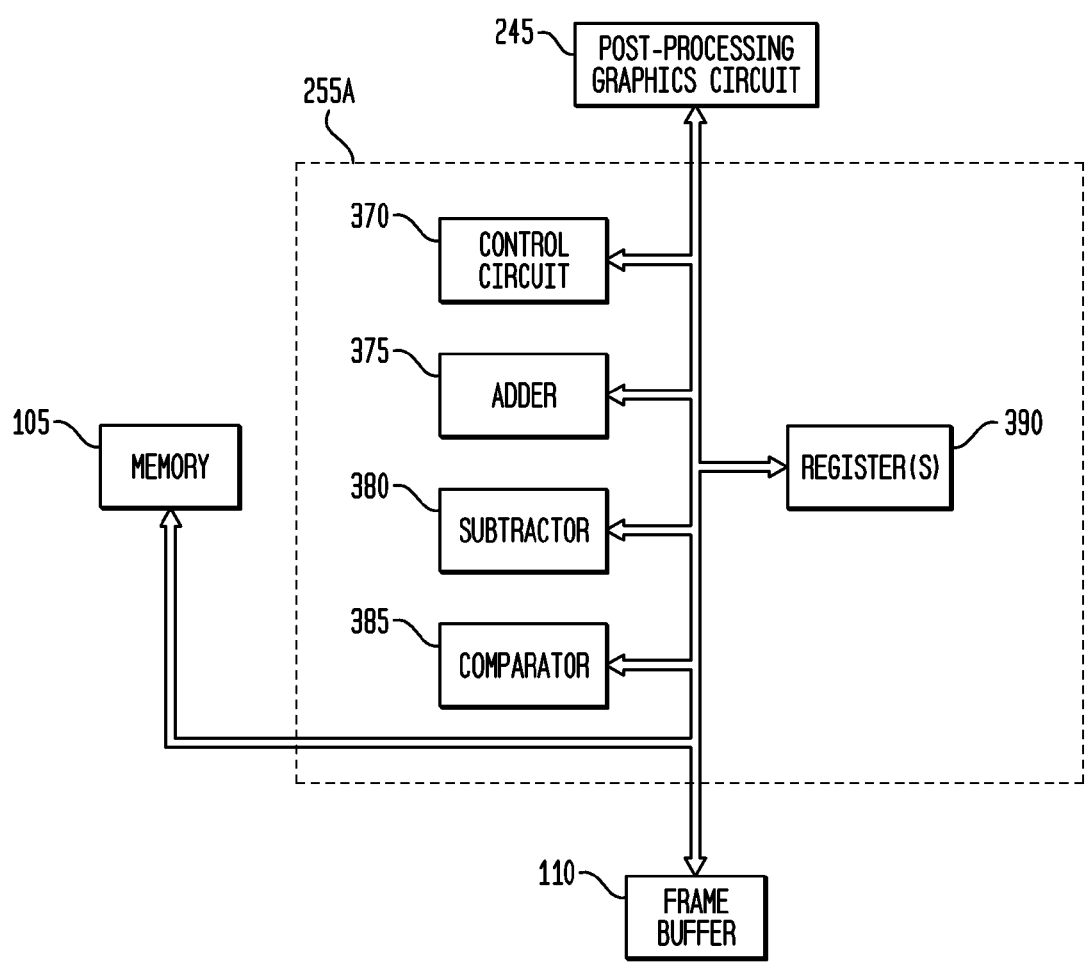

Another exemplary graphics rendering circuit 255A is illustrated in FIG. 15. As illustrated in FIG. 15, an exemplary graphics rendering circuit 255A may comprise and be implemented using a control circuit 370 (such as a state machine, to identify boundaries, edges, or corresponding flags), an adder 375 (to increment an x- or y-coordinate), a subtractor 380 (to decrement an x- or y-coordinate), and a comparator 385 (to compare an x- or y-coordinate with a minimum or maximum value for x- and y-coordinates). The graphics rendering circuit 255 may also includes memory, such as one or more local registers 390, storing minimum and maximum values for the x- and y-coordinates of the boundaries of the graphical object (with the boundary provided by the closed loop of connected line or curve segments) and any corresponding flags, such as a corresponding boundary flag. For example, when the graphical object is rectangular, each of its segments include its minimum and maximum x- and/or y-coordinates. Also for example, when the graphical object is not rectangular, but may be circular, its minimum and maximum x- and/or y-coordinates will be determined from four pixels (e.g., the lowest (left) x-coordinate, the greatest (top) y-coordinate, the greatest (right) x-coordinate, and the lowest (bottom) y-coordinate), which then define a rectangular work plane containing the graphical object, and most of the boundary or the graphical object will not include these minimum and maximum x- and/or y-coordinates.

When a fill is to be applied, beginning with corresponding minimum and maximum coordinates, e.g., a minimum x-coordinate and a maximum y-coordinate or an equivalent combination, the control circuit 370 of the graphics rendering circuit 255A will commence the calculation of pixels, typically in a scanning pattern, e.g., for a given maximum y-coordinate (typically decremented by one by subtractor 380, as the maximum is the boundary, with fill beginning one pixel below), and starting with a minimum x-coordinate, successively incrementing (via adder 375) the x-coordinate for all x-coordinates until the maximum x-coordinate is reached (as determined by comparator 385), thereby determining all x- and y-coordinates for the pixels of a row; followed by decrementing the y-coordinate, and again starting with a minimum x-coordinate, successively incrementing the x-coordinate for all x-coordinates until the maximum x-coordinate is reached, thereby determining all x- and y-coordinates for the pixels of a next row, and so on, continuing across each such row, and from top to bottom of the graphical object, until all x- and y-coordinates are determined for the pixels of the last row (at the minimum y-coordinate for the graphical object, also typically incremented by one, as the minimum is the boundary, with fill beginning one pixel above). As each pixel is determined, the control circuit 370 will determine whether the pixel is inside or outside the graphical object boundary, and if inside, apply the corresponding fill color, which may be selected from a plurality of colors (and based on its location and any color change, create a color gradient effect, with a gradient determined from ratio information provided in the action script file).

For a rectangular graphical object, the minimum x-coordinate will correspond to the graphical object boundary, such that for each row, each next pixel (incrementing the x-coordinate) will be inside the graphical object, until the next boundary pixel is reached, which in this case is also a maximum x-coordinate. Accordingly, determining whether the pixel is a boundary pixel may be accomplished by comparing the x-coordinate of the current pixel with the maximum x-coordinate (by comparator 385), with all interior pixels having an x-coordinate less than the maximum x-coordinate, and a corresponding fill color will be applied to each such interior pixel. Under the control of the control circuit 370, such as through loop control, this scanning process will continue for all rows, by decrementing the y-coordinate, successively incrementing the x-coordinate, and comparing the incremented x-coordinate with the maximum x-coordinate, with a corresponding fill color applied to each such interior pixel.

For a non-rectangular graphical object, the minimum x-coordinate generally will not correspond to the graphical object boundary, except in a few instances (e.g., one instance for a circle). Accordingly, for each row, each next pixel (also determined by incrementing the x-coordinate) will not necessarily be inside the graphical object. Starting with the minimum x-coordinate (and the maximum y-coordinate) of the work plane, the x-coordinate is incremented, and the control circuit 370 will determine if a boundary or edge flag is set for that corresponding pixel, and if so, that pixel is a boundary pixel, with the process continuing until such a first boundary pixel is located in the work plane. The next pixel is then an interior pixel and a corresponding fill color will be applied to each such interior pixel, iteratively, until a next pixel has also has a set boundary or edge flag, indicating that it is also a (second) boundary pixel. Accordingly, determining whether the pixel is a boundary pixel may be accomplished by examining whether a boundary or edge flag is set for the current pixel, with interior pixels in between the first (or left) boundary pixel (with a set boundary flag) and the second (or right) boundary pixel (with a set boundary flag). This scanning process will continue for all rows, by decrementing the y-coordinate, successively incrementing the x-coordinate, determining whether a first boundary flag is set for a current pixel, and if so, applying a corresponding fill color to each successive interior pixel, until a pixel is reached having a second boundary flag set.

Following the completion of the application of a fill color to the interior pixels, the pixel information for the graphical object is provided to the frame buffer 110. When the boundary line is to be thickened, e.g., from one pixel to five pixels, one or more new graphical objects are created, with the action script processor 100 determining new boundary lines and providing corresponding fill to the interior pixels. For example, the action script processor 100 will calculate new outer and inner boundaries by correspondingly incrementing or decrementing x-coordinates and incrementing or decrementing y-coordinates by a selected number of pixels, depending upon the quadrant, and applying a corresponding fill to the interior pixels, such that the resulting graphical object has the desired thickness. In another exemplary embodiment, using incremented or decremented x- and y-coordinates for starting and ending points, new lines are calculated, with starting and end points connected to form a plurality of triangular graphical objects which, when interior pixels are filled, will appear to be the thickened line. The resulting pixel information is then provided to the frame buffer 110, overwriting any previous information for the corresponding pixels (e.g., pixels formerly having a first fill color may be overwritten by a new boundary or fill color indicative of the thickened line).

Text and sprites (motion graphics, also referred to as a graphics movie clip) are rendered similarly, as a graphical objects, each having a defined shape comprising straight line segments, curved line segments, and fill components. For text, various action scripts typically specify a font and a scaling factor, using a font table, and/or provide a bit map for the font. In accordance with the exemplary embodiments, a bit map is utilized, with a scale factor, to render text in the selected font at the selected size, as a defined graphics shape having straight and/or curved line segments and corresponding fill. In alternative embodiments, a font table may be stored in memory 105 which will then provide the corresponding graphical information (which also may be scaled), and then also rendered as graphical objects as discussed above.

In the case of sprites, various action scripts typically designate sprites using control tags, which then refer to definition tags which separately define the graphical objects which are to be incorporated within the sprite movie clip. Such sprites may change position over time (i.e., from frame to frame) to indicate movement (rotational, translational), each component is rendered and linked hierarchically to (or nested with) other components, such as a main or primary movie clip having a background, within which the body of an automobile (as a secondary movie clip) with four rotating wheels (as tertiary movie clips) also move (translationally) over time. In accordance with the exemplary embodiments, rather than calculating rotations or translations of a given graphical object, each such graphical object is rendered de novo at its new location with each succeeding frame, thereby providing the perception of rotational and/or translational movement.

Figure 11:
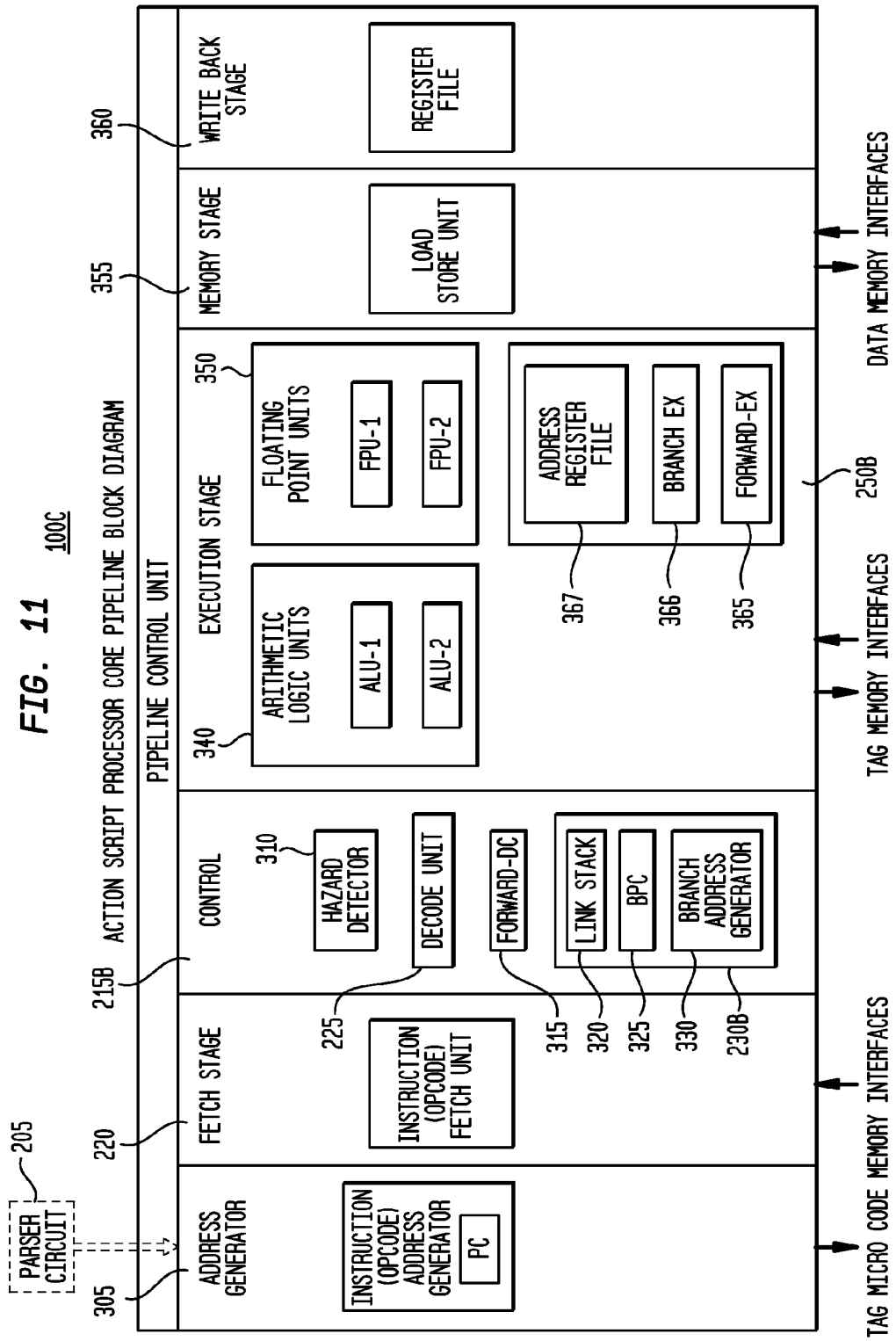

FIG. 11 is a block diagram illustrating in greater detail an exemplary fourth action script processor 100C embodiment (and seventh apparatus) embodiment in accordance with the teachings of the present invention. The action script processor 100C differs from the other action script processor embodiments 100, 100A and 100B in a number of important respects, and serves to illustrate the wide range of implementations which may be utilized in accordance with the exemplary embodiments of the invention, all of which are considered equivalent and within the scope of the present invention. In particular, the execution circuits 250 are implemented as two or more arithmetic logic units ("ALUs") 340 and two or more floating point units ("FPUs") 350. The action script processor 100C also includes an address generator 305 used for address generation for the op code. The control circuit 215B includes several additional functions especially suitable for control of parallel processing and pipelining. A hazard detector 310 determines operand conflicts in the execution of multiple op codes (as instructions), and if a conflict exists, allows one operation to be executed before another operation using the same operand(s). To accommodate latency between execution and write-back of results and avoid stalls, a forward-DC control logic block 315 determines if an instruction (op code) which will be executing has a data dependency on a currently executing instruction (op code), and if so, provides for out-of-order execution of another instruction (op code) which does not have such a data dependency. Loop and branch control circuit 230B evaluates conditional branching, and includes a link stack 320 storing return addresses after branching, a branch program counter 325, and a branch address generator 330. Following execution (as described below), a result which does not require further computation is stored in memory 105 (or provided to post-processing graphics circuit 245), through the load store unit 355, while an interim result which will be used in further computation is provided to the register file 360, as a write-back stage. For calculations involved in parsing, such as using calculations (such as additions, subtractions, and comparisons) which may be provided from execution circuits 250 (illustrated as ALUs 340 and FPUs 350), a Forward-Ex logic block 365 is used to forward results to the parser circuit 205 without the latency of a write-back. Branch-Ex logic block 366 provides for similar operand or other data forwarding for branching. Address register file 367 provides for storing address locations, for data and/or for op codes.

Figure 12:
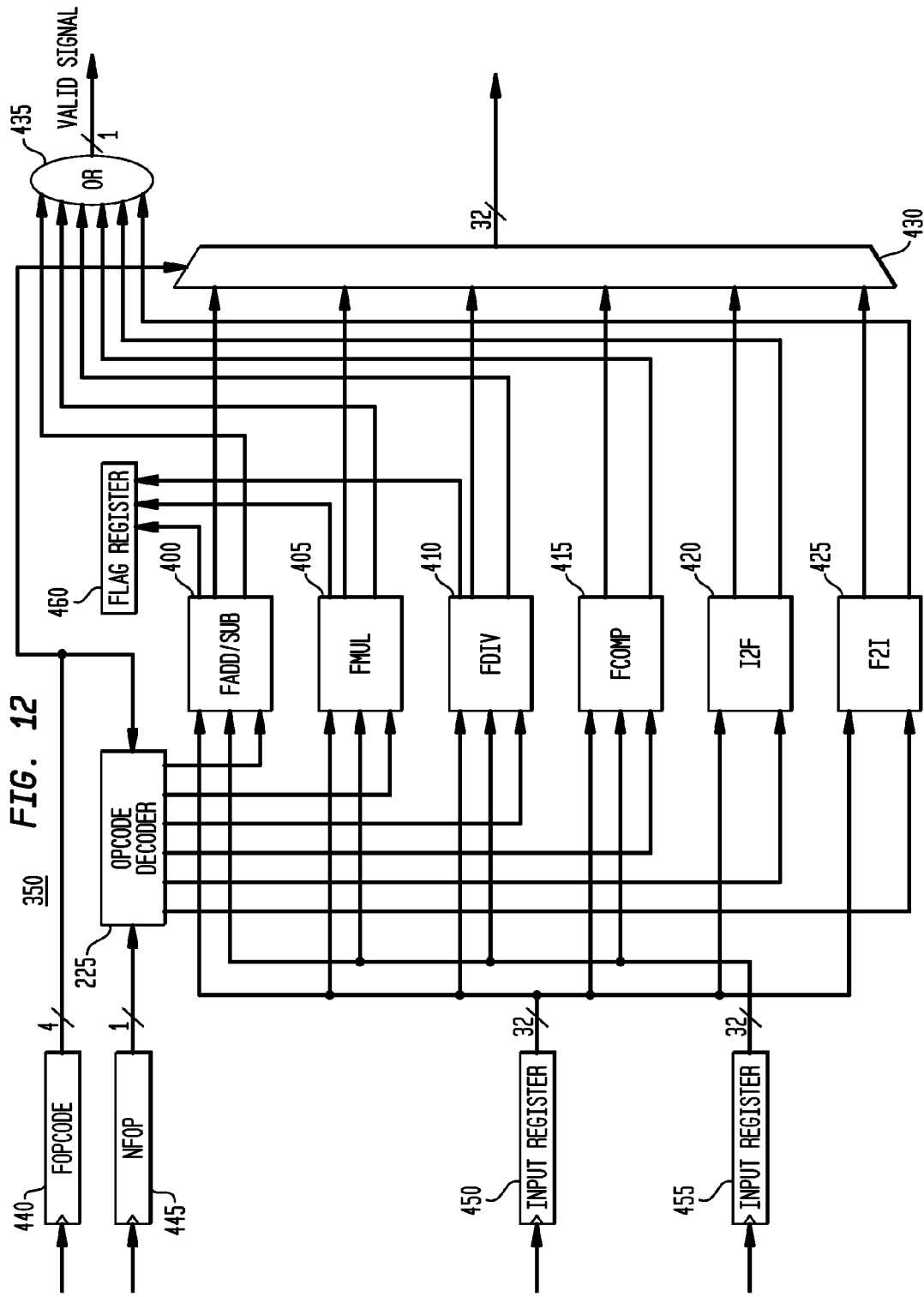
Figure 13:
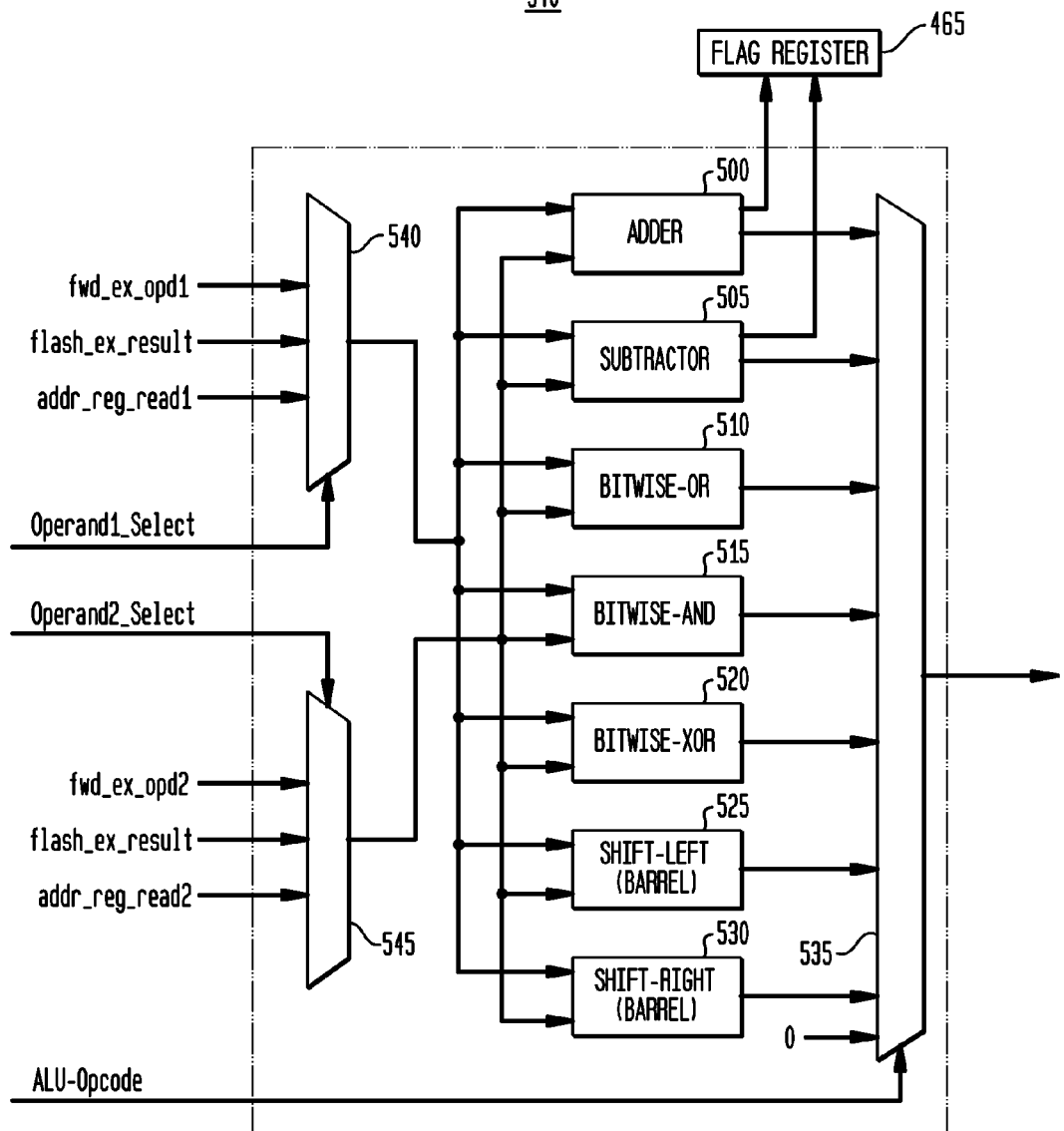

As mentioned above, in this second exemplary embodiment, the execution circuits 250 are implemented as two or more ALUs 340 and two or more FPUs 350, which may also be utilized for or by other components, as discussed above. FIG. 12 is a block diagram illustrating an exemplary floating point unit 350 embodiment in accordance with the teachings of the present invention. FIG. 13 is a block diagram illustrating an exemplary arithmetic logic unit 340 embodiment in accordance with the teachings of the present invention.

Referring to FIG. 12, an FPU 350 comprises a plurality of floating point calculation (mathematical, arithmetic and combinational logic) circuit modules, such as a floating point adder and subtractor 400, a floating point multiplier 405, a floating point divider 410, a floating point comparator 415, an integer-to-floating ("I2F") point converter 420, and a floating point-to-integer (F2T") converter 425 (e.g., used to provide rounding of a y-coordinate to an integer value for a pixel), each of which utilizes two operands (from registers 450, 455). The op code (or instruction) (from register 440) is provided to the decoder 225, which then generates an enable signal to enable the corresponding floating point calculation circuit module, and which then enables selection of the corresponding output from the multiplexer 430. Because the floating point calculation circuit modules may have different latencies, the modules may provide an output to the multiplexer 430, an output valid signal is provided by each module, via OR gate 435. In addition, the floating point adder and subtractor 400, the floating point multiplier 405, and the floating point divider 410 each provide flags for indicating overflow, underflow, and zero, with these flagged exceptions handled through local processing in a software layer or provided to the first processor 125 for exception processing, and with a divide by zero exception provided to the first processor 125 for exception processing.

Referring to FIG. 13, an ALU 340 comprises a plurality of calculation (mathematical, arithmetic, combinational logic, and shifting) circuit modules, such as adder 500, and subtractor 505, bitwise-OR logic module 510, bitwise-AND logic module 515, bitwise-XOR (exclusive OR) logic module 520, left barrel shifter 525, and right barrel shifter 530, which either utilize two operands (from multiplexers 540, 545), or which use a selected operand of the two operands. Three types of input operands are available, including those read from an address register, a forwarded result as discussed above, or a previously determined x- or y-coordinate (such as to add an offset provided by an action script). The bitwise-AND logic module 515 is typically utilized for masking corresponding bits, the bitwise-OR logic module 510 is typically utilized for setting a particular bit in a register without disturbing other bits, and the bitwise-XOR (exclusive OR) logic module 520 is typically utilized for resetting a flag or a register bit. The left and right barrel shifters 525, 530 are typically utilized for checking a particular bit in a larger word. Each of the circuit modules is enabled and generates a corresponding output, with the desired output (corresponding to the executed op code) selected through provision of the decoded op code (or instruction) to the output multiplexer 535. The circuit modules of the ALU 340 execute within a single cycle, so an output valid signal is not required.

These configurations of the ALU 340 and FPU 350 are especially advantageous for accelerating an action script. As mentioned above, the various determinations of x- and y-coordinates for boundary or fill calculations typically involve two to four comparisons, with a decision (as a conditional branch) based upon the results of the comparison, such as whether the current x- and y-coordinates are end or boundary coordinates. As a consequence, using the available floating point comparators 415 available from at least two FPUs 350, the action script processor 100C (through control circuit 215B) may perform a floating point conditional branch operation, using two floating point comparisons and a branch operation as a result of the comparisons, such as to a next row or next line segment, and in a single cycle in an exemplary embodiment. Using the available floating point comparators 415 available from at least two FPUs 350 and the various bit-wise comparators (515) available from at least two ALUs 340, the action script processor 100C (through control circuit 215B) may perform a complex case instruction, using four comparisons and a branch operation as a result of the comparisons, such as to compare an object with as many as four available fill styles, and also in a single cycle in an exemplary embodiment. Not separately illustrated in FIG. 11, additional control logic with four or more comparators may also be implemented to perform these comparisons.

Figure 16:
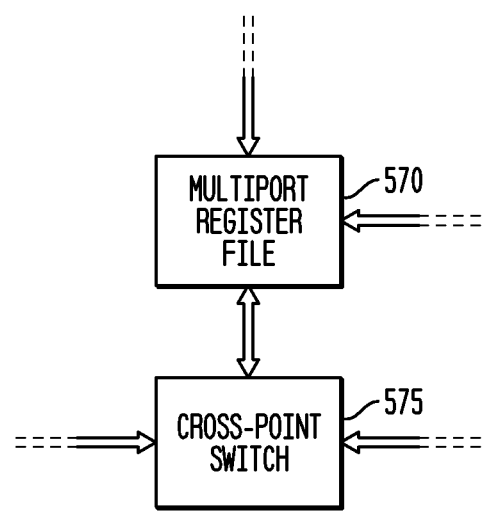

FIG. 16 is a block diagram illustrating an exemplary reconfigurable interconnect 240 embodiment in accordance with the teachings of the present invention. As mentioned above, in exemplary embodiments, the interconnect 240 is configurable, such as for configurable or variable data routing or data switching, and may also include local memory or buffer circuits for direct data transfer between circuit elements (without requiring additional load/store and fetch cycles for data transfer to and from memory 105 or another memory), in addition to providing data and control busses or other connections or couplings. As illustrated in FIG. 16, the exemplary interconnect 240 comprises a memory, illustrated as a multiport register file 570, and a switching element, illustrated as cross-point switch 575. Such a configurable interconnect 240, for example and without limitation, may be coupled (as illustrated in FIG. 4) to the first processor 125, the second, action script processor 100, the network I/O interface 115, the user I/O interface 122, the memories 105 and 110, the audio I/O interface 113, and the display interface or controller 130, also as discussed above. Also for example and without limitation, the configurable interconnect 240 may comprise switching or routing circuitry, for data packet routing, data streaming, or circuit switched communication, such as a cross-point switch 575 as illustrated, a cross-bar switch, a multiplexer, a data router, and various combinations of such switching, streaming or packet routing circuitry, in addition to other bus and wiring structures, for configuration of a data path between or among the first processor 125, the second, action script processor 100, the network I/O interface 115, the user I/O interface 122, the memories 105 and 110, the audio I/O interface 113, and the display interface or controller 130. The resulting data paths, for example and without limitation, may be point-to-point, broadcast (one-to-many), multicast (many-to-many), etc. In the exemplary embodiment illustrated in FIG. 16, the interconnect 240 further comprises local memory or buffer circuits for direct data transfer between circuit elements (without requiring additional load/store and fetch cycles for data transfer to and from memory 105 or another memory), in addition to providing data and control busses or other connections or couplings. Also for example and without limitation, a configurable interconnect 240 may be coupled to various execution circuits (which may comprise the first processor 125 and the second, action script processor 100), such as processor cores 144 and I/O interfaces 146 as illustrated in FIG. 5, or such as execution circuits 250 (and control circuit 215, post-processing graphics circuit 245, graphics rendering circuit 255, memory 105, etc.), with the configurable interconnect comprising a memory circuit such as a multiport register 570 and switching circuitry (e.g., a cross-point switch 575, a multiplexer, a router) for configuration of a data path between or among such execution circuits. When implemented as a configurable interconnect, the interconnect 240 may be configurable as part of the initial circuit design, or in advance of operation (such as during IC configuration (e.g., as part of advance configuration of FPGA-type components)), or during run-time (configurable and potentially reconfigurable during action script processing).

Figure 18:
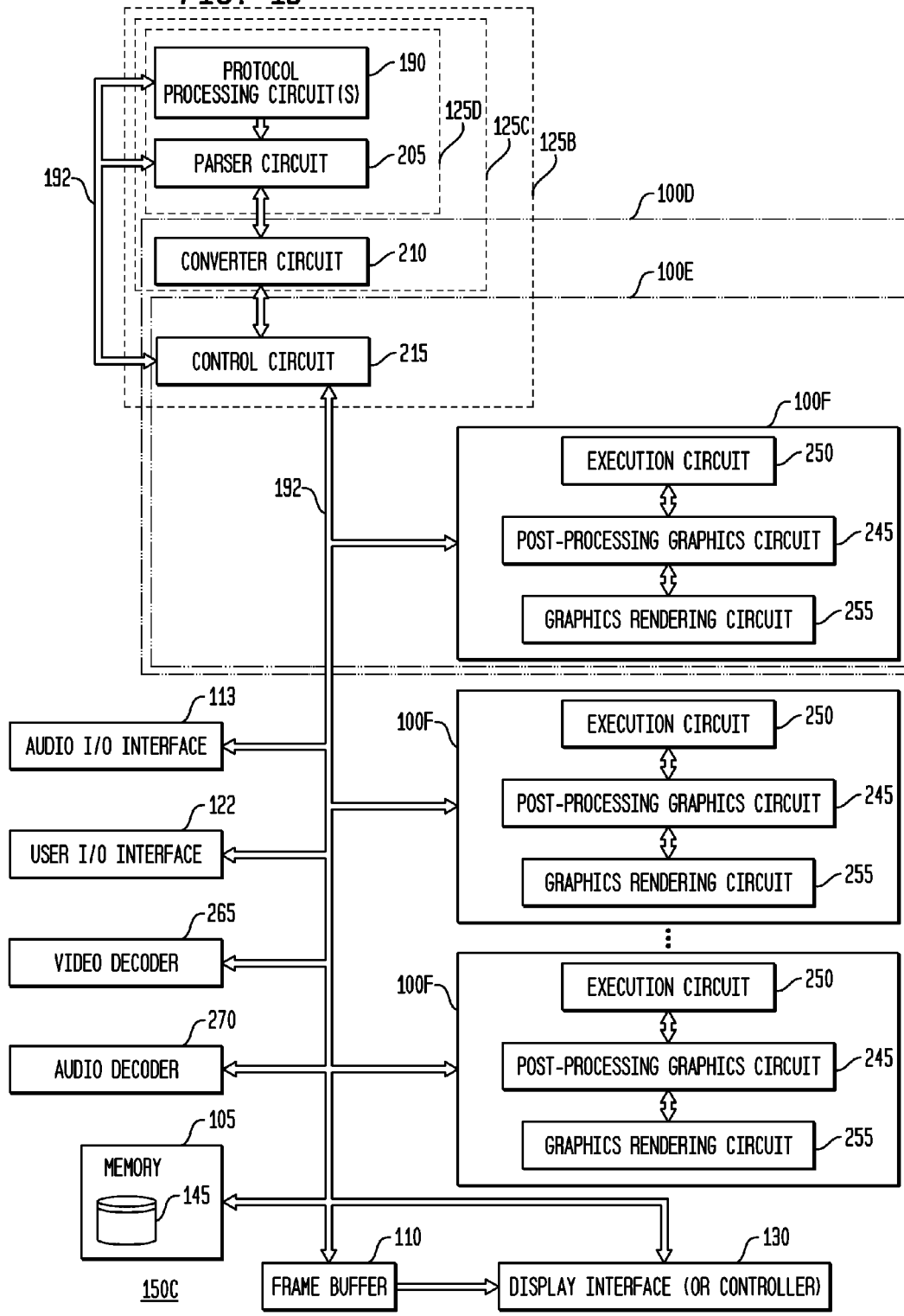

FIG. 18 is a block diagram illustrating in greater detail an exemplary fourth system embodiment 150C, fifth, sixth and seventh action script processor embodiments (100D, 100E, 100F), and additional apparatus embodiments in accordance with the teachings of the present invention, and serves to illustrate a wide variety of functional distributions between and among a first processor 125 and a second processor 100, whether embodied as single or multiple ICs or SOCs, for example. The exemplary system 150C comprises many of the circuits and/or components previously discussed, such as a frame buffer 110, a display interface (or controller) 130, an audio I/O interface 113, a user I/O interface 122, a video decoder 265, an audio decoder 270, and a memory 105 (having database 145), all of which function as described above. The exemplary system 150C differs from the systems 150 discussed previously insofar as each of a first processor 125 and a second processor 100 may have different combinations of functions and corresponding circuits or other hardware, any and all of which are within the scope of the claimed invention. The exemplary system 150C differs from the systems 150 discussed previously by utilizing a bus structure 192 to provide connections between, among, and potentially within the various illustrated components, rather than an interconnect 240, with any and all such coupling mechanisms within the scope of the claimed invention.

Referring to FIG. 18, a first processor 125, illustrated as first processor 125B, first processor 125C, and first processor 125D, includes protocol processing circuitry, illustrated as protocol processing circuit(s) 190, which performs the functions associated with processing protocols such as TCP, IP, HTTP, HTML, XML, SMTP and/or other protocols, in any selected combinations, for example and among others, as described above generally for a first processor 125. In various exemplary embodiments, the protocol processing circuit(s) 190 may also perform other functions, as discussed above. In an exemplary embodiment, a first processor 125D further comprises a parser circuit 205, which performs the action script parsing discussed above. In another exemplary embodiment, a first processor 125C further comprises a parser circuit 205 and a converter circuit 210, which also performs the converting of descriptive elements and attributes/data into op codes and control words, also as discussed above. In yet another exemplary embodiment, a first processor 125D further comprises a parser circuit 205, a converter circuit 210, and a control circuit 215, which also performs the control functions discussed above. Depending on the selected embodiment, the various parser circuit 205, converter circuit 210, and control circuit 215 may be implemented in a wide variety of ways, as previously discussed and illustrated, including within an FPGA or a general purpose microprocessor or DSP, for example and without limitation. Not separately illustrated in FIG. 18, other circuits and functions previously discussed for a second processor 100 also may be included in a first processor 125 and vice-versa, in any combinations and distributed in any way across one or more ICs, such as an execution circuit 250, a post-processing graphics circuit 245, and/or a graphics rendering circuit 255, essentially until all the functionality of both a first processor 125 and a second processor 100 are embodied in a single IC.

Correspondingly, as functions/circuits are included within a first processor 125, to avoid redundancy, those functions/circuits are no longer necessary or desirable in a second processor 100, and vice-versa. Accordingly, with a parser circuit 205 included within first processor 125B, first processor 125C, and/or first processor 125D, second processor 100D comprises a converter circuit 210, a control circuit 215, an execution circuit 250, a post-processing graphics circuit 245, and a graphics rendering circuit 255. With a parser circuit 205 and a converter circuit 210 included within first processor 125B and/or first processor 125C, second processor 100E comprises a control circuit 215, an execution circuit 250, a post-processing graphics circuit 245, and a graphics rendering circuit 255. Similarly, with a parser circuit 205, a converter circuit 210 and a control circuit 215 included within first processor 125B, second processor 100F comprises an execution circuit 250, a post-processing graphics circuit 245, and a graphics rendering circuit 255.

In addition, a plurality of second processors 100F are illustrated, for use in parallel computations. For example, first processor 125D may perform protocol processing, such as HTTP, HTML and XML processing, and provide an action script to a parser circuit 205. The parsed action script is then distributed to one or more second processors 100D, for further processing, as described previously. As another example, first processor 125C may perform protocol processing, parse an action script and convert the descriptive elements and attributes/data into op codes and control words. The op codes and/or control words may then distributed to one or more second processors 100E, for further processing, as described previously. As yet another example, first processor 125B may perform protocol processing, parse an action script, convert the descriptive elements and attributes/data into op codes and control words, and provide control over the execution of the op codes and corresponding data, including scheduling of operations (via scheduler circuit 195) in parallel across multiple second processors 100F, also for example, providing multithreaded graphics execution capability. The op codes and/or control words may then distributed to one or more second processors 100F, for further processing as described previously, but under the control of the control circuit 215 within the first processor 125B. This methodology for parallel computation of an action script is particularly advantageous, as further discussed below with reference to FIG. 19.

Also in various exemplary embodiments, the first processor 125B, first processor 125C, first processor 125D, second processor 100D, second processor 100E, and second processor 100F may also perform additional functions, many of which have been discussed previously. Those having skill in the art will recognize innumerable other functional combinations within the scope of the present invention. For example, not separately illustrated, a second processor 100 may comprise one or more execution circuits 250, with the other circuits (parser circuit 205, converter circuit 210, control circuit 215, post-processing graphics circuit 245, and a graphics rendering circuit 255) included within a first processor 125. Similarly, these functions may be distributed among a plurality of processors or other ICs, in any combination; any and all such combinations are considered equivalent and within the scope of the claimed invention.

Figure 19:
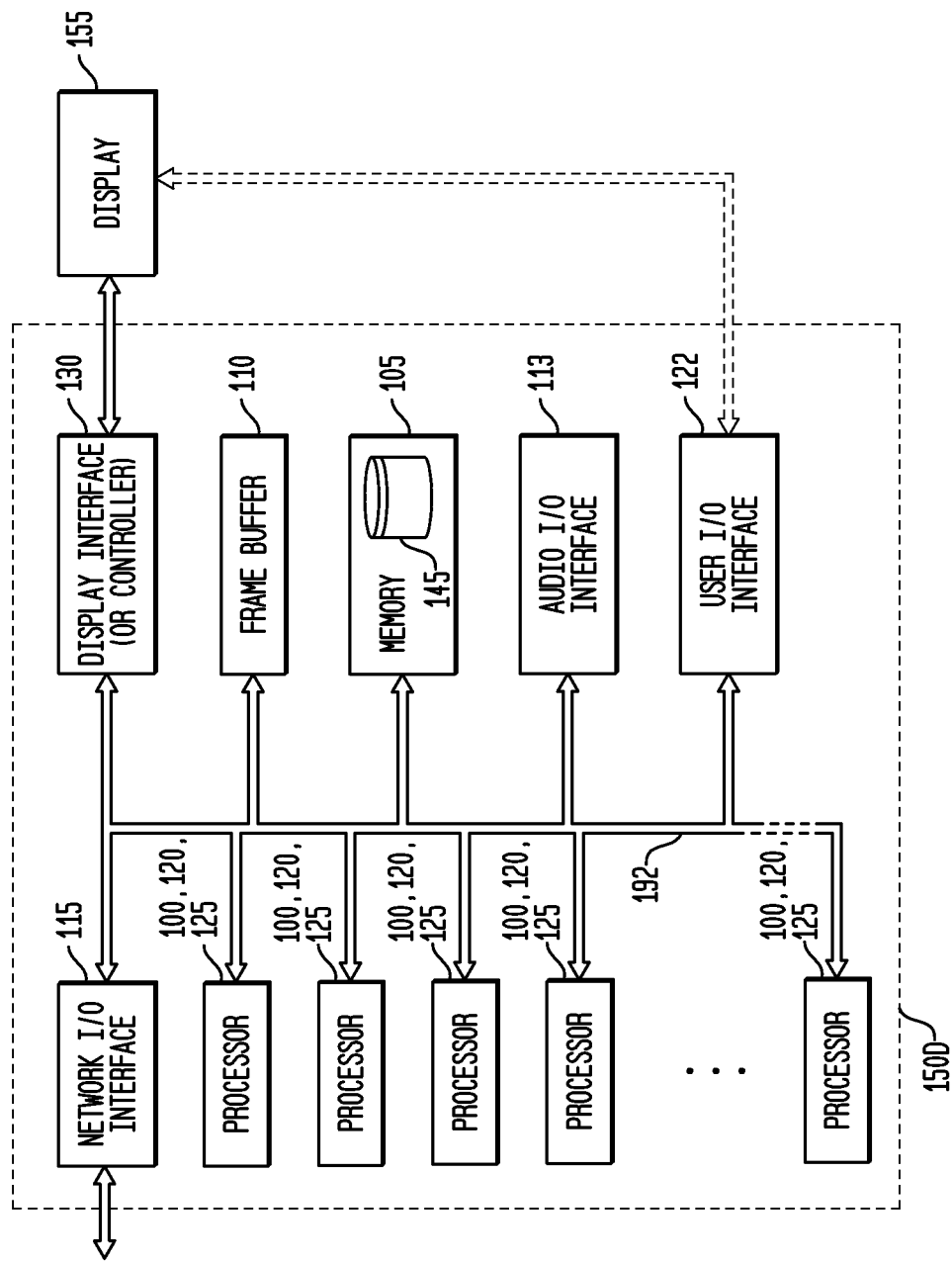

FIG. 19 is a block diagram illustrating in greater detail an exemplary fifth system 150D embodiment and additional apparatus embodiments in accordance with the teachings of the present invention, and also serves to illustrate another variation in which an exemplary embodiment comprises a plurality of processors, such as general purpose microprocessors, DSPs, FPGAs, and/or GPUs, for example, whether embodied as single or multiple ICs or SOCs, also for example. The exemplary system 150D comprises many of the circuits and/or components previously discussed, such as a frame buffer 110, a display interface (or controller) 130 (illustrated as coupled to a display 155), an audio I/O interface 113, a user I/O interface 122, and a memory 105 (having database 145), all of which function as described above, and may further comprise a video decoder 265 and an audio decoder 270 (not separately illustrated), also which function as described above. The exemplary system 150D differs from the systems 150 discussed previously insofar as the functions and/or circuitry of a first processor 125 and a second processor 100 are included within or distributed between or among a plurality of processors 100, 125 (which also may include an apparatus 120), which may be embodied as custom or ASIC hardware, as general purpose microprocessors, DSPs, FPGAs, GPUs, processor cores, and so on, for example and without limitation. Also for example and without limitation, when implemented without using dedicated or custom hardware, the exemplary methodology embodiments (discussed below) may be programmed or configured, and stored, in the illustrated one or more processors (100, 125 (and apparatus 120)) and associated memory, such as when the processors (100, 125 (and apparatus 120)) are embodied using general purpose processors. Continuing with the example, rather than running a protocol stack for an action script player, such as a Flash® player, the one or more processors (100, 125 (and apparatus 120)) may perform an exemplary method embodiment, comprising parsing an action script, converting descriptive elements and data to op codes and control words, and executing the corresponding mathematical, logical and memory operations, as discussed above, and as described in greater detail with reference to FIG. 17. For such a system 150D embodiment, as mentioned above, the corresponding operational codes may be customized, or may be pre-defined by the type of processors (100, 125 (and apparatus 120)) utilized, such as microprocessor, DSP or GPU, and may include sequences of binary or microcode, for example. (It should also be noted that the exemplary system 150D also differs from several of the systems 150 discussed previously by utilizing a bus structure 192, as in system 150C, to provide connections between, among, and potentially within the various illustrated components, rather than an interconnect 240, with any and all such coupling mechanisms within the scope of the claimed invention.) Such as system 150D may also be particularly suited for distributed embodiments, such as for grid or cloud computing, for example.

Variations and combinations of systems 150C and 150D are also possible and within the scope of the claimed invention. For example, a first processor 125B of a system 150C may be utilized to obtain (protocol processing circuit(s) 190) and parse an action script (parser circuit 205), convert the descriptive elements of the action script into op codes and control words (converter circuit 210), schedule their execution (providing temporal control) and distribute them in parallel (control circuit 215), to one or more other processors (100, 125 (and apparatus 120)) of system 150D, for execution and additional processing. Continuing with the example, the first processor 125B may be implemented as custom hardware, while the one or more processors (100, 125 (and apparatus 120)) may be implemented using generally or commercially available microprocessors, DSPs or GPUs which are programmed with the remaining steps of the exemplary methodology, and vice-versa, with a first processor 125B embodied using a general purpose microprocessor, and the one or more processors (100, 125 (and apparatus 120)) embodied using custom hardware, such as a processor 100F when implemented using custom hardware for an execution circuit 250, a post-processing graphics circuit 245, and a graphics rendering circuit 255. For an example of the former, a "draw line" op code distributed to one or more processors (100, 125 (and apparatus 120)) may, such as through a memory pointer, be decoded, converted to or may otherwise provide a stored microcode and control sequence (at a hardware level) to generate the corresponding multiplication, addition, load/store, comparison, loop counting, control and other operations, resulting in the pixel information for transfer to a frame buffer 110. These embodiments are particularly suited to FPGA implementations, particularly using a configurable array having multiple, integrated processor cores in the same IC.

It should be noted that the use of operational codes corresponding to graphical primitive instructions facilitates such parallel execution, particularly the comparatively more fine-grained, lower level op codes such as "draw line" or "draw rectangle", as each op code with its control word is self-contained (having both positional and temporal information) and may execute (generally) independently and without data dependencies upon other op codes and control words, each of which also may be executed as an independent thread. Accordingly, instead of the traditional sequential model found in a medial player software application such as a Flash® player, the exemplary embodiments enable massively parallel processing of graphical images and other components of media action scripts. Such parallelism may be made explicit at the op code level, and facilitated by the use of the comparatively more fine-grained approach. It also should be noted that the use of operational codes corresponding to graphical primitive instructions enables hardware-level execution across multiple platforms and combinations of platforms.

FIG. 17 is a flow diagram illustrating an exemplary method embodiment in accordance with the teachings of the present invention, and provides a useful summary. Beginning with start step 700, a data file is received, such as an HTTP or HTML/XML data file containing other files or containing references (or links) to other files which are also retrieved, such as a video file, an audio file, a photographic (jpeg) file, or an action script file. In step 705, the action script file is separated from the balance or remainder of the data file, such as by the first processor 125. In step 710, the action script file is parsed, such as by the parser circuit 205 of the second, action script processor 100. The parsed action script file is converted directly into a plurality of operational codes and a plurality of control words 275 having corresponding data in predetermined fields, step 715. When a complete frame has been received and converted, step 720, the method proceeds to select a first (or next) segment of the graphical object or image to be rendered for display, step 725, and otherwise iterates and returns to steps 710 and 715 to continue parsing and converting the action script file, respectively. Steps 710 and 715 are typically performed continually or recursively, such that converting may begin as soon as an initial portion of the action script file has been parsed, creating a pipeline of parsed and converted information which may be processed. Steps 710 and 715 also may be interleaved with other actions or activities, such as responding to a user interaction (e.g., step 820 discussed below) which may require the display of additional material or content (which may also require parsing and converting), or receiving (and subsequently displaying) new or updated information which may also require parsing and converting (e.g., step 825 discussed below). In an alternative embodiment, processing of a graphical object (beginning with step 725 and selecting an image segment) may commence prior to receipt of the complete or entire frame, depending upon any data dependencies.

As mentioned above, in accordance with exemplary embodiments, all graphical objects are rendered as a plurality of curved or straight line segments, with corresponding fill characteristics (and various types of post-processing), including content such as text, sprites, etc. (although other alternatives are available, considered equivalent and within the scope of the present invention). Accordingly, a segment for rendering is selected in step 725, and using the corresponding control word for the selected segment, the starting x- and y-coordinates are determined, step 730. Also using a control word (which may be a control word corresponding to the selected segment or corresponding to a next segment), the ending x- and y-coordinates are determined, step 730. Depending on the selected embodiment, the ending x- and y-coordinates may be the starting coordinates of a next segment, so may be contained in another, second control word corresponding to the next segment. When a curved segment is to be rendered, step 740, using the corresponding control word for the selected segment, the control x- and y-coordinates are determined, step 745, for use in curvature calculations. Following steps 740 and 745, corresponding mathematical operations (e.g., additions, subtractions, multiplications, divisions, etc.) are performed to generate next x- and y-coordinates (a next point) of the segment, step 750. The next x- and y-coordinates are compared with the ending (or anchor) x- and y-coordinates, to determine if the end of the segment has been reached, step 755. When the next x- and y-coordinates are not equal to the ending x- and y-coordinates in step 760, the method outputs the next x- and y-coordinates, step 765, such as storing them in a memory (such as memory 105), and returns to step 750 to continue calculating more x- and y-coordinates.

When the next x- and y-coordinates are equal to the ending x- and y-coordinates in step 760, indicating that the end of the selected segment has been reached, the method determines whether the current loop has closed, step 770. Depending on the selected embodiment, this information may also be included within the control word for the selected segment. When the current loop has not closed in step 770, indicating that another segment is to be processed, the method returns to step 725, and selects another segment. As mentioned above, the next segment information is typically contained in the control word of the current segment. When the loop has closed in step 770, the method proceeds to post-processing. When a fill is to be applied to the enclosed area or to a surrounding area, step 775, which may be indicated by a flag in the control word(s), the corresponding fill styles are applied to the enclosed area or to a surrounding area, step 780. Following steps 775 or 780, the corresponding pixel information is output to the frame buffer 110 for display of the graphical image or object, step 785. When one or more line styles (such as thickening) are to be applied, step 790, new line boundaries are calculated or otherwise determined, to form a new graphical object, step 795 (and when no line style is to be applied, the method proceeds to step 805). Following step 795, the corresponding line styles is applied, step 800, such as by applying a fill color or gradient to the new graphical object, as discussed above. Following steps 790 or 800, additional graphics functions are performed, step 805, such as anti-aliasing, blending, deblurring, edge enhancement, sharpening, color enhancement, depixelization, etc., which may be performed by the graphics rendering circuit 255, the display controller 130, or other components of the action script processor 100, for example. The corresponding pixel information is output to the frame buffer 110 for display of the graphical image or object, step 810, such that the line style pixel information may overwrite fill pixel information.

Data merging may also be performed, step 815, such as merging the data for the graphical image or object with other data, such as video, photographic, audio, other parts of an HTML/XML page, for example. As additional alternatives, such data merging may also be performed at other times, such as prior to step 810, or prior to step 785, or at or with any other convenient or desirable step.

With the display of the completed graphical image or object, the action script processor 100 may receiver user input, such as from a mouse click on a displayed button, as a type of graphical object, from a keystroke, from motion of a device (e.g., from an incorporated accelerometer), from a touch screen, from an audio input, etc. Accordingly, in step 820, the method determines whether user input has been received, and if so, performs the corresponding action, which is typically a branch instruction (or op code, equivalently) or other directive (e.g., to fetch additional information), step 830. As part of this branching, the method may continue, step 835, such as to display a next object or image specified by the branch instruction, and if so, the method returns to step 705, to commence parsing and converting, followed by processing another image. Similarly, new or updated information may be received, such as a new graphical image for display or new action script for processing (e.g., a new advertisement), and if so, the method also returns to step 705, to commence parsing and converting, followed by processing another image. Alternatively, the method may return to step 700, depending on whether a second action script is to be obtained and processed, or may return to step 725, if image information is already available (e.g., such as when included in the original action script file which has been parsed and converted). When no user input is received in step 820, or no new or updated information is received in step 825, or the method is not to continue in step 835, the method may end, return step 840.

Numerous advantages of the claimed invention are readily apparent. The exemplary embodiments of the claimed invention provide an apparatus, method and system to accelerate the actual processing of an action script, to render a graphical image or object, eliminating the complicated, prior art protocol stack for providing graphics rendering, and instead provide such graphics rendering at a hardware level. In exemplary embodiments, the hardware action script accelerator may be implemented in a mobile device or other devices such as televisions, without requiring the significant microprocessor capability and the additional graphics processor of the prior art. Exemplary embodiments are able to provide a complete display of a graphical image without requiring redirection to another, modified web site. In addition, in exemplary embodiments, the action script accelerator is compatible with and transparent to existing processors and devices, and directly usable with such devices without requiring retrofitting or modification of such processors.

In addition to the system and apparatus configurations and methodology illustrated in FIGS. 2-19, those having skill in the art will recognize that there are innumerable equivalent configurations, layouts, kinds and types of control, interface, arithmetic, parsing, decoding, post-processing and memory circuitry known in the art, which are within the scope of the claimed invention.

A "processor" 100, 100A-100F, 125, 125A-125D may be any type of controller, processor, accelerator, and may be embodied as one or more processors, configured and/or adapted to perform the functionality discussed herein. As the term processor or controller is used herein, a processor 100, 100A-100F, 125, 125A-125D may include use of a single integrated circuit ("IC"), or may include use of a plurality of integrated circuits or other components connected, arranged or grouped together, such as controllers, microprocessors, digital signal processors ("DSPs"), accelerators, parallel processors, multiple core processors, custom ICs, application specific integrated circuits ("ASICs"), field programmable gate arrays ("FPGAs"), electronic or optical circuitry, configurable circuitry, adaptive computing ICs, associated memory (such as RAM, DRAM and ROM), and other ICs and components. As a consequence, as used herein, the term processor or controller should be understood to equivalently mean and include a single IC, or arrangement of custom ICs, ASICs, circuits, processors, microprocessors, controllers, FPGAs, adaptive computing ICs, or some other grouping of integrated circuits which perform the functions discussed herein, with associated memory, such as microprocessor memory or additional RAM, DRAM, SDRAM, SRAM, MRAM, ROM, FLASH, EPROM or E2PROM. A processor (such as processor 100, 100B, 100C, 125), with its associated memory, may be configured and/or adapted (via programming, FPGA interconnection, interconnect configuration, circuit configuration, or hard-wiring) to perform the methodologies of the invention. For example, the methodology may be programmed and stored, in a processor 100, 100A-100F, 125, 125A-125D with its associated memory (and/or memory 105) and other equivalent components, as a set of operational codes, control signals, program instructions or other code (or equivalent configuration or other program) for subsequent execution when the processor is operative (i.e., powered on and functioning). Equivalently, when the processor 100, 100A-100F, 125, 125A-125D may implemented in whole or part as FPGAs, custom ICs and/or ASICs, the FPGAs, custom ICs or ASICs also may be designed, configured and/or hardwired to implement the methodology of the invention. For example, the processor 100, 100A-100F, 125, 125A-125D may be implemented as an arrangement of electronic or optical circuits, processors, controllers, microprocessors, DSPs, fully custom accelerators and/or ASICs, collectively referred to as a "controller" or "processor", which are hardwired, configurably or reconfigurably wired, programmed, designed, adapted or otherwise configured to implement the methodologies of the invention, in conjunction with a memory 105.

Accordingly, as used herein, those having skill in the electronic arts will understand that the meaning of "configured" depends upon the selected circuitry embodiment for the first and second processors, which may also include a mix or combination of different circuitry types, and which may change as new types of circuitry may be developed. For example, the second processor 100, 100A-100F, may comprise custom (or ASIC) circuitry (e.g., parser 205) in conjunction with a general purpose processor (such as an ARM core), while the first processor may comprise a general purpose or multimedia microprocessor or DSP. Accordingly, "configured" should be construed to mean and include hardwired for fully custom accelerators and/or ASIC embodiments, and/or programmed for a general purpose processor or DSP embodiments, and/or having switchable or routable connections for configurable or reconfigurable circuitry embodiments (and/or with such switchable or routable connections potentially changing from clock cycle to clock cycle, or remaining for a series of clock cycles and then changing, for reconfigurable circuitry), and/or various combinations of such hardwiring, programming, switching, and/or routing, for example and without limitation.

The various memories, illustrated as memory 105 (which may include a data repository (or database) 145), frame buffer 110, and the various other memories and registers (105A, 106, 107, 660, 367, 360, 450, 455, 460, 465, 695, 697, 570) may be embodied in any number of forms, including within any computer or other machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a processor 100, 100A-100F, 125, 125A-125D), whether volatile or non-volatile, whether removable or non-removable, whether co-located or located remotely, including without limitation RAM, FLASH, DRAM, SDRAM, SRAM, MRAM, FeRAM, ROM, EPROM or E2PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. In addition, such computer readable media includes, as an article of manufacture, any form of tangible communication media which embodies computer readable instructions, data structures, program modules or other data in a data signal or modulated signal, including any tangible information delivery media, which may encode data or other information. The memory 105 may be configured and/or adapted to store various look up tables, parameters, coefficients, other information and data, programs or instructions (of the software of the claimed invention), and other types of tables such as database tables.

As indicated above, the processors 100, 100A-100F, 125, 125A-125D, may be programmed, using software and data structures of the invention, or configured using configuration information, for example, to perform the methodology of the claimed invention. (In other embodiments, the various processors 100, 100A-100F, 125, 125A-125D may be configured by being hardwired to perform the methodology of the claimed invention, such as when embodied as one or more ASICs, accelerators, or any other type of custom circuitry, semi-custom circuitry or hardware, whether customized during a design phase or during fabrication, such as through any of the various fabrication masks, for example.) As a consequence, the system and method of the claimed invention may be embodied as software which provides such programming or other instructions, such as a set of instructions and/or metadata embodied within a tangible, computer-readable medium. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the claimed invention may be embodied as any type of code, such as C, C++, SystemC, LISA, XML, PHP, Ruby, Perl, Java, Brew, any scripting language, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct", "program construct", "software construct" or "software", as used equivalently herein, means and refers to any programming language, of any kind, with any syntax or signatures, which provides or can be interpreted to provide the associated functionality or methodology specified (when instantiated or loaded into a processor or computer and executed, including the processors 100, 100A-100F, 125, 125A-125D, for example).

The software, metadata, or other source code of the claimed invention and any resulting bit file (object code, database, or look up table) may be embodied within any tangible storage medium, such as any of the computer or other machine-readable data storage media, as computer-readable instructions, data structures, program modules or other data, such as discussed above with respect to the memory 105, e.g., FLASH ICs, a floppy disk, a CDROM, a CD-RW, a DVD, a magnetic hard drive, an optical drive, or any other type of data storage apparatus or medium, as mentioned above.

"Directly", as used herein with respect to the direct conversion of the descriptions or descriptive elements (tags, bytecodes, or other string-based descriptions) into op codes for native execution by the action script processor 100, should be interpreted broadly, to mean and include any conversion which does not include an intervening software or application layer between the determination of the description (tag or bytecode) and determination of the op code or other native instructions, such as an API call to another application or non-native instruction, i.e., to mean and include any non-indirect conversion. For example, as discussed above, the action script processor 100 (and its variations 100A, 100B, 100C, 100D, and some of the variations of the first processors 125B-125D) will decode the descriptive element (e.g., tag or bytecode) to select a parsing instruction (op code), which is natively executed to control the parser circuit, will then parse the descriptive elements (tags, bytecodes, or other string-based descriptions), and then (via a converter circuit) will convert the parsed description (tag or bytecode) into a corresponding op code, which is a hardware-level instruction, such as "draw line", which in turn is decoded (decoder 225) (or otherwise converted into a binary form) for provision of control signals (bits) to directly control hardware execution, such as to control a corresponding plurality of multiplications and additions for pixel calculation. In other embodiments, the op code itself may comprise such control bits without additional decoding, or may be a pointer to a memory location storing a sequence of hardware control or other instruction code. Accordingly, this conversion of the descriptive elements (tags or bytecodes) utilized a series of hardware-based instructions which were natively executed in their binary form to control corresponding circuitry, and did not include an intervening execution of another software instruction or a call to another software layer, such as a open GL or an API library. In addition, native execution of the op code however, even in its corresponding binary form, may include many other operations, also executing natively, such as loop counting, and iterative multiplications, additions, divisions, subtractions, comparisons, floating point to integer conversions, and so on. As no intervening software (non-hardware or non-machine) instruction was called, however, this is a direct conversion of the parsed descriptive element (tag or bytecode) into an op code, not a software conversion of the descriptive element (tag or bytecode) through a player or virtual machine application call to another protocol or software layer, such a browser application, which in turn results in a series of calls though a protocol stack (e.g., GTK, directX, open GL, and BIOS) before resulting in a hardware-level op code or instruction.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the claimed invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the claimed invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the claimed invention and not necessarily in all embodiments, and further, are not necessarily referring to the same embodiment. Furthermore, the particular features, structures, or characteristics of any specific embodiment of the claimed invention may be combined in any suitable manner and in any suitable combination with one or more other embodiments, including the use of selected features without corresponding use of other features. In addition, many modifications may be made to adapt a particular application, situation or material to the essential scope and spirit of the claimed invention. It is to be understood that other variations and modifications of the embodiments of the claimed invention described and illustrated herein are possible in light of the teachings herein and are to be considered part of the spirit and scope of the claimed invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

Furthermore, any signal arrows in the drawings/Figures should be considered only exemplary, and not limiting, unless otherwise specifically noted. Combinations of components of steps will also be considered within the scope of the claimed invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the claimed invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. An apparatus for processing an action script for a graphical image for visual display, the apparatus comprising:
   a first memory to store data;
   a first processor; and
   a second processor coupled to the first processor and to the first memory, the second processor to parse the action script into a plurality of descriptive elements and a corresponding plurality of variable length operand data sets, the plurality of descriptive elements specifying the graphical image in a non-pixel-by-pixel form; to directly convert each descriptive element of the plurality of descriptive elements of the action script into a corresponding operational code of a plurality of operational codes, each corresponding operational code comprising at least one graphical primitive instruction for native execution by the second processor or comprising a memory pointer to an address in the first memory having a sequence of graphical primitive instructions for native execution by the second processor; to directly convert each variable length operand data set of the corresponding plurality of variable length operand data sets into one or more control words and store the one or more control words in the first memory, each control word comprising operand data and one or more control bits in predetermined fields for the native execution of the one or more graphical primitive instructions by the second processor; and to directly execute the one or more graphical primitive instructions using the one or more control words to generate pixel data for the graphical image.

2. The apparatus of claim 1, wherein the second processor further is to decode a descriptive element to determine a corresponding parsing operational code of the plurality of operational codes to control the parsing of the action script.

3. The apparatus of claim 2, wherein the second processor further comprises:
a decoder to determine a type of descriptive element;
a parsing controller to determine or select a number of bits to parse parameter;
a stream register to store a plurality of bits of the action script; and
at least one barrel shifter to shift out of the stream register a number of bits designated by the number of bits to parse parameter.

4. The apparatus of claim 1, wherein at least some of the plurality of descriptive elements comprise a plurality of temporally descriptive elements.

5. The apparatus of claim 1, wherein at least some of the plurality of descriptive elements comprise a plurality of positionally descriptive elements.

6. The apparatus of claim 1, wherein the second processor further is to store the plurality of operational codes and plurality of control words in a database structure.

7. The apparatus of claim 1, wherein each control word of the plurality of control words further comprises a starting or an ending x-coordinate and y-coordinate for a corresponding line or curve segment for the graphical image.

8. The apparatus of claim 7, wherein each control word of the plurality of control words further comprises a control x-coordinate and control y-coordinate for a corresponding curve segment for the graphical image.

9. The apparatus of claim 1, wherein each control word of the plurality of control words further comprises a first memory address for line style array for a corresponding line or curve segment for the graphical image and a second memory address for fill style array for a plurality of line or curve segments comprising the graphical image.

10. The apparatus of claim 1, wherein each control word of the plurality of control words further comprises a line style array for a corresponding line or curve segment for the graphical image and a fill style array for a plurality of line or curve segments comprising the graphical image.

11. The apparatus of claim 1, wherein the first processor is to separate the action script from other data.

12. The apparatus of claim 1, wherein the plurality of descriptive elements comprise a plurality of tags or bytecodes.

13. The apparatus of claim 1, wherein the plurality of descriptive elements are selected from the group consisting of: a tag, a bytecode, a control tag, a definition tag, a dictionary tag, a dictionary repository, and combinations thereof.

14. The apparatus of claim 1, further comprising:
a second memory to store the plurality of operational codes; and
wherein the second processor further is to convert the action script directly to the plurality of operational codes by performing a deterministic function on each descriptive element of the plurality of descriptive elements to generate a corresponding result and to use the result to determine a corresponding operational code of the plurality of operational codes.

15. The apparatus of claim 1, further comprising:
a second memory to store a look up table having the plurality of operational codes; and
wherein the second processor further is to convert the action script directly to the plurality of operational codes by performing a hash function on each descriptive element of the plurality of descriptive elements to generate a corresponding hash result and to use the hash result as an index or entry into the look up table to determine a corresponding operational code of the plurality of operational codes.

16. The apparatus of claim 1, wherein at least some of the one or more native instructions comprise a plurality of control signals, and wherein the second processor further is to decode each operational code of the plurality of operational codes to generate a corresponding plurality of control signals to control a selected operation, of a plurality of operations, corresponding to a selected operational code of the plurality of operational codes.

17. The apparatus of claim 16, wherein the second processor further comprises a floating point circuit, and wherein the second processor further is to generate a first corresponding control signal to enable the floating point circuit to perform the selected operation.

18. The apparatus of claim 17, wherein the second processor further is to generate a second corresponding control signal to select a floating point calculation result provided by the enabled floating point circuit.

19. The apparatus of claim 16, wherein the second processor further comprises an arithmetic logic unit, and wherein the second processor further is to decode an operational code of the plurality of operational codes to generate a corresponding plurality of control signals to select a calculation result generated by the arithmetic logic unit.

20. The apparatus of claim 1, wherein the second processor further comprises
at least one arithmetic logic unit; and
at least one floating point circuit.

21. The apparatus of claim 20, wherein the at least one arithmetic logic unit further comprises:
an adder circuit;
a subtractor circuit;
a bitwise-OR logic circuit;
a bitwise-AND logic circuit;
a bitwise-exclusive OR logic circuit;
a barrel shifter circuit; and
an output multiplexer.

22. The apparatus of claim 20, wherein the at least one floating point circuit further comprises:
a floating point adder and subtractor circuit;
a floating point multiplier circuit;
a floating point divider circuit;
a floating point comparator circuit;
an integer-to-floating point converter circuit;
a floating point-to-integer converter circuit; and
an output multiplexer.

23. The apparatus of claim 22, wherein the second processor further is to control two floating point comparator circuits to perform a comparison and to use results of the comparisons to perform a conditional branch operation during a single clock cycle.

24. The apparatus of claim 22, wherein the second processor further is to control a plurality of floating point comparator circuits to perform at least four comparisons corresponding to four conditions and to use results of the comparisons to perform a conditional branch operation during a single clock cycle.

25. The apparatus of claim 20, further comprising:
a configurable interconnect coupled to the at least one arithmetic logic unit and to the at least one floating point execution unit, the configurable interconnect comprising:
a multiport register; and
a cross-point switch for configuration of a data path.

26. The apparatus of claim 1, wherein the second processor further is to match a plurality of line or curve segments of a boundary of the graphical image.

27. The apparatus of claim 26, wherein the second processor further is to determine a sequential ordering of the plurality of line or curve segments to form boundary coordinates of the graphical image.

28. The apparatus of claim 1, wherein the second processor further is to apply a fill style to generate pixel data for an area of the graphical image.

29. The apparatus of claim 28, wherein the second processor further is to apply a line style by forming a second graphical image from a boundary of the graphical image, and wherein the ninth circuitry is further configured to apply a fill style to the second graphical image to generate pixel data for the line style.

30. The apparatus of claim 1, wherein the first processor is to perform a protocol, for reception of a data file, selected from the group consisting of: a Transmission Control Protocol ("TCP"), an Internet Protocol ("IP"), and combinations thereof.

31. The apparatus of claim 1, wherein the first processor is to perform hypertext transfer protocol ("HTTP") for reception of a data file.

32. The apparatus of claim 31, wherein the first processor further is to pre-fetch referenced data of the data file.

33. The apparatus of claim 31, wherein the first processor further is to generate pixel data for hypertext markup language ("HTML") data, or extensible markup language ("XML") data, or both HTML and XML data of the data file.

34. The apparatus of claim 33, further comprising:
a frame buffer;
wherein the second processor further is to transfer the pixel data for the graphical image to the frame buffer and wherein the first processor further is to transfer the pixel data for the HTML or XML data to the frame buffer.

35. The apparatus of claim 33, further comprising:
a frame buffer; and
a visual display;
wherein the second processor further is to transfer the pixel data for the graphical image to the frame buffer and wherein the first processor further is to transfer the pixel data for the HTML or XML data to the visual display.

36. The apparatus of claim 33, further comprising:
a frame buffer; and
a display controller;
wherein the second processor further is to transfer the pixel data for the graphical image to the frame buffer and wherein the first processor further is to transfer the pixel data for the HTML or XML data to the display controller.

37. The apparatus of claim 1, wherein the first processor and the second processor are embodied in a single integrated circuit.

38. The apparatus of claim 1, wherein the first processor and the second processor comprise a plurality of processor cores.

39. The apparatus of claim 1, wherein the first processor, or the second processor, or both the first processor and the second processor, is or are selected from the group consisting of: a field programmable gate array, an application-specific integrated circuit, a microprocessor, a processor core, a cell processor, a plurality of processor cores, a digital signal processor, a reduced instruction set processor, a reconfigurable processing element, a graphics processing unit, a computing grid, and combinations thereof.

40. The apparatus of claim 1, wherein the plurality of descriptive elements are a specification of at least one graphical image in a form which at least partially is not a pixel bitmap and at least partially is not a pixel matrix.

41. The apparatus of claim 1, wherein each graphical primitive instruction for native execution by the second processor comprises at least one or more of the following: a hardware-level instruction, or a hardware-level sub-instruction, or a hardware-level binary instruction, or hardware-level configuration, or a hardware-level control signal, or hardware-level microcode.

42. The apparatus of claim 1, wherein the second processor further comprises a hardware decoder to decode a selected operational code of the plurality of operational codes into one or more graphical primitive instructions or configurations selected from the group consisting of: a hardware-level instruction, a hardware-level sub-instruction, a hardware-level binary instruction, a hardware-level configuration, a hardware-level control signal, hardware-level microcode, and combinations thereof.

43. The apparatus of claim 1, wherein the action script is a data file which has not been fully compiled to machine code and which comprises at least one descriptive element specifying the graphical image at least partially in a form which is not pixel-based.

44. The apparatus of claim 1, wherein the action script is a data file specifying the graphical image at least partially using non-pixel data and which comprises an ASCII-encoded scripting language or bytecode.

45. The apparatus of claim 1, wherein the graphical image is an image of any kind for visual display which has been specified at least partially in a form in the action script which is not a pixel bitmap and is not a pixel matrix.

46. The apparatus of claim 1, wherein the first processor, or the second processor, or both the first processor and the second processor, is or are coupled to the first memory through at least one coupling selected from the group consisting of: an interconnection network, a configurable interconnect, a packet-based interconnect, a circuit-switched interconnect, a crosspoint switch, a serial bus, a parallel bus, a network, and combinations thereof.

47. The apparatus of claim 1, wherein the first processor is coupled to the second processor through at least one coupling selected from the group consisting of: the first memory, an interconnection network, a configurable interconnect, a packet-based interconnect, a circuit-switched interconnect, a crosspoint switch, a serial bus, a parallel bus, a network, and combinations thereof.

48. An apparatus for processing an action script for a graphical image for visual display, the apparatus comprising:
a first memory circuit to store data;
a first processor circuit to separate the action script from other data; and
a second processor circuit coupled to the first processor circuit and to the first memory circuit, the second processor circuit to parse the action script into a plurality of descriptions and a corresponding plurality of variable length operand data sets, the plurality of descriptions specifying the graphical image in a non-pixel-by-pixel form; to directly convert each description of the plurality of descriptions of the action script into a plurality of operational codes, each corresponding operational code comprising at least one graphical primitive instruction for native execution by the second processor circuit or comprising a memory pointer to an address in the first memory circuit having a sequence of graphical primitive instructions for native execution by the second processor circuit; to directly convert each variable length operand data set of the corresponding plurality of variable length operand data sets into one or more control words and store the one or more control words in the first memory circuit, each control word comprising operand data and one or more control bits in predetermined fields for the native execution of the one or more graphical primitive instructions by the second processor circuit; and to directly execute the one or more graphical primitive instructions using the one or more control words to generate pixel data for the graphical image.

49. The apparatus of claim 48, wherein the second processor circuit further is to decode a description of the plurality of descriptions to determine a corresponding parsing operational code of the plurality of operational codes to control the parsing of the action script.

50. The apparatus of claim 48, wherein the second processor circuit further comprises:
a parser circuit to parse the action script into the plurality of descriptions and corresponding data;
a converter circuit to convert the plurality of descriptions of the action script into the plurality of operational codes and to convert the corresponding data into the plurality of control words; and
an execution circuit to directly execute the one or more graphical primitive instructions using the one or more control words of the plurality of control words to generate the pixel data.

51. The apparatus of claim 50, wherein the second processor circuit further comprises:
a decoder circuit to decode a description to determine a corresponding parsing operational code of the plurality of operational codes to control the parsing of the action script by the parser circuit.

52. The apparatus of claim 50, wherein at least some of the one or more native instructions comprise a plurality of control signals, and wherein the second processor circuit further comprises:
a decoder circuit to decode each operational code of the plurality of operational codes to generate the plurality of control signals to control the execution circuit.

53. The apparatus of claim 48, wherein the second processor circuit further comprises:
a decoder to determine a type of description;
a parsing controller to determine or select a number of bits to parse parameter;
a stream register to store a plurality of bits of the action script; and
at least one barrel shifter to shift out of the stream register a number of bits designated by the number of bits to parse parameter.

54. The apparatus of claim 48, wherein the second processor circuit further is to extract data from the action script and store the extracted data in the first memory circuit as the plurality of control words.

55. The apparatus of claim 54, wherein the second processor circuit further is to store the plurality of operational codes and plurality of control words in a database structure.

56. The apparatus of claim 48, wherein the plurality of descriptions are a plurality of tags or bytecodes.

57. The apparatus of claim 48, wherein the plurality of descriptions are selected from the group consisting of: a tag, a bytecode, a control tag, a definition tag, a dictionary tag, a dictionary repository, and combinations thereof.

58. The apparatus of claim 48, further comprising:
a second memory circuit storing a look up table having the plurality of operational codes; and
wherein the second processor circuit further is to perform a hash function on each description of the plurality of descriptions to generate a corresponding hash result and to use the hash result as an index or entry into the look up table to determine a corresponding operational code of the plurality of operational codes.

59. The apparatus of claim 48, wherein the second processor circuit further comprises:
at least one arithmetic logic unit; and
at least one floating point circuit.

60. The apparatus of claim 59, wherein the at least one arithmetic logic unit further comprises:
an adder circuit;
a subtractor circuit;
a bitwise-OR logic circuit;
a bitwise-AND logic circuit;
a bitwise-exclusive OR logic circuit;
at least one barrel shifter circuit; and
an output multiplexer.

61. The apparatus of claim 59, wherein the at least one floating point circuit further comprises:
a floating point adder and subtractor circuit;
a floating point multiplier circuit;
a floating point divider circuit;
a floating point comparator circuit;
an integer-to-floating point converter circuit;
a floating point-to-integer converter circuit; and
an output multiplexer.

62. The apparatus of claim 61, wherein the second processor circuit further comprises:
a control circuit to control a plurality of floating point comparator circuits to perform at least four comparisons corresponding to four conditions and to use results of the comparisons to perform a conditional branch operation during a single clock cycle.

63. The apparatus of claim 48, further comprising:
a configurable interconnect comprising:
a multiport register; and
a cross-point switch for configuration of a data path.

64. The apparatus of claim 48, wherein the second processor circuit further comprises:
a post-processing circuit to match a plurality of line or curve segments of a boundary of the graphical image and to determine a sequential ordering of the plurality of line or curve segments to form boundary coordinates of the graphical image.

65. The apparatus of claim 48, wherein the second processor circuit further comprises:
a graphics rendering circuit to apply a fill style to generate pixel data for an area of the graphical image.

66. The apparatus of claim 65, wherein the second processor circuit further is to apply a line style by forming a second graphical image from a boundary of the graphical image, and to apply a fill style to the second graphical image to generate pixel data for the line style.

67. The apparatus of claim 48, wherein the first processor circuit further is to perform a protocol, for reception of a data file, selected from the group consisting of: a Transmission Control Protocol ("TCP"), or Internet Protocol ("IP"), and combinations thereof.

68. The apparatus of claim 67, wherein the first processor circuit further is to perform hypertext transfer protocol ("HTTP") for reception of the data and to generate pixel data for hypertext markup language ("HTML") data, or extensible markup language ("XML") data, or both HTML and XML data of the data file.

69. The apparatus of claim 68, further comprising:
a frame buffer;
wherein the second processor circuit further is to transfer the pixel data for the graphical image to the frame buffer and wherein the first processor circuit further is to transfer the pixel data for the HTML or XML data to the frame buffer.

70. The apparatus of claim 68, further comprising:
a frame buffer; and
a visual display;
wherein the second processor circuit further is to transfer the pixel data for the graphical image to the frame buffer and wherein the first processor circuit further is to transfer the pixel data for the HTML or XML data to the visual display.

71. The apparatus of claim 68, further comprising:
a frame buffer; and
a display controller;
wherein the second processor circuit further is to transfer the pixel data for the graphical image to the frame buffer and wherein the first processor circuit further is to transfer the pixel data for the HTML or XML data to the display controller.

72. The apparatus of claim 48, wherein each operational code of the plurality of operational codes is a hardware-level instruction, or is hardware-decodable into a plurality of hardware-level microcode, or is one or more hardware-level binary instructions, or is one or more hardware-level control signals; wherein the action script is a data file which has not been fully compiled to machine code and which comprises at least one description; and wherein the graphical image is an image of any kind for visual display which has been specified at least partially in a non-pixel form in the action script.

73. The apparatus of claim 48, wherein the first processor circuit, or the second processor circuit, or both the first processor circuit and the second processor circuit, is selected from the group consisting of: a field programmable gate array, an application-specific integrated circuit, a microprocessor, a processor core, a cell processor, a plurality of processor cores, a digital signal processor, a reduced instruction set processor, a reconfigurable processing element, a graphics processing unit, a computing grid, and combinations thereof.

74. An apparatus for processing a data file for visual display of a graphical image, the data file comprising interpretable descriptions of the graphical image in a non-pixel-bitmap form, the data file not having been fully compiled to a machine code, the apparatus comprising:
a first memory;
a first processor to separate the data file from other data; and
a second processor coupled to the first processor and to the first memory, the second processor to parse the data file into the plurality of interpretable descriptions and a corresponding plurality of variable length operand data sets; to directly convert the plurality of interpretable descriptions to a plurality of hardware-level operational codes, each hardware-level corresponding operational code comprising at least one graphical primitive instruction for native execution by the second processor or comprising a memory pointer to an address in the first memory having a sequence of graphical primitive instructions for native execution by the second processor; to directly convert each variable length operand data set of the corresponding plurality of variable length operand data sets into one or more control words and store the one or more control words in the first memory, each control word comprising operand data and one or more control bits in predetermined fields for the native execution of the one or more graphical primitive instructions by the second processor; and to directly execute the one or more graphical primitive instructions using the one or more control words to generate pixel data for the graphical image.

75. The apparatus of claim 74, wherein the second processor further is to decode at least some of the data file to determine a corresponding parsing operational code of the plurality of hardware-level operational codes to control the parsing of the data file.

76. The apparatus of claim 74, wherein the first processor, or the second processor, or both the first processor and the second processor, is or are selected from the group consisting of: a field programmable gate array, an application-specific integrated circuit, a microprocessor, a processor core, a cell processor, a plurality of processor cores, a digital signal processor, a reduced instruction set processor, a reconfigurable processing element, a graphics processing unit, a computing grid, and combinations thereof.

77. The apparatus of claim 74, further comprising:
a second memory to store a look up table having the plurality of hardware-level operational codes; and
wherein the second processor further is to convert the parsed data file directly to the plurality of hardware-level operational codes by performing a hash function on each descriptive element of a plurality of descriptive elements to generate a corresponding hash result and to use the hash result as an index or entry into the look up table to determine a corresponding hardware-level operational code of the plurality of hardware-level operational codes.

78. An apparatus for processing a data file for visual display of a graphical image, the data file comprising at least one description of the graphical image in a non-pixel-bitmap form, the data file further comprising data which is not fully compiled to executable machine code, the apparatus comprising:
a first memory circuit;
a second memory circuit to store a look up table having a plurality of hardware-level control codes;
a first processor to separate the data file from other data; and
a second processor coupled to the first processor and to the first and second memory circuits, the second processor to parse the data file into a plurality of descriptive elements and a corresponding plurality of variable length operand data sets, the plurality of descriptive elements specifying the graphical image in a non-pixel-by-pixel form; to perform a hash function on each descriptive element of the plurality of descriptive elements to generate a corresponding hash result and to use the hash result as an index or entry into the look up table stored in the second memory circuit to determine a corresponding hardware-level control code of the plurality of hardware-level control codes, each corresponding hardware-level control code comprising at least one graphical primitive instruction for native execution by the second processor or comprising a memory pointer to an address in the second memory circuit having a sequence of graphical primitive instructions for native execution by the second processor; to directly convert each variable length operand data set of the corresponding plurality of variable length operand data sets into one or more control words and store the one or more control words in the first memory circuit or in the second memory circuit, each control word comprising operand data and one or more control bits in predetermined fields for the native execution of the one or more graphical primitive instructions by the second processor; and to directly execute the one or more graphical primitive instructions using the one or more control words to generate pixel data for the graphical image.

* * * * *